US011270850B2

(12) United States Patent
Brambilla

(10) Patent No.: US 11,270,850 B2
(45) Date of Patent: Mar. 8, 2022

(54) ULTRACAPACITORS WITH HIGH FREQUENCY RESPONSE

(71) Applicant: FastCAP SYSTEMS Corporation, Boston, MA (US)

(72) Inventor: Nicolò Michele Brambilla, Boston, MA (US)

(73) Assignee: FASTCAP SYSTEMS CORPORATION, Boston, MA (US)

( * ) Notice: Subject to any disclaimer, the term of this patent is extended or adjusted under 35 U.S.C. 154(b) by 0 days.

(21) Appl. No.: 15/186,534

(22) Filed: Jun. 19, 2016

(65) Prior Publication Data
US 2018/0204689 A1   Jul. 19, 2018
US 2019/0080854 A9   Mar. 14, 2019

Related U.S. Application Data

(63) Continuation of application No. PCT/US2014/071998, filed on Dec. 22, 2014.
(Continued)

(51) Int. Cl.
*H01G 11/68* (2013.01)
*H01G 11/36* (2013.01)
(Continued)

(52) U.S. Cl.
CPC ............. *H01G 11/68* (2013.01); *H01G 11/28* (2013.01); *H01G 11/36* (2013.01); *H01G 11/52* (2013.01);
(Continued)

(58) Field of Classification Search
CPC ........ H01G 11/68; H01G 11/36; H01G 11/28; H01G 11/70; H01G 11/52; H01G 11/86;
(Continued)

(56) References Cited

U.S. PATENT DOCUMENTS 3,982,182 A   9/1976 Hogg et al.
4,349,910 A   9/1982 Belz et al.
(Continued)

FOREIGN PATENT DOCUMENTS

CN   101027736 A1   8/2007
CN   103891013 A    6/2014
(Continued)

OTHER PUBLICATIONS

Extended European Search Report for EP App. No. 14885660.2 dated Oct. 5, 2017.
(Continued)

*Primary Examiner* — David M Sinclair

(57) ABSTRACT

An electric double layer capacitor (EDLC) is disclosed including: a first electrode including a first current collector and first plurality of carbon nanotubes (CNTs) disposed substantially directly upon the first current collector; a second electrode comprising a second current collector and second plurality of CNTs disposed substantially directly upon the second current collector; and an electrolyte disposed between and in contact with (e.g., wetting) the first and second electrodes. In some embodiments, the EDLC is configured to have a capacitive frequency window comprising about 1 Hz to about 50 Hz.

18 Claims, 23 Drawing Sheets

Related U.S. Application Data

(60) Provisional application No. 61/919,692, filed on Dec. 20, 2013.

(51) Int. Cl.
*H01G 11/70* (2013.01)
*H01G 11/62* (2013.01)
*H01G 11/28* (2013.01)
*H01G 11/52* (2013.01)
*H01G 11/86* (2013.01)
*H01G 11/64* (2013.01)
*H01G 11/80* (2013.01)
*H02J 3/18* (2006.01)
*H01G 11/60* (2013.01)
*H01G 11/56* (2013.01)

(52) U.S. Cl.
CPC ............ *H01G 11/70* (2013.01); *H01G 11/56* (2013.01); *H01G 11/60* (2013.01); *H01G 11/62* (2013.01); *H01G 11/64* (2013.01); *H01G 11/80* (2013.01); *H01G 11/86* (2013.01); *H02J 3/1807* (2013.01); *Y02E 60/13* (2013.01)

(58) Field of Classification Search
CPC ........ H01G 11/60; H01G 11/80; H01G 11/62; H01G 11/64
See application file for complete search history.

(56) References Cited

U.S. PATENT DOCUMENTS

| | | | |
|---|---|---|---|
| 4,408,259 A | 10/1983 | Muranaka et al. |
| 4,934,366 A | 6/1990 | Truex et al. |
| 5,426,561 A | 6/1995 | Yen et al. |
| 5,440,447 A | 8/1995 | Shipman et al. |
| 5,441,827 A | 8/1995 | Gratzel et al. |
| 5,476,709 A | 12/1995 | Inoue et al. |
| 5,711,988 A | 1/1998 | Tsai et al. |
| 5,905,629 A | 5/1999 | Alford |
| 5,923,619 A | 7/1999 | Knapen et al. |
| 6,059,847 A | 5/2000 | Farahmandi et al. |
| 6,060,424 A | 5/2000 | Alford |
| 6,193,779 B1 | 2/2001 | Reichert et al. |
| 6,205,016 B1 | 3/2001 | Niu |
| 6,232,706 B1 | 5/2001 | Dai et al. |
| 6,257,332 B1 | 7/2001 | Vidrine et al. |
| 6,304,427 B1 | 10/2001 | Reed et al. |
| 6,318,457 B1 | 11/2001 | Boer et al. |
| 6,346,187 B1 | 2/2002 | Tran et al. |
| 6,350,488 B1 | 2/2002 | Lee et al. |
| 6,388,423 B1 | 5/2002 | Schilleci, Jr. |
| 6,413,285 B1 | 7/2002 | Chu et al. |
| 6,444,326 B1 | 9/2002 | Smith |
| 6,454,816 B1 | 9/2002 | Lee et al. |
| 6,491,848 B1 | 12/2002 | Sato et al. |
| 6,511,760 B1 | 1/2003 | Barone et al. |
| 6,514,113 B1 | 2/2003 | Lee et al. |
| 6,565,701 B1 | 5/2003 | Jerabek et al. |
| 6,665,169 B2 | 12/2003 | Tennent et al. |
| 6,764,874 B1 | 7/2004 | Zhang et al. |
| 6,843,119 B2 | 1/2005 | Patey et al. |
| 6,872,681 B2 | 3/2005 | Niu et al. |
| 6,906,911 B2 | 6/2005 | Ikeda et al. |
| 6,914,341 B1 | 7/2005 | McIntyre et al. |
| 6,924,059 B1 | 8/2005 | Kawakami et al. |
| 6,962,823 B2 | 11/2005 | Empedocles et al. |
| 7,070,833 B2 | 7/2006 | Smith et al. |
| 7,126,207 B2 | 10/2006 | Mosley et al. |
| 7,168,487 B2 | 1/2007 | Salamitou et al. |
| 7,201,627 B2 | 4/2007 | Ohnuma |
| 7,327,556 B2 * | 2/2008 | Ro ........................... C23C 8/20 361/502 |
| 7,335,395 B2 | 2/2008 | Ward et al. |
| 7,381,367 B1 | 6/2008 | Baker et al. |
| 7,468,679 B2 | 12/2008 | Feluch |
| 7,493,962 B2 | 2/2009 | Sheffield |
| 7,511,941 B1 | 3/2009 | Gallay et al. |
| 7,699,102 B2 | 4/2010 | Storm et al. |
| 7,713,658 B2 | 5/2010 | Mizuta et al. |
| 7,767,114 B2 | 8/2010 | Gordon et al. |
| 7,785,558 B2 | 8/2010 | Hikata |
| 7,897,209 B2 | 3/2011 | Shibuya et al. |
| 7,914,927 B2 | 3/2011 | Mizuta et al. |
| 7,982,439 B2 | 7/2011 | Trainor et al. |
| 7,999,695 B2 | 8/2011 | Rodney et al. |
| 8,025,971 B2 | 9/2011 | Maeno et al. |
| 8,119,032 B2 | 2/2012 | Gordon et al. |
| 8,168,331 B2 | 5/2012 | Best et al. |
| 8,531,818 B2 | 9/2013 | Hashimoto et al. |
| 8,709,374 B2 | 4/2014 | Cooper et al. |
| 8,760,851 B2 | 6/2014 | Signorelli et al. |
| 8,817,452 B2 * | 8/2014 | Nguyen ................ H01G 11/36 361/502 |
| 8,822,057 B2 | 9/2014 | Sinsabaugh et al. |
| 8,932,750 B2 | 1/2015 | Signorelli et al. |
| 9,001,495 B2 | 4/2015 | Brambilla et al. |
| 9,013,144 B2 | 4/2015 | Cooley et al. |
| 9,017,634 B2 | 4/2015 | Brambilla et al. |
| 9,206,672 B2 | 12/2015 | Cooley et al. |
| 9,209,434 B2 | 12/2015 | Epstein |
| 9,214,709 B2 | 12/2015 | Cooley |
| 9,218,917 B2 | 12/2015 | Brambilla et al. |
| 9,455,094 B2 * | 9/2016 | Tour ....................... H01G 11/72 |
| 9,515,499 B2 | 12/2016 | Signorelli et al. |
| 9,558,894 B2 | 1/2017 | Kuttipillai et al. |
| 9,683,441 B2 | 6/2017 | Signorelli et al. |
| 9,954,382 B2 | 4/2018 | Cooley et al. |
| 2001/0006108 A1 | 7/2001 | Brett et al. |
| 2002/0043369 A1 | 4/2002 | Vinegar et al. |
| 2002/0159943 A1 | 10/2002 | Colbert et al. |
| 2002/0177018 A1 | 11/2002 | Fuglevand |
| 2003/0027038 A1 | 2/2003 | Tsukamoto et al. |
| 2003/0030969 A1 | 2/2003 | Farahmandi et al. |
| 2003/0081372 A1 | 5/2003 | Kashara et al. |
| 2003/0003359 A1 | 6/2003 | Banno et al. |
| 2004/0131937 A1 | 7/2004 | Chen et al. |
| 2004/0188350 A1 | 9/2004 | Beste et al. |
| 2004/0229117 A1 | 11/2004 | Mitani et al. |
| 2005/0152096 A1 | 7/2005 | Farahmandi et al. |
| 2005/0208207 A1 | 9/2005 | Hinoki et al. |
| 2005/0230270 A1 | 10/2005 | Ren et al. |
| 2005/0231893 A1 | 10/2005 | Harvey et al. |
| 2005/0234177 A1 | 10/2005 | Zaghib et al. |
| 2005/0238810 A1 | 10/2005 | Scaringe et al. |
| 2005/0250052 A1 | 11/2005 | Nguyen |
| 2006/0019168 A1 | 1/2006 | Li et al. |
| 2006/0115722 A1 | 6/2006 | Kim et al. |
| 2006/0191681 A1 | 8/2006 | Storm et al. |
| 2006/0194102 A1 | 8/2006 | Keshishian et al. |
| 2006/0241236 A1 | 10/2006 | Kuznetsov et al. |
| 2006/0256506 A1 | 11/2006 | Konuma et al. |
| 2006/0279906 A1 | 12/2006 | Stemen et al. |
| 2007/0015336 A1 | 1/2007 | Farahmandi et al. |
| 2007/0076349 A1 | 4/2007 | Dementiev et al. |
| 2007/0097598 A1 | 5/2007 | Siggel et al. |
| 2007/0146965 A1 | 6/2007 | Mitchell et al. |
| 2007/0188977 A1 | 8/2007 | Takeda et al. |
| 2007/0254213 A1 | 11/2007 | Best et al. |
| 2007/0258192 A1 | 11/2007 | Schindall et al. |
| 2007/0258193 A1 | 11/2007 | Zhong et al. |
| 2007/0259216 A1 | 11/2007 | Logan |
| 2007/0292746 A1 | 12/2007 | Sloop |
| 2008/0013224 A1 | 1/2008 | Kim et al. |
| 2008/0068801 A1 | 3/2008 | Wilk et al. |
| 2008/0083626 A1 | 4/2008 | Kubo et al. |
| 2008/0090183 A1 | 4/2008 | Zhu et al. |
| 2008/0094777 A1 | 4/2008 | Itahashi et al. |
| 2008/0192407 A1 | 8/2008 | Lu et al. |
| 2008/0218945 A1 | 9/2008 | Ro et al. |
| 2008/0304207 A1 | 12/2008 | Brandon et al. |
| 2008/0316678 A1 | 12/2008 | Ehrenberg et al. |

(56) References Cited

U.S. PATENT DOCUMENTS

| | | |
|---|---|---|
| 2008/0317660 A1 | 12/2008 | Pan et al. |
| 2009/0011330 A1 | 1/2009 | Onodera et al. |
| 2009/0021890 A1 | 1/2009 | Bourcier et al. |
| 2009/0154060 A1 | 6/2009 | Anderson et al. |
| 2009/0194314 A1 | 8/2009 | Varkey et al. |
| 2009/0246625 A1 | 10/2009 | Lu |
| 2009/0250409 A1 | 10/2009 | Fiene et al. |
| 2009/0272935 A1 | 11/2009 | Hata et al. |
| 2009/0272946 A1* | 11/2009 | Lu .................. H01B 1/04 252/511 |
| 2009/0294753 A1 | 12/2009 | Hauge et al. |
| 2009/0303658 A1 | 12/2009 | Hiroyuki et al. |
| 2010/0039749 A1 | 2/2010 | Ritter et al. |
| 2010/0046142 A1 | 2/2010 | Aitchison et al. |
| 2010/0062229 A1 | 3/2010 | Hata et al. |
| 2010/0119934 A1 | 5/2010 | Ushio et al. |
| 2010/0134955 A1 | 6/2010 | O'Connor et al. |
| 2010/0178543 A1 | 7/2010 | Gruner et al. |
| 2010/0178564 A1 | 7/2010 | Asari et al. |
| 2010/0178568 A1 | 7/2010 | Unalan et al. |
| 2010/0195269 A1 | 8/2010 | Kim et al. |
| 2010/0196600 A1 | 8/2010 | Shibuya et al. |
| 2010/0196758 A1 | 8/2010 | Hojo et al. |
| 2010/0236777 A1 | 9/2010 | Partouche et al. |
| 2010/0259866 A1 | 10/2010 | Shaffer et al. |
| 2011/0013344 A1 | 1/2011 | Remizov et al. |
| 2011/0027537 A1 | 2/2011 | Inoue et al. |
| 2011/0049901 A1 | 3/2011 | Tinnen et al. |
| 2011/0080689 A1 | 4/2011 | Bielawski et al. |
| 2011/0085285 A1 | 4/2011 | Zednizek et al. |
| 2011/0091767 A1 | 4/2011 | Hojo et al. |
| 2011/0102002 A1 | 5/2011 | Riehl et al. |
| 2011/0133284 A1 | 6/2011 | Mitra et al. |
| 2011/0141661 A1 | 6/2011 | Mutha et al. |
| 2011/0143197 A1 | 6/2011 | Ohtsuka et al. |
| 2011/0150736 A1 | 6/2011 | Hagiwara et al. |
| 2011/0151317 A1 | 6/2011 | Giroud et al. |
| 2011/0170236 A1 | 7/2011 | Young |
| 2011/0170237 A1 | 7/2011 | Brandon et al. |
| 2011/0171371 A1 | 7/2011 | Li et al. |
| 2011/0183206 A1 | 7/2011 | Davis et al. |
| 2011/0220191 A1 | 9/2011 | Flood |
| 2011/0255212 A1 | 10/2011 | Liu et al. |
| 2011/0262772 A1 | 10/2011 | Hauge et al. |
| 2011/0281156 A1 | 11/2011 | Boren et al. |
| 2011/0293850 A1 | 12/2011 | Yi et al. |
| 2012/0021291 A1 | 1/2012 | Ji et al. |
| 2012/0094181 A1 | 4/2012 | Kim et al. |
| 2012/0099244 A1 | 4/2012 | Lee et al. |
| 2012/0122020 A1 | 5/2012 | Hata et al. |
| 2012/0154979 A1 | 6/2012 | Signorelli et al. |
| 2012/0231270 A1 | 9/2012 | Dhinojwala et al. |
| 2012/0251432 A1 | 10/2012 | Cooper et al. |
| 2012/0257326 A1 | 10/2012 | Gadkaree et al. |
| 2012/0313586 A1 | 12/2012 | Signorelli et al. |
| 2012/0313591 A1 | 12/2012 | Brambilla et al. |
| 2013/0004657 A1 | 1/2013 | Xu et al. |
| 2013/0005941 A1 | 1/2013 | Kondou et al. |
| 2013/0026978 A1 | 1/2013 | Cooley et al. |
| 2013/0029215 A1 | 1/2013 | Signorelli et al. |
| 2013/0033130 A1 | 2/2013 | Nair et al. |
| 2013/0044130 A1 | 2/2013 | Nair et al. |
| 2013/0044405 A1 | 2/2013 | Brambilla et al. |
| 2013/0045157 A1 | 2/2013 | Brambilla et al. |
| 2013/0141840 A1 | 6/2013 | Cooley et al. |
| 2013/0177812 A1 | 7/2013 | Han et al. |
| 2013/0180591 A1* | 7/2013 | Kawata ............... H01G 11/62 136/263 |
| 2013/0189580 A1 | 7/2013 | Dai et al. |
| 2013/0222975 A1 | 8/2013 | Yan et al. |
| 2014/0016246 A1 | 1/2014 | Gadkaree et al. |
| 2014/0029161 A1* | 1/2014 | Beidaghi ............ H01G 11/24 361/502 |
| 2014/0042988 A1 | 2/2014 | Kuttipillai |
| 2014/0057164 A1 | 2/2014 | Brambilla et al. |
| 2014/0104754 A1 | 4/2014 | Lipka et al. |
| 2014/0106257 A1* | 4/2014 | Raychaudhuri ....... C01B 32/174 429/521 |
| 2014/0126112 A1* | 5/2014 | Nguyen .................. H01G 11/70 361/502 |
| 2014/0186550 A1 | 7/2014 | Cooper et al. |
| 2014/0265565 A1 | 9/2014 | Cooley et al. |
| 2014/0265580 A1 | 9/2014 | Cooley et al. |
| 2014/0299359 A1 | 10/2014 | Mittal et al. |
| 2014/0313636 A1* | 10/2014 | Tour ...................... H01G 11/72 361/502 |
| 2014/0363568 A1 | 12/2014 | Suematsu et al. |
| 2015/0002987 A1 | 1/2015 | Signorelli et al. |
| 2015/0064092 A1* | 3/2015 | Noyes ...................... B01J 37/16 423/304 |
| 2015/0107824 A1 | 4/2015 | Signorelli et al. |
| 2015/0210548 A1 | 7/2015 | Brambilla et al. |
| 2015/0218913 A1 | 8/2015 | Cooley et al. |
| 2015/0279578 A1 | 10/2015 | Martini et al. |
| 2015/0287961 A1 | 10/2015 | Signorelli et al. |
| 2016/0012979 A1 | 1/2016 | Zheng |
| 2016/0104891 A1 | 4/2016 | Holme |
| 2017/0316889 A1 | 11/2017 | Martini et al. |
| 2018/0068803 A1 | 3/2018 | Brambilla et al. |
| 2018/0068804 A1 | 3/2018 | Brambilla et al. |
| 2018/0135408 A1 | 5/2018 | Cooley et al. |
| 2018/0171777 A1 | 6/2018 | Cooley et al. |
| 2018/0204689 A1 | 7/2018 | Brambilla et al. |
| 2018/0211794 A1 | 7/2018 | Brambilla et al. |

FOREIGN PATENT DOCUMENTS

| | | |
|---|---|---|
| EP | 1 798 743 A1 | 6/2007 |
| EP | 2 056 312 A1 | 5/2009 |
| JP | 2003-133185 A | 5/2003 |
| JP | 2007-005718 A | 1/2007 |
| JP | 2009-076514 A | 4/2009 |
| WO | WO99/66985 A | 12/1999 |
| WO | WO 00/19461 A1 | 4/2000 |
| WO | WO 00/44965 A1 | 8/2000 |
| WO | WO 2008/016990 A2 | 2/2008 |
| WO | WO 2009/125540 A1 | 10/2009 |
| WO | WO 2009/128343 A1 | 10/2009 |
| WO | WO 2010/067509 A1 | 6/2010 |
| WO | WO 2012/129690 A1 | 10/2012 |
| WO | WO 2012/162500 A2 | 11/2012 |
| WO | WO 2012/170749 A2 | 12/2012 |
| WO | 2013126915 A1 | 8/2013 |
| WO | WO 2013/119295 A1 | 8/2013 |
| WO | 2014145259 A2 | 9/2014 |
| WO | WO 2015/054432 A1 | 4/2015 |
| WO | WO 2015/102716 A2 | 7/2015 |
| WO | WO 2015/171528 A1 | 11/2015 |
| WO | WO 2018/102652 A1 | 6/2018 |

OTHER PUBLICATIONS

International Search Report and Written Opinion for PCT/US2014/071998 dated Oct. 12, 2015.
International Preliminary Report on Patentability for PCT/US2014/071998 dated Jun. 30, 2016.
Office Action dated Dec. 11, 2013 for U.S. Appl. No. 12/928,897.
Office Action dated Jul. 16, 2014 for U.S. Appl. No. 12/928,897.
International Search Report and Written Opinion for PCT/US2012/039342 dated Dec. 6, 2012.
International Search Report and Written Opinion for PCT/US2012/041438 dated Nov. 19, 2012.
International Search Report and Written Opinion for PCT/US12/45994 dated Dec. 26, 2012.
International Search Report and Written Opinion for PCT/US2012/047474 dated Oct. 16, 2012.
Office Action dated May 29, 2014 for U.S. Appl. No. 13/560,628.
Office Action dated Jun. 18, 2014 for U.S. Appl. No. 13/588,452.
Office Action dated Oct. 15, 2014 for U.S. Appl. No. 13/587,037.
International Search Report and Written Opinion for PCT/US2013/027697 dated Jun. 26, 2013.

(56) References Cited

OTHER PUBLICATIONS

International Search Report for PCT/US2014/029992 dated Oct. 7, 2014.
International Search Report PCT/US2014/030310 dated Oct. 10, 2014.
International Search Report and Written Opinion for PCT/US2007/068314 dated Feb. 13, 2008.
An, et al., "Electrochemical Properties of High-Power Supercapacitors Using Single-Walled Carbon Nanotube Electrodes," Adv. Funct. Mater., Oct. 2001, 387-392, vol. 11, No. 5.
An, et al., "Supercapacitors Using Single-Walled Carbon Nanotube Electrodes", Advanced Materials, Apr. 2001, pp. 497-500, vol. 13, No. 7.
Awad, et al., "Thermal degradation studies of alkyl-imidazolium salts and their application in nanocomposites," Thermochimica Acta, pp. 3-11, 2004, vol. 409.
Balducci, et al., "High temperature carbon-carbon supercapacitor using ionic liquid as electrolyte," J. Power Sources, pp. 922-927, Jan. 3, 2007, vol. 165.
Emmenegger, et al., "Investigation of Electrochemical Double-layer {ECOL} Capacitors Electrodes Based on Carbon Nanotubes and Activated Carbon Materials," J. of Power Sources, 2003, pp. 321-329, vol. 124.
Farmer et al., The oxidation of alcohols in substituted imidazolium ionic liquids using ruthenium catalysts. Green Chemistry. 2002;4:97-102.
Halber, "Researchers Fired Up Over New Battery", The Tech, Feb. 8, 2006, pp. 1, 5, vol. 50, No. 16.
Hensley, et al., "The evolution of oilfield batteries", Oilfield Review, Autumn 1998, pp. 42-57.
Koch, "Electrochemical Double Layer Capacitors for High Temperature Applications," 14th International Seminar on Double Layer Capacitors and Hybrid Energy Storage Devices, Dec. 6-8, 2004, pp. 33-39.
Koch, "Thermally Robust Capacitors for the Drilling Industry," Report for U.S. Dept. of Energy Grant No. DE-FG02-06ER84598 for the period Jun. 28, 2006 to Mar. 27, 2007.
Liu, et al., "Graphene-Based Supercapacitor with an Ultrahigh Energy Density," Nano Lett., pp. 4863-4868, 2010, vol. 10.
Marincic, "High Temperature Electrochemical Double Layer Capacitors With Reduced Leakage Rate," 14th International Seminar on Double Layer Capacitors and Hybrid Energy Storage Devices, Dec. 6-8, 2004, pp. 310-316.
Maxwell Technologies Application Note, "Maxwell Technologies' Test Procedures for Capacitance, ESR, Leakage Current and Self-Discharge Characterizations of Ultracapacitors," Jul. 2009, pp. 1-10.
Murakami, et al., "Growth of Vertically Aligned Single-walled Carbon Nanotube Films on Quartz Substrates and Their Optical Anisotropy," Chem. Phys. Lett., 2004, pp. 298-303, vol. 385.
Ngo, et al., "Thermal properties of imidazolium ionic liquids," Thermochimica Acta, pp. 97-102, 2000, vol. 357-358.
Nishida, et al., "Physical and electrochemical properties of 1-alkyl-3-methylimidazolium tetrafluoroborate for electrolyte," J. Fluorine Chem., pp. 135-141, 2003, vol. 120.
Niu, et al., "High Power Electrochemical Capacitors Based on Carbon Nanotube Electrodes," Appl. Phys. Lett., Mar. 17, 1997, pp. 1480-1482, vol. 70, No. 11.
Randstrom, "The influence of air and its components on the cathodic stability of N-butyl-N-methylpyrrolidinium bis (trifluoromethanesulfonyl)imide," Electrochimica Acta, pp. 1837-1842, Aug. 19, 2007, vol. 53.
Robertson, "Realistic applications of CNTs," materialstoday, Oct. 2004, pp. 46-52, vol. 7, No. 10.
Shamsipur, et al., "Physical and electrochemical properties of ionic liquids 1-ethyl-3-methylimidazolium tetrafluoroborate, 1-butyl-3-methylimidazolium trifluoromethanesulfonate and 1-butyl-1-methylpyrrolidinium bis (trifluoromethylsulfonyl)imide," J. Mol. Liq., pp. 43-50, Aug. 24, 2010, vol. 157.
Signorelli, et al., "Carbon Nanotube Enhanced Ultracapacitor", Sep. 2004.
Signorelli, et al., "Fabrication and Electrochemical Testing of the First Generation Carbon-Nanotube Based Ultracapacitor Cell," 17th International Seminar on Double Layer Capacitors and Hybrid Energy Storage Devices, Dec. 10-12, 2007, pp. 70-78.
Signorelli, et al., "High Density Energy Storage Using a Nanotube-Enhanced Ultracapacitor," 16th International Seminar on Double Layer Capacitors and Hybrid Energy Storage Devices, Dec. 4-6, 2006, pp. 15-21.
Signorelli, et al., "High Potential Vertically Aligned Carbon Nanotubes as EDLC Electrodes," 18th International Seminar on Double Layer Capacitors and Hybrid Energy Storage Devices, Dec. 8-10, 2008, pp. 73-79.
Signorelli, et al., "Nanotube Enhanced Ultracapacitor," 14th International Seminar on Double Layer Capacitors and Hybrid Energy Storage Devices, Dec. 6-8, 2004, pp. 49-61.
Signorelli, et al., "Nanotube Enhanced Ultracapacitor," 15th International Seminar on Double Layer Capacitors and Hybrid Energy Storage Devices, Dec. 5-7, 2005, pp. 158-168.
Ue, et al., "Application of Low-Viscosity Ionic Liquid to the Electrolyte of Double-Layer Capacitors," J. Electrochem. Soc., Feb. 28, 2003, pp. A499-A502, vol. 150, No. 4.
Wongwiriyapan, et al., "Direct Grotwh of Single-Walled Carbon Nanotube Networks on Alumina Substrate: A novel route to Ultrasensitive Gas Sensor Fabrication", Japanese Journal of Applied Physics, Nov. 9, 2005, pp. 8227-8230, vol. 44, No. 11.
Zuckerbrod, et al., "How Dry I Am: Optimizing Cell Performance Through Proper Component Drying," 15th International Seminar on Double Layer Capacitors and Hybrid Energy Storage Devices, Dec. 5-7, 2005, pp. 101-110.
International Search Report and Written Opinion for PCT/US2017/064152 dated Mar. 22, 2018.
[No Author Listed], New high-energy cathode material can significantly increase safety, life of lithium batteries. ECOPRO—Battery Material Division. Apr. 7, 2009. 16 pages.
Chen et al., The nanocomposites of carbon nanotube with Sb and SnSb0.5 as Li-ion battery anodes. Carbon. 2003;41(5):959-66. Epub Apr. 9, 2003.
Cui et al., Carbon-Silicon Core-Shell Nanowires as High Capacity Electrode for Lithium Ion Batteries. Nano Lett. 2009;9(9):3370-4. Epub Aug. 5, 2009.
Evanoff et al., Towards Ultrathick Battery Electrodes: Aligned Carbon Nanotube—Enabled Architecture. Advanced Materials. Jan. 24, 2012;24(4):533-7.
Farmer et al., Atomic Layer Deposition on Suspended Single-Walled Carbon Nanotubes via Gas-Phase Noncovalent Functionalization. Nano Lett. 2006;6(4):699-703. Epub Mar. 4, 2006.
Johnson et al., Thermocompression bonding of vertically aligned carbon nanotube turfs to metalized substrates. Nanotechnology. Jan. 15, 2009;20(6):065703. 6 pages.
Kurtz et al., Chemical vapor deposition of titanium nitride at low temperatures. Thin Solid Films. Jul. 1, 1986;140(2):277-90.
Lee et al., High-power lithium batteries from functionalized carbon-nanotube electrodes. Nature Nanotechnology. 2010;5:531-7. Epub Jun. 20, 2010.
Morris et al., High-energy, rechargeable Li-ion battery based on carbon nanotube technology. Journal of Power Sources. Nov. 15, 2004;138(1-2):277-80.
Ng et al., Single wall carbon nanotube paper as anode for lithium-ion battery. Electrochimica Acta. Oct. 5, 2005;51(1):23-8.
Schneuwly, et al. "Properties and applications of supercapacitors From the state-of-the-art to future trends" Proc. PCIM 2000. 10 pages.
Welna et al., Vertically aligned carbon nanotube electrodes for lithium-ion batteries. Journal of Power Sources. Feb. 1, 2011;196(3):1455-60.

* cited by examiner

| @ LINE FREQ. | ELECTROLYTIC | FastCAP HF #1 | FastCAP HF #2 |
|---|---|---|---|
| VOLUME (cc) | 128 | 35 | 20 |
| C (mF) | 18 | 63 | 36 |
| ESR (mΩ) | 16 | 32 | 57 |
| Vpp (mV) | 400 | 120 | 200 |
| LOSS (mW) | 288 | 91 | 144 |
| HOLD UP TIME (msec) | 20 | 77 | 44 |
| RATING (V) | 63 | 63 | 63 |

FIG. 10

| @ LINE FREQ. | ELECTROLYTIC | FastCAP HF #1 | FastCAP HF #2 |
|---|---|---|---|
| VOLUME (cc) | 333 | 19 | 10 |
| C (mF) | 30 | 90 | 47 |
| ESR (mΩ) | 6 | 19 | 36 |
| Vpp (mV) | 282 | 93 | 178 |
| LOSS (mW) | 120 | 78 | 149 |
| HOLD UP TIME (msec) | 10 | 30 | 15 |
| RATING (V) | 40 | 40 | 40 |

FIG. 11

| PARAMETER | UNITS | DEVICE VALUE |
|---|---|---|
| NOMINAL VOLTAGE | V | 3 |
| CAPACITANCE @ 100 Hz | mF | 194 |
| ESR @ 100 Hz | mΩ | 1.7 |
| CAPACITANCE @ 1 Hz | mF | 215 |
| ESR @ 1 Hz | mΩ | 35 |
| ENERGY @ 100 Hz | J | 0.87 |
| CUTOFF FREQUENCY | Hz | 500 |
| LENGTH | cm | 3.7 |
| WIDTH | cm | 5.1 |
| THICKNESS | mm | 1.6 |
| VOLUME | cc | 3 |

FIG. 12A

| PARAMETER | UNITS | DEVICE VALUE |
|---|---|---|
| NOMINAL VOLTAGE | V | 3 |
| CAPACITANCE @ 100 Hz | mF | 295 |
| ESR @ 100 Hz | mΩ | 1.4 |
| CAPACITANCE @ 1 Hz | mF | 330 |
| ESR @ 1 Hz | mΩ | 23 |
| ENERGY @ 100 Hz | J | 1.33 |
| CUTOFF FREQUENCY | Hz | 500 |
| LENGTH | cm | 3.7 |
| WIDTH | cm | 5.1 |
| THICKNESS | mm | 2.1 |
| VOLUME | cc | 3.95 |

FIG. 13A

| PARAMETER | UNITS | CELL A | CELL B | CELL C | CELL D | CELL E |
|---|---|---|---|---|---|---|
| NOMINAL VOLTAGE | V | 3 | 3 | 3 | 3 | 3 |
| CAPACITANCE @ 100 Hz | mF | 230 | 295 | 202 | 340 | 450 |
| ESR @ 100 Hz | mΩ | 5 | 1.4 | 2.0 | 0.9 | 0.7 |
| CAPACITANCE @ 1 Hz | mF | 500 | 330 | 226 | >500 | >500 |
| ESR @ 1 Hz | mΩ | 30 | 23 | 34 | <30 | <30 |
| ENERGY @ 100 Hz | J | 1 | 1.33 | 0.91 | 1.5 | 2 |
| FREQUENCY @ 45 DEG | Hz | 300 | 500 | 500 | 540 | 505 |
| LENGTH | cm | 3.7 | 3.7 | 3.7 | 3.7 | 3.7 |
| WIDTH | cm | 5.3 | 5.1 | 5.3 | 5.3 | 5.3 |
| THICKNESS | mm | 1.4 | 2.1 | 1.4 | 1.4 | 1.4 |
| VOLUME | cc | 2.7 | 3.95 | 2.7 | 2.7 | 2.7 |

FIG. 14

ULTRACAPACITORS WITH HIGH FREQUENCY RESPONSE

CROSS REFERENCE TO RELATED APPLICATION

The present application is a continuation of International Patent Application No. PCT/US2014/071998 filed Dec. 22, 2014, which in turn claims priority to U.S. Provisional Patent Application No. 61/919,692 filed Dec. 20, 2013 the contents of each of which are incorporated herein by reference.

STATEMENT REGARDING FEDERALLY SPONSORED RESEARCH

This invention was made with government support under Grant No. DE-AR0000035 awarded by the U.S. Department of Energy (ARPA-E). The U.S. government has certain rights in the invention.

BACKGROUND

1. Field of the Invention

The invention disclosed herein relates to energy storage cells, and in particular to techniques for providing an electric double-layer capacitor that is operable at high frequencies.

2. Description of the Related Art

Energy storage cells are ubiquitous in our society. While most people recognize an energy storage cell simply as a "battery," other types of cells may be included. For example, recently, ultracapacitors have garnered much attention as a result of their favorable characteristics. In short, many types of energy storage cells are known and in use today.

As a general rule, ultracapacitors have not performed well at high frequencies (e.g., of 10 Hz, 100 Hz, or more). Typical ultracapacitors deviate significantly from ideal capacitor behavior at such high frequencies. Accordingly, such capacitors have been unsuitable for use in high frequency applications, e.g., as energy storage elements in power factor correction devices.

SUMMARY

Applicants have developed various devices and techniques that provide electric double layer capacitors (EDLCs, also referred to herein as ultracapacitors or super capacitors) that operate well at higher frequencies, e.g., up to 100 Hz, 200, Hz, 300 Hz, 400, Hz, 500 Hz, or more.

In one aspect, an electric double layer capacitor (EDLC) is disclosed including: a first electrode including a first current collector and first plurality of carbon nanotubes (CNTs) disposed (e.g., formed) substantially directly upon the first current collector; a second electrode comprising a second current collector and second plurality of CNTs disposed (e.g., formed) substantially directly upon the second current collector; and an electrolyte disposed between and in contact with (e.g., wetting) the first and second electrodes.

In some embodiments, the EDLC is configured to have a capacitive frequency window comprising about 1 Hz to about 50 Hz. As used herein the term "capacitive frequency window" means the range of frequencies for which the magnitude of the phase shift of the capacitor is in the range of about 70 degrees to 90 degrees, and where the capacitance of capacitor is reduced by less than 3 decibels (dB) from the DC capacitance of the capacitor.

In another aspect, a method of making an EDLC is disclosed including: forming a first electrode, said forming comprising forming a first plurality of carbon nanotubes (CNTs) substantially directly a first current collector; forming a second electrode, said forming including forming a second plurality of carbon nanotubes (CNTs) substantially directly on a second current collector; and disposing an electrolyte between and in contact with the first and second electrodes. In some embodiments, forming the first and second pluralities of CNTs includes controlling the structure of the CNTs to configure the EDLC to have a capacitive frequency window comprising about 1 Hz to about 50 Hz.

In another aspect, an apparatus is disclosed including: a power factor correction device including at least one energy storage element configured to increase the power factor of power delivered to a load from an alternating current power source, where the energy storage element comprises at least one EDLC of the type described herein.

BRIEF DESCRIPTION OF THE DRAWINGS

The foregoing and other features and advantages of the invention are apparent from the following detailed description taken in conjunction with the accompanying drawings in which:

FIG. 10 shows performance characteristics for two ultracapacitor devices of the type described herein;

FIG. 11 shows performance characteristics for two ultracapacitor devices of the type described herein;

FIG. 12A shows performance characteristics for an ultracapacitor cell of the type described herein;

FIG. 13A shows performance characteristics for an ultracapacitor cell of the type described herein;

FIG. 14 shows performance characteristics for five different ultracapacitor cells of the type described herein;

DETAILED DESCRIPTION OF CERTAIN EMBODIMENTS

Figure 1A:
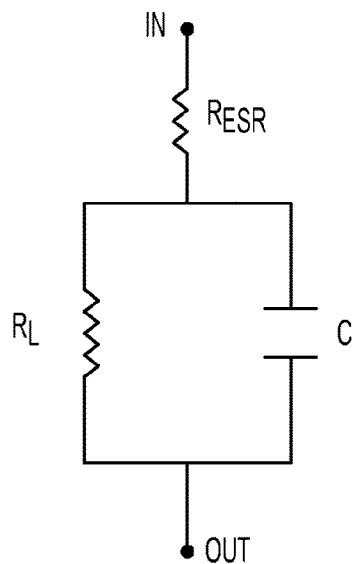
FIG. 1A shows a model for a capacitor.

Disclosed herein is a capacitor that provides users with improved performance in a wide range of frequencies. An ideal capacitor only stores and releases electrical energy, without dissipating any. In reality, all capacitors have imperfections within the capacitor's material that create resistance, and all capacitors experience some leakage of current across the capacitor FIG. 1A shows a model of a real capacitor as an ideal capacitor with capacitance C in series with a resistor $R_{ESL}$ having a resistance equal to the equivalent series resistance (ESR) of the capacitor, and in parallel with a leakage resistance $R_L$. For capacitors of the type described herein, $R_L$ is typically very large, and does not contribute significantly to the behavior of the capacitor at high frequencies.

Figure 1B:
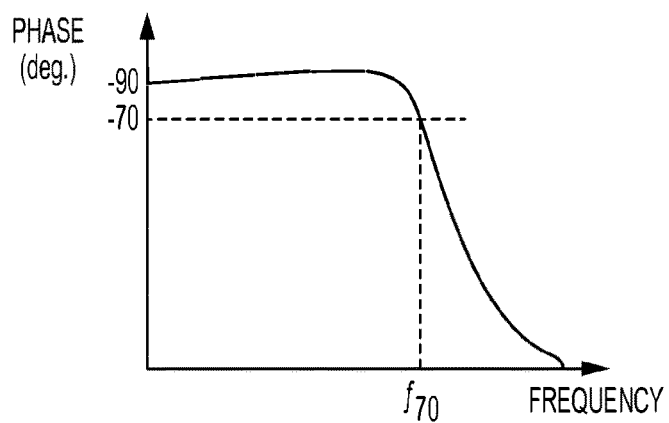
FIG. 1B shows a plot of phase shift versus frequency for an exemplary capacitor.
Figure 1C:
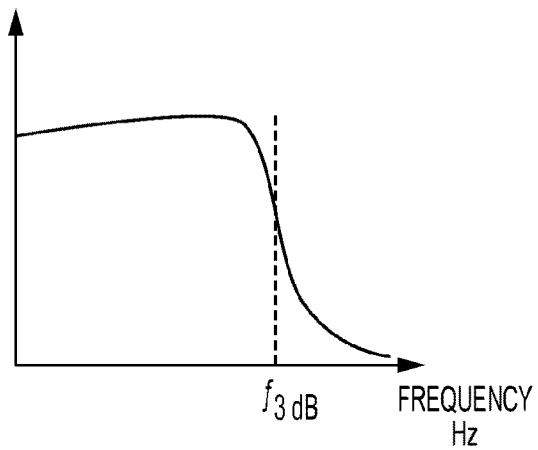
FIG. 1C shows a plot of capacitance versus frequency for an exemplary capacitor.

FIGS. 1C and 1B show, respectively, the capacitance of a real capacitor and the phase shift of a real capacitor as a function of the frequency of a voltage applied to the device. At lower frequencies, the magnitude of phase shift and capacitance remain essentially constant. However, as the operating frequency approaches a cutoff frequency, each of the magnitude of the phase shift and capacitance decreases sharply. The capacitance curve may be characterized by, e.g., a cutoff frequency $f_{3\ dB}$, the frequency at which the capacitance is reduced by 3 dB from the DC capacitance. The phase shift curve may be characterized by a 70 degree phase ship frequency $f_{70}$ at which the magnitude of the phase shift of the capacitor drops below 70 degrees.

Typically, each of these frequencies decrease with increased ESR of the capacitor. Accordingly, the Applicants have realized that good capacitive performance (e.g., performance similar to an ideal capacitor) at higher frequencies may be obtained by reducing the ESR of an ultracapacitor device. To provide some perspective, aspects of an exemplary embodiment are now introduced.

Figure 2A:
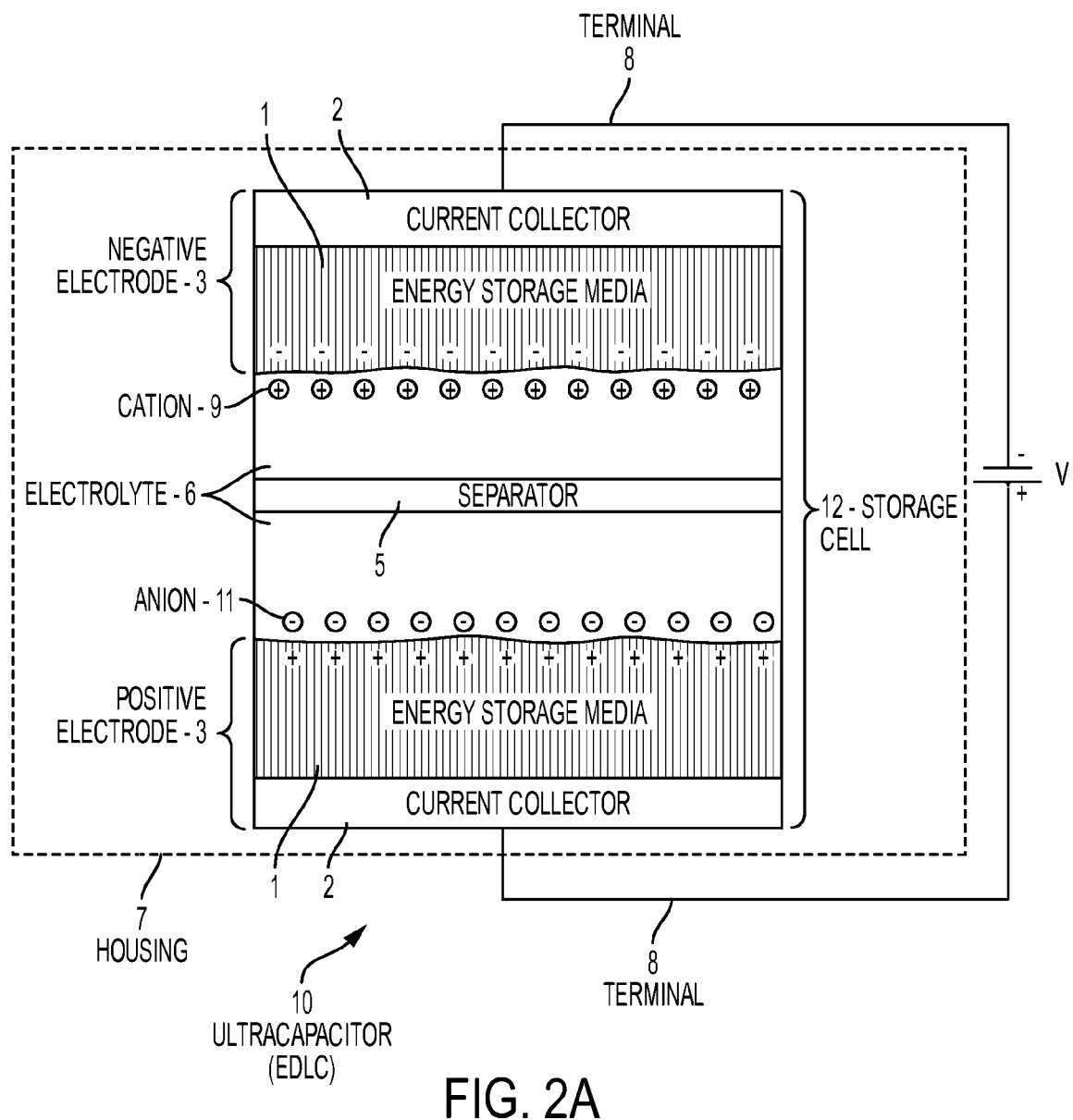
FIG. 2A illustrates aspects of an exemplary ultracapacitor that employs a separator.
Figure 2B:
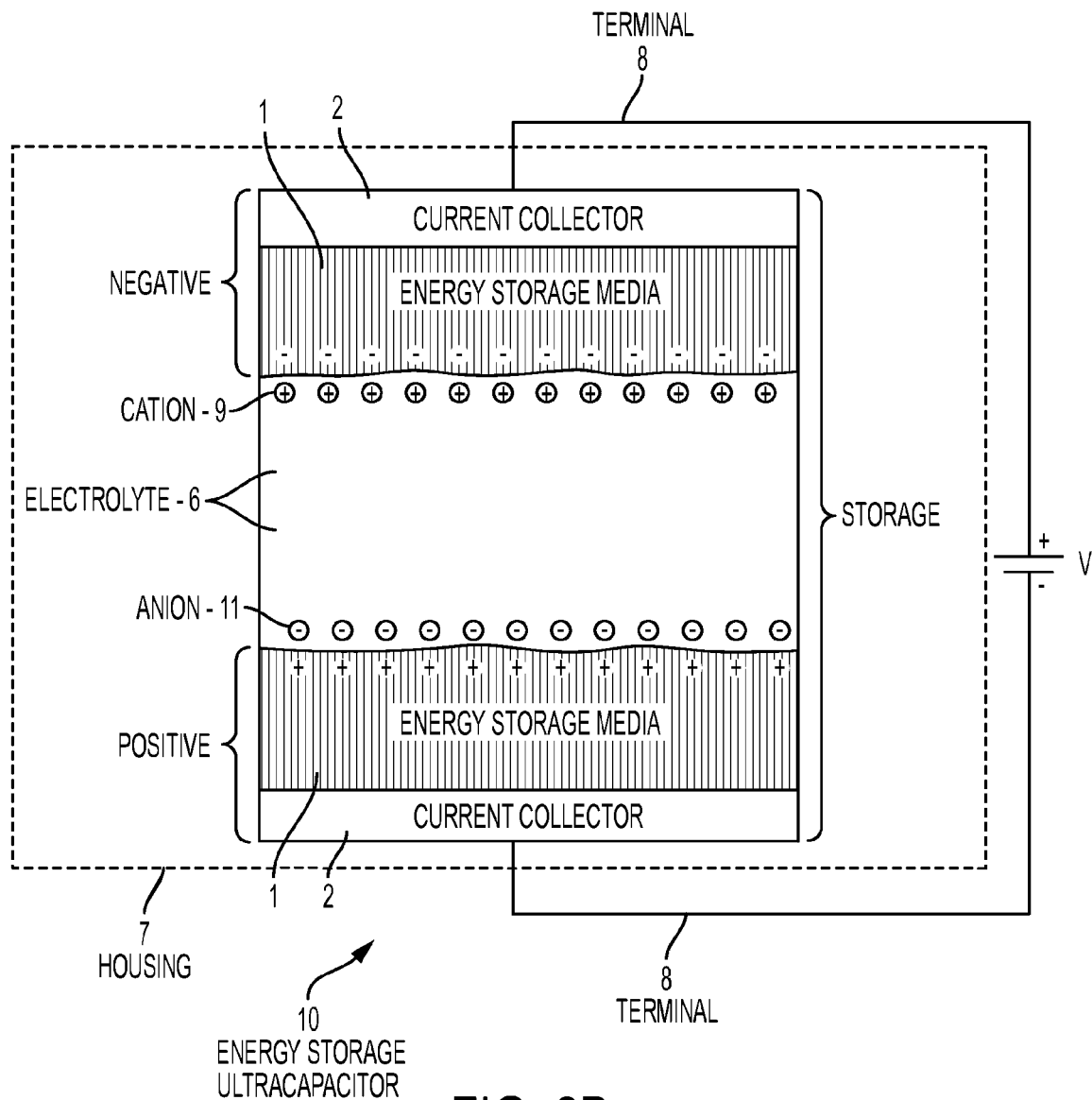
FIG. 2B illustrates aspects of an exemplary ultracapacitor without a separator.

As shown in FIGS. 2A and 2B, exemplary embodiments of a capacitor are shown. In each case, the capacitor is an "ultracapacitor 10." The difference between FIG. 2A and FIG. 2B is the inclusion of a separator in exemplary ultracapacitor 10 of FIG. 2A. The concepts disclosed herein generally apply equally to any exemplary ultracapacitor 10. Certain electrolytes of certain embodiments are uniquely suited to constructing an exemplary ultracapacitor 10 without a separator. Unless otherwise noted, the discussion herein applies equally to any ultracapacitor 10, with or without a separator.

The exemplary ultracapacitor 10 is an electric double-layer capacitor (EDLC). The EDLC includes at least one pair of electrodes 3 (where the electrodes 3 may be referred to as a negative electrode 3 and a positive electrode 3, merely for purposes of referencing herein). When assembled into the ultracapacitor 10, each of the electrodes 3 presents a double layer of charge at an electrolyte interface. In some embodiments, a plurality of electrodes 3 is included (for example, in some embodiments, at least two pairs of electrodes 3 are included). However, for purposes of discussion, only one pair of electrodes 3 are shown. As a matter of convention herein, at least one of the electrodes 3 uses a carbon-based energy storage media 1 (as discussed further herein) to provide energy storage. However, for purposes of discussion herein, it is generally assumed that each of the electrodes includes the carbon-based energy storage media 1. It should be noted that an electrolytic capacitor differs from an ultracapacitor because metallic electrodes differ greatly (at least an order of magnitude) in surface area.

Each of the electrodes 3 includes a respective current collector 2 (also referred to as a "charge collector"). In some embodiments, the electrodes 3 are separated by a separator 5. In general, the separator 5 is a thin structural material (usually a sheet) used to separate the negative electrode 3 from the positive electrode 3. The separator 5 may also serve to separate pairs of the electrodes 3. Once assembled, the electrodes 3 and the separator 5 provide a storage cell 12. Note that, in some embodiments, the carbon-based energy storage media 1 may not be included on one or both of the electrodes 3. That is, in some embodiments, a respective electrode 3 might consist of only the current collector 2. The material used to provide the current collector 2 could be roughened, anodized or the like to increase a surface area thereof. In these embodiments, the current collector 2 alone may serve as the electrode 3. With this in mind, however, as used herein, the term "electrode 3" generally refers to a combination of the energy storage media 1 and the current collector 2 (but this is not limiting, for at least the foregoing reason).

At least one form of electrolyte 6 is included in the ultracapacitor 10. The electrolyte 6 fills void spaces in and between the electrodes 3 and the separator 5. In general, the electrolyte 6 is a substance that disassociates into electrically charged ions. A solvent that dissolves the substance may be included in some embodiments of the electrolyte 6, as appropriate. The electrolyte 6 conducts electricity by ionic transport.

Generally, the storage cell 12 is formed into one of a wound form or prismatic form which is then packaged into a cylindrical or prismatic housing 7. However, other form factors may be used, e.g., as discussed below. Once the electrolyte 6 has been included, the housing 7 may be hermetically sealed. In various examples, the package is hermetically sealed by techniques making use of laser, ultrasonic, and/or welding technologies. In addition to providing robust physical protection of the storage cell 12, the housing 7 is configured with external contacts to provide electrical communication with respective terminals 8 within the housing 7. Each of the terminals 8, in turn, provides electrical access to energy stored in the energy storage media 1, generally through electrical leads which are coupled to the energy storage media 1.

As discussed herein, "hermetic" refers to a seal whose quality (i.e., leak rate) is defined in units of "atm-cc/second," which means one cubic centimeter of gas (e.g., He) per second at ambient atmospheric pressure and temperature. This is equivalent to an expression in units of "standard He-cc/sec." Further, it is recognized that 1 atm-cc/sec is equal to 1.01325 mbar-liter/sec. Generally, the ultracapacitor 10 disclosed herein is capable of providing a hermetic seal that has a leak rate no greater than about $5.0 \times 10^{-6}$ atm-cc/sec, and may exhibit a leak rate no higher than about $5.0 \times 10^{-10}$ atm-cc/sec. It is also considered that performance of a successfully hermetic seal is to be judged by the user, designer or manufacturer as appropriate, and that "hermetic" ultimately implies a standard that is to be defined by a user, designer, manufacturer or other interested party.

Leak detection may be accomplished, for example, by use of a tracer gas. Using tracer gas such as helium for leak testing is advantageous as it is a dry, fast, accurate and non destructive method. In one example of this technique, the ultracapacitor 10 is placed into an environment of helium. The ultracapacitor 10 is subjected to pressurized helium. The ultracapacitor 10 is then placed into a vacuum chamber that is connected to a detector capable of monitoring helium presence (such as an atomic absorption unit). With knowledge of pressurization time, pressure and internal volume, the leak rate of the ultracapacitor 10 may be determined.

In some embodiments, at least one lead (which may also be referred to herein as a "tab") is electrically coupled to a respective one of the current collectors 2. A plurality of the leads (accordingly to a polarity of the ultracapacitor 10) may be grouped together and coupled to into a respective terminal 8. In turn, the terminal 8 may be coupled to an electrical access, referred to as a "contact" (e.g., one of the housing 7 and an external electrode (also referred to herein for convention as a "feed-through" or "pin")). Consider now the energy storage media 1 in greater detail.

Storage Media

In the exemplary ultracapacitor 10, the energy storage media 1 is formed of carbon nanotubes. The energy storage media 1 may include other carbonaceous materials including, for example, activated carbon, carbon fibers, rayon, graphene, aerogel, carbon cloth, and a plurality of forms of carbon nanotubes. Activated carbon electrodes can be manufactured, for example, by producing a carbon base material by carrying out a first activation treatment to a carbon material obtained by carbonization of a carbon compound, producing a formed body by adding a binder to the carbon base material, carbonizing the formed body, and finally producing an active carbon electrode by carrying out a second activation treatment to the carbonized formed body. Carbon fiber electrodes can be produced, for example, by using paper or cloth pre-form with high surface area carbon fibers.

In some embodiments, the electrode of the ultracapacitor 10 includes a current collector comprising aluminum with an aluminum carbide layer on at least one surface, on which at least one layer of carbon nanotubes (CNTs) is disposed. The electrode may comprise vertically-aligned, horizontally-aligned, or nonaligned (e.g., tangled or clustered) CNTs. The electrode may comprise compressed CNTs. The electrode may comprise single-walled, double-walled, or multiwalled CNTs. The electrode may comprise multiple layers of CNTs. In some embodiments, the carbide layer includes elongated whisker structures with a nanoscale width. In some embodiments, the whiskers protrude into the layer of CNTs. In some embodiments, the whiskers protrude through an intervening layer (e.g., an oxide layer) into the layer of CNTs. Further details relating to electrodes of this type may be found in U.S. Provisional Patent Application No. 62/061,947 "ELECTRODE FOR ENERGY STORAGE DEVICE USING ANODIZED ALUMINUM" filed Oct. 9, 2014, the entire contents of which are incorporated herein by reference.

In an exemplary method for fabricating carbon nanotubes, an apparatus for producing an aligned carbon-nanotube aggregate includes apparatus for synthesizing the aligned carbon-nanotube aggregate on a base material having a catalyst (e.g., iron) on a surface thereof. The apparatus includes a formation unit that processes a formation step of causing an environment surrounding the catalyst to be an environment of a reducing gas and heating at least either the catalyst or the reducing gas; a growth unit that processes a growth step of synthesizing the aligned carbon-nanotube aggregate by causing the environment surrounding the catalyst to be an environment of a raw material gas and by heating at least either the catalyst or the raw material gas; and a transfer unit that transfers the base material at least from the formation unit to the growth unit. A variety of other methods and apparatus may be employed to provide the aligned carbon-nanotube aggregate. Further details of exemplary CNT formation techniques may be found in. e.g., PCT Application No. PCT/US12/45994, published Jan. 17, 2013; U.S. Patent Pub. No. 20130045157, published Feb. 21, 2013; U.S. Patent Pub. No. 20130044405, published Feb. 21, 201; PCT Application No. PCT/US13/27697, published Aug. 29, 2013; and PCT Application No. PCT/US14/599971, filed Oct. 9, 2014; the entire contents of each of which are incorporated herein by reference.

In some embodiments, material used to form the energy storage media 1 may include material other than pure carbon (and the various forms of carbon as may presently exist or be later devised). That is, various formulations of other materials may be included in the energy storage media 1. More specifically, and as a non-limiting example, at least one binder material may be used in the energy storage media 1, however, this is not to suggest or require addition of other materials (such as the binder material). In general, however, the energy storage media 1 is substantially formed of carbon, and may therefore referred to herein as a "carbonaceous material," as a "carbonaceous layer" and by other similar terms. In short, although formed predominantly of carbon, the energy storage media 1 may include any form of carbon (as well as any additives or impurities as deemed appropriate or acceptable) to provide for desired functionality as energy storage media 1.

In one set of embodiments, the carbonaceous material includes at least about 60% elemental carbon by mass, and in other embodiments at least about 75%, 85%, 90%, 95% or 98% by mass elemental carbon.

Carbonaceous material can include carbon in a variety forms, including carbon black, graphite, and others. The carbonaceous material can include carbon particles, including nanoparticles, such as nanotubes, nanorods, graphene sheets in sheet form, and/or formed into cones, rods, spheres (buckyballs) and the like.

Some embodiments of various forms of carbonaceous material suited for use in energy storage media 1 are provided herein as examples. These embodiments provide robust energy storage and are well suited for use in the electrode 3. It should be noted that these examples are illustrative and are not limiting of embodiments of carbonaceous material suited for use in energy storage media 1.

In general, the term "electrode" refers to an electrical conductor that is used to make contact to another material which is often non-metallic, in a device that may be incorporated into an electrical circuit. Generally, the term "electrode," as used herein, is with reference to the current collector 2 and the additional components as may accompany the current collector 2 (such as the energy storage media 1) to provide for desired functionality (for example, the energy storage media 1 which is mated to the current collector 2 to provide for energy storage and energy transmission). An exemplary process for complimenting the energy storage media 1 with the current collector 2 to provide the electrode 3 is now provided.

In embodiments where high frequency performance is desired, it may be desirable to configure the electrode 3 to reduce contributions to the ESR device from poor electrical contact between the energy storage media 1 and the current collector 2.

Figure 3:
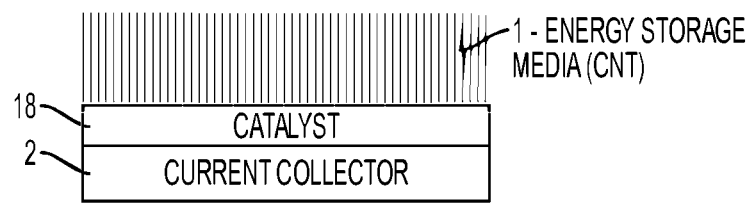
FIG. 3 is a block diagram depicting a plurality of carbon nanotubes (CNT) grown on a current collector.

For example, as shown in FIG. 3 in some embodiments, the energy storage media 1 is made up of a plurality of CNTs formed directly on the current collector 2 (e.g., using the techniques described above). In some such embodiments, the CNTs and the current collector may be separated only by a thin layer of a catalyst material 18 used during formation of the CNTs.

In some embodiments the CNTs are separated from the current collector 2 by only a thin regions of CNT growth catalyst material 18. For example, in embodiments where the catalyst material 18 self assembles into a plurality of nanodots (e.g., due to heating) during the CNT formation process, the regions of the catalyst material may include localized islands of material each proximal to a base of one of the CNTs.

In some embodiments the catalyst material 18 is no more than 1 μm, 100 nm, 50 nm, 40 nm, 30 nm, 20, nm, 15, nm, 10 nm, or less thick along a direction normal to a surface of the current collector 2. In some embodiments, the surface of the current collector 2 bearing the CNT is substantially free from materials (e.g., metal oxides) other than the catalyst material 18.

Because the electrode 3 will be placed in contact with electrolyte 6 in the ultracapacitor 10, in some embodiments the catalyst material 18 may be selected for low electrochemical reactivity with the electrolyte 6. In some embodiments, iron may be a suitable choice for catalyst material 18. In other embodiments, other materials having lower electrochemical reactivity that iron may be selected. For example, in some embodiments, the catalyst may be an oxidation and/or corrosion resistant allow such one of the Inconel family of alloys, available from Special Metals Corporation of New Hartford, N.Y., USA. In other embodiments, other alloys may be used, such as austenite (also known as gamma-phase iron) or various austenic alloys (e.g., nickel-chromium based alloys).

In some embodiments where a less reactive catalyst material 18 is used, the CNT growth processes of the type described herein may be modified, e.g., to provide additional CNT growth time to compensate for a slower CNT growth rate.

By forming the CNTs (e.g., vertically aligned CNTs) directly on the current collector 2, one may avoid increased resistance that may occur when transfer techniques (e.g., transfer tape based techniques) are used to transfer CNTs from a growth substrate onto a current collector.

In some embodiments, the electrical contact between the CNTs and the current collector 2 may be advantageously improved by using multi-wall CNTs (MWCNTs) that provide a relatively large contact area between the CNTs and the current collector 2. For example, in some embodiments the MWCNTs may have, on average, 2, 3, 4, 5, 10, 15, 25, 30 or more walls, e.g., in the range of 2 to 100 walls, or any sub-range thereof.

In some embodiments, the electrical contact between the CNTs and the current collector 2 may be advantageously improved by roughening the surface of the current collector 2 prior to forming the CNTs. In some embodiments, the surface may be roughed by an etch process (e.g., wet etching, dry etching, electrochemical etching, or the like) or any other suitable process (e.g., sand blasting or sputtering). Surface roughening may also increase the surface area of the resultant electrode 3. In some embodiments, the current collector 2 may be pattered to form nanostructures on the surface of the collector, e.g., to increase the surface area of the resultant electrode 3.

In some embodiments, the electrical contact between the CNTs and the current collector 2 may be advantageously improved by using relatively short nanotubes, e.g., having a average height of less than about 50 μm, 40 μm, 30 μm, 20 μm, 10 μm, 5 μm, or even less, e.g., in the range of 0.5 μm to 50 μm or any sub-range thereof. Note that while reducing the length of the CNTs may reduce the surface area of the energy storage media 1 (thereby potentially reducing the volumetric energy storage density of the media), it has been found that a suitable trade off may be found between energy density and high frequency performance. For example, in some embodiments, the height of the CNTs may be selected as the minimum height required to provide a desired cutoff frequency for the capacitor, thereby minimizing the corresponding loss of surface area.

In some embodiments, the high frequency performance of the ultracapacitor 10 may be improved by suitable choice of lateral spacing between the CNTs. For example, in some embodiments, the CNT's may be vertically aligned CNTs, and the lateral spacing between the CNTs may provide void spaces having a size that is several times the size of the anions or cations used in the electrolyte 6. For example, in some embodiments the spacing is greater than 2, 3, 4, 5, 6, 7, 8, 9, 10, 15, 20, 25, 30, 35, 40, 45, 50, 75, 100, or more times the anion or cation size.

Not wishing to be bound by theory, Applicants believe that wider CNT spacing may allow for faster motion of ions in and out of the electric double layer, thereby improving the high frequency response of the capacitor. Note that while increasing the spacing of the CNT may reduce the surface area of the energy storage media 1 (thereby potentially reducing the volumetric energy storage density of the media), it has been found that a suitable trade off may be found between energy density and high frequency performance. For example, in some embodiments, the spacing of the CNTs may be selected as the minimum spacing required to provide a desired cutoff frequency for the capacitor, thereby minimizing the loss of surface area.

In some embodiments the current collector 2 may be configured to further reduce the ESR of the ultracapacitor 10. In some embodiments, the current collector may be made of highly electrically conductive material, e.g., a metal such as silver, gold, copper, or aluminum. In some embodiments, the current collector 2 may be formed as a thin metallic layer, e.g., a metallic foil.

Electrodes

In instances where a large electrode 3 is desired, a plurality of the electrode elements may be mated. A plurality of the electrode elements may be mated by, for example, coupling a coupling to each electrode element of the plurality of electrode elements. The mated electrode elements provide for an embodiment of the electrode 3.

In some embodiments, the coupling is coupled to each of the electrode elements at a weld. Each of the welds may be provided as an ultrasonic weld. It has been found that ultrasonic welding techniques are particularly well suited to providing each weld. That is, in general, the aggregate of energy storage media 1 (e.g., CNT) is not compatible with welding, where only a nominal current collector, such as disclosed herein is employed. As a result, many techniques for joining electrode elements are disruptive, and damage the element. However, in other embodiments, other forms of coupling are used, and the coupling is not a weld.

The coupling may be a foil, a mesh, a plurality of wires or in other forms. Generally, the coupling is selected for properties such as conductivity and being electrochemically inert. In some embodiments, the coupling is fabricated from the same material(s) as are present in the current collector 2.

In some embodiments, the coupling is prepared by removing an oxide layer thereon. The oxide may be removed by, for example, etching the coupling before providing the weld. The etching may be accomplished, for example, with potassium hydroxide (KOH). The electrode 3 may be used in a variety of embodiments of the ultracapacitor 10. For example, the electrode 3 may be rolled up into a "jelly roll" type of energy storage.

Separator

The separator 5 may be fabricated from various materials. In some embodiments, the separator 5 is non-woven glass. The separator 5 may also be fabricated from fiberglass, ceramics and fluoro-polymers, such as polytetrafluoroethylene (PTFE), commonly marketed as TEFLON™ by DuPont Chemicals of Wilmington, Del. For example, using non-woven glass, the separator 5 can include main fibers and binder fibers each having a fiber diameter smaller than that of each of the main fibers and allowing the main fibers to be bonded together.

In some embodiments, e.g., where high frequency performance is desired, a tin separator may be used, thereby reducing the ESR of the capacitor. For example, in some embodiments, the separator 5 may be less than about 50 μm, 40 μm, 30 μm, 20 μm, 10 μm, 9 μm, 8 μm, 7 μm, 6 μm, 5 μm, 4 μm, 3 μm, 2 μm, 1 μm, or less, e.g., in the range of 1 μm to 50 μm, or any sub-range thereof.

For longevity of the ultracapacitor 10 and to assure performance at high temperature, the separator 5 may have a reduced amount of impurities and in particular, a very limited amount of moisture contained therein. In particular, it has been found that a limitation of about 200 ppm of moisture is desired to reduce chemical reactions and improve the lifetime of the ultracapacitor 10, and to provide for good performance in high temperature applications. Some embodiments of materials for use in the separator 5 include polyamide, polytetrafluoroethylene (PTFE), polyether-ether-ketone (PEEK), aluminum oxide ($Al_2O_3$), fiberglass, glass-reinforced plastic (GRP), polyester, nylon, and polyphenylene sulfide (PPS).

In general, materials used for the separator 5 are chosen according to moisture content, porosity, melting point, impurity content, resulting electrical performance, thickness, cost, availability and the like. In some embodiments, the separator 5 is formed of hydrophobic materials.

Accordingly, procedures may be employed to ensure excess moisture is eliminated from each separator 5. Among other techniques, a vacuum drying procedure may be used.

A selection of materials for use in the separator 5 is provided in Table 1. Some related performance data is provided in Table 2.

TABLE 1

Separator Materials

| Material | Melting point | PPM $H_2O$ unbaked | PPM $H_2O$ baked | Vacuum dry procedure |
|---|---|---|---|---|
| Polyamide | 256° C. | 2052 | 20 | 180° C. for 24 h |
| Polytetrafluoroethylene, PTFE | 327° C. | 286 | 135 | 150° C. for 24 h |
| Polyether ether ketone, PEEK | 256° C. | 130 | 50 | 215° C. for 12 h |
| Aluminum Oxide, $Al_2O_3$ | 330° C. | 1600 | 100 | 215° C. for 24 h |
| Fiberglass (GRP) | 320° C. | 2000 | 167 | 215° C. for 12 h |

TABLE 2

Separator Performance Data

| Material | μm | Porosity | ESR $1^{st}$ test (Ω) | ESR $2^{nd}$ test (Ω) | After 10 CV |
|---|---|---|---|---|---|
| Polyamide | 42 | Nonwoven | 1.069 | 1.069 | 1.213 |
| PEEK | 45 | Mesh | 1.665 | 1.675 | 2.160 |
| PEEK 60% | 25 | 60% | 0.829 | 0.840 | 0.883 |
| Fiberglass (GRP) | 160 | Nonwoven | 0.828 | 0.828 | 0.824 |
| Aluminum Oxide, $Al_2O_3$ | 25 | — | 2.400 | 2.400 | 2.400 |

In order to collect data for Table 2, two electrodes 3, based on carbonaceous material, were provided. The electrodes 3 were disposed opposite to and facing each other. Each of the separators 5 were placed between the electrodes 3 to prevent a short circuit. The three components were then wetted with electrolyte 6 and compressed together. Two aluminum bars and PTFE material was used as an external structure to enclose the resulting ultracapacitor 10.

The ESR $1^{st}$ test and ESR $2^{nd}$ test were performed with the same configuration one after the other. The second test was run five minutes after the first test, leaving time for the electrolyte 6 to further soak into the components.

Note that, in some embodiments, the ultracapacitor 10 does not require or include the separator 5. For example, in some embodiments, such as where the electrodes 3 are assured of physical separation by a geometry of construction, it suffices to have electrolyte 6 alone between the electrodes 3. More specifically, and as an example of physical separation, one such ultracapacitor 10 may include electrodes 3 that are disposed within a housing such that separation is assured on a continuous basis. A bench-top example would include an ultracapacitor 10 provided in a beaker.

Form Factor

The ultracapacitor 10 may be embodied in several different form factors (i.e., exhibit a certain appearance). Examples of potentially useful form factors include a cylindrical cell, an annular or ring-shaped cell, a flat prismatic cell or a stack of flat prismatic cells comprising a box-like cell, and a flat prismatic cell that is shaped to accommodate a particular geometry such as a curved space. A cylindrical form factor may be most useful in conjunction with a cylindrical tool or a tool mounted in a cylindrical form factor. An annular or ring-shaped form factor may be most useful in conjunction with a tool that is ring-shaped or mounted in a ring-shaped form factor. A flat prismatic cell shaped to accommodate a particular geometry may be useful to make efficient use of "dead space" (i.e., space in a tool or equipment that is otherwise unoccupied, and may be generally inaccessible).

While generally disclosed herein in terms of a "jelly roll" application (i.e., a storage cell that is configured for a cylindrically shaped housing), the rolled storage cell may take any form desired. For example, as opposed to rolling the storage cell, folding of the storage cell 12 may be performed to provide for the rolled storage cell. Other types of assembly may be used. As one example, the storage cell may be a flat cell, referred to as a "coin type" of cell. Accordingly, rolling is merely one option for assembly of the rolled storage cell. Therefore, although discussed herein in terms of being a "rolled storage cell", this is not limiting. It may be considered that the term "rolled storage cell" generally includes any appropriate form of packaging or packing the storage cell to fit well within a given design of the housing 7.

Various forms of the ultracapacitor 10 may be joined together. The various forms may be joined using known techniques, such as welding contacts together, by use of at least one mechanical connector, by placing contacts in electrical contact with each other and the like. A plurality of the ultracapacitors 10 may be electrically connected in at least one of a parallel and a series fashion.

Electrolytes

The electrolyte 6 includes a pairing of cations 9 and anions 11 and may include a solvent or other additives. The electrolyte 6 may be referred to as a "ionic liquid" as appropriate. Various combinations of cations 9, anions 11 and solvent may be used. In the exemplary ultracapacitor 10, the cations 9 may include at least one of tetrabutylammondium, 1-(3-Cyanopropyl)-3-methylimidazolium, 1,2-Dimethyl-3-propylimidazolium, 1,3-Bis(3-cyanopropyl)imidazolium, 1,3-Diethoxyimidazolium, 1-Butyl-1-methylpiperidinium, 1-Butyl-2,3-dimethylimidazolium, 1-Butyl-3-methylimidazolium, 1-Butyl-4-methylpyridinium, 1-Butylpyridinium, 1-Decyl-3-methylimidazolium, 1-Ethyl-3-methylimidazolium, 1-Pentyl-3-methylimidazolium, 1-Hexyl-3-methylimidazolium, 3-Methyl-1-propylpyridinium, and combinations thereof as well as other equivalents as deemed appropriate. Additional exemplary cations 9 include ammonium, imidazolium, pyrazinium, piperidinium, pyridinium, pyrimidinium, and pyrrolidinium (structures of which are depicted in FIG. 8). In the exemplary ultracapacitor 10, the anions 11 may include at least one of bis(trifluoromethanesulfonate)imide, tris(trifluoromethanesulfonate)methide, dicyanamide, tetrafluoroborate, tetra(cyano)borate, hexafluorophosphate, tris(pentafluoroethyl)trifluorophosphate, trifluoromethanesulfonate, bis(pentafluoroethanesulfonate)imide, thiocyanate, trifluoro(trifluoromethyl)borate, and combinations thereof as well as other equivalents as deemed appropriate.

The solvent may include acetonitrile, amides, benzonitrile, butyrolactone, cyclic ether, dibutyl carbonate, diethyl carbonate, diethylether, dimethoxyethane, dimethyl carbonate, dimethylformamide, dimethylsulfone, dioxane, dioxolane, ethyl formate, ethylene carbonate, ethylmethyl carbonate, lactone, linear ether, methyl formate, methyl propionate, methyltetrahydrofuran, nitrile, nitrobenzene, nitromethane, n-methylpyrrolidone, propylene carbonate, sulfolane, sulfone, tetrahydrofuran, tetramethylene sulfone, thiophene, ethylene glycol, diethylene glycol, triethylene glycol, polyethylene glycols, carbonic acid ester, γ-butyrolactone, nitrile, tricyanohexane, any combination thereof or other material(s) that exhibit appropriate performance characteristics.

In certain embodiments, electrolyte 6 may include one or more additional additives, e.g., gelling agents (e.g., silica or silicates), other inorganic or ceramic powders (e.g., alumina, titania, magnesia, aluminosilicates, or titanates such as $BaTiO_3$), clays (e.g., bentonite or montmorillonite and their derivatives), solvents, polymeric materials (including polymeric microbeads), plasticizers, and combinations thereof. Porous inorganic oxides are useful additives for providing a gel electrolyte. Exemplary additives include silica, silicates, alumina, titania, magnesia, aluminosilicates, zeolites, or titanates. For example, an electrolyte according to one embodiment of the present invention comprises an ionic liquid, e.g., one of the ionic liquids described herein, such as an ionic liquid comprising a cation, as described herein, and an anion, as described herein, and fumed silica as a gelling agent, which are mixed in a ratio to produce an ionic liquid gel. Certain embodiments may employ a different form of silica as a gelling agent, e.g., silica gel, mesoporous silica, or a microcrystalline or polycrystalline form of silica. The amount of the additive will vary according to the nature of the application and is typically in the range of about 2 wt. % to about 20 wt. %, e.g., about 5 wt. % to about 10 wt. %, in the range of potentially as much as about 50 wt. %, of the electrolyte. For example, FIG. 50 demonstrates the performance of two ultracapacitors of the present invention with different amounts (i.e., 6% vs. 8%) of silica of two different types (i.e., 7 nm vs. 14 nm), comparing the performance of those ultracapacitors at 200° C. to an ultracapacitor that employs an ionic liquid without an additive. The lifetime of the ultracapacitor with 6% of 7 nm silica was 650 hours and the lifetime of the ultracapacitor with 8% of 14 nm silica was 150 hours, whereas the lifetime of the ultracapacitor without any silica was 4 hours, wherein end of lifetime is determine as either a 50% increase in the ESR or a 50% decrease in the capacitance of the ultracapacitor. In these embodiments, impurities were also minimized in the ultracapacitor cell as described above, specifically less than 1,000 ppm moisture, less than 500 ppm moisture, and preferably less than 200 ppm moisture. In addition, other impurities were minimized in these embodiments as described above, particularly halide impurities and organic impurities.

In certain embodiments, an ultracapacitor comprising a gel electrolyte is disclosed. In some embodiments, an ultracapacitor is disclosed that is capable of maintaining its operational performance at temperatures in excess of 200° C. and up to 1V for more than 500 hours, particularly up to 1000 hours or higher.

As discussed herein, water and other contaminants may impede ultracapacitor performance. In certain embodiments, the additives described herein are dried or otherwise purified prior to incorporating them in an ultracapacitor or ultracapacitor electrolyte. The moisture content of the electrolyte comprising an additive, e.g., a gelling agent, should be comparable to the ranges described above, e.g., less than about 1000 ppm, preferably less than about 500 ppm.

In certain embodiments, ultracapacitors comprising a gel electrolyte of the present invention operate over a wide temperature range. In certain embodiments, ultracapacitors comprising a gel electrolyte do not require a separator.

A suitable concentration of additive will be determined based on the desired properties of the electrolyte and/or ultracapacitor, e.g., the viscosity of the electrolyte or the leakage current, capacitance, or ESR of the ultracapacitor. The specific surface area (SSA) also affects the properties of the electrolyte and the resultant ultracapacitor. Generally, a high SSA is desirable, e.g., above about 100 m²/g, above about 200 m²/g, about 400 m²/g, about 800 m²/g, or about 1000 m²/g. The viscosity of the electrolyte comprising the additive affects the performance of the resultant ultracapacitor and must be controlled by adding an appropriate amount of the additive.

In certain embodiments, where an appropriate gel-based electrolyte is employed, a separator-less ultracapacitor 10 can be prepared, as shown in FIG. 1B. A separator-less ultracapacitor 10 of FIG. 2B is prepared in a manner analogous a typical ultracapacitor having a separator, e.g., an ultracapacitor of FIG. 2A, except that the gel-based electrolyte is of a sufficient stability that a separator is not required.

In certain embodiments, a solid state polymeric electrolyte may be prepared and employed in an ultracapacitor. In such embodiments, a polymer containing an ionic liquid is cast by dissolving a polymer in a solvent together with an electrolyte and any other additives, e.g., e.g., gelling agents (e.g., silica or silicates), other inorganic or ceramic powders (e.g., alumina, titania, magnesia, aluminosilicates, or titanates such as $BaTiO_3$), clays (e.g., bentonite or montmorillonite and their derivatives), solvents, other polymeric materials, plasticizers, and combinations thereof. After drying the cast polymer electrolyte film can be incorporated into an ultracapacitor using the techniques for assembling ultracapacitors described herein, except that the polymer electrolyte replaces both the liquid (or gel) electrolyte and the separator in the ultracapacitor. The polymer film may also be cast directly onto the electrode of an ultracapacitor. Exemplary polymers include polyamide, polytetrafluoroethylene (PTFE), polyvinylidene fluoride-hexafluoropropylene copolymer (PVDF-HFP), polyether ether ketone (PEEK), CRAFT, sulfonated poly(ether ether ketone) (SPEEK), crosslinked sulfonated poly(ether ether ketone) (XSPEEK), and other polymer and copolymers stable at high temperature and appropriate for hermetic applications. FIG. 59 is a graph depicting the cyclic voltammetry performance of an ultracapacitor of the present invention that employs a solid state polymer electrolyte comprising PVDF-HFP copolymer and an ionic liquid without a separator. The ultracapacitor of this embodiment operates stably at voltages up to 4V and does not require a separator, which typically adversely affects the performance of ultracapacitors, although it is usually required to prevent internal short circuits.

The advanced electrolyte systems (AES) of the present invention comprise, in one embodiment, certain novel electrolytes for use in high temperature ultracapacitors. In this respect, it has been found that maintaining purity and low moisture relates to a degree of performance of the energy storage 10; and that the use of electrolytes that contain hydrophobic materials and which have been found to demonstrate greater purity and lower moisture content are advantageous for obtaining improved performance. These electrolytes exhibit good performance characteristics in a temperature range of about minus 40 degrees Celsius to about 250 degrees Celsius, e.g., about minus 10 degrees Celsius to about 250 degrees Celsius, e.g., about minus 5 degrees Celsius to about 250 degrees Celsius e.g., about 0 degrees Celsius to about 250 degrees Celsius e.g., about minus 20 degrees Celsius to about 200 degrees Celsius e.g., about 150 degrees Celsius to about 250 degrees Celsius e.g., about 150 degrees Celsius to about 220 degrees Celsius e.g., about 150 degrees Celsius to about 200 degrees Celsius e.g., about minus 10 degrees Celsius to about 210 degrees Celsius e.g., about minus 10 degrees Celsius to about 220 degrees Celsius e.g., about minus 10 degrees Celsius to about 230 degrees Celsius.

Accordingly, novel electrolyte entities useful as the advanced electrolyte system (AES) include species comprising a cation (e.g., cations shown in FIG. 5 and described herein) and an anion, or combinations of such species. In some embodiments, the species comprises a nitrogen-containing, oxygen-containing, phosphorus-containing, and/or sulfur-containing cation, including heteroaryl and heterocyclic cations. In one set of embodiments, the advanced electrolyte system (AES) include species comprising a cation selected from the group consisting of ammonium, imidazolium, oxazolium, phosphonium, piperidinium, pyrazinium, pyrazolium, pyridazinium, pyridinium, pyrimidinium, sulfonium, thiazolium, triazolium, guanidium, isoquinolinium, benzotriazolium, and viologen-type cations, any of which may be substituted with substituents as described herein. In one embodiment, the novel electrolyte entities useful for the advanced electrolyte system (AES) of the present invention include any combination of cations presented in FIG. 5, selected from the group consisting of phosphonium, piperidinium, and ammonium, wherein the various branch groups $R_x$ (e.g., $R_1$, $R_2$, $R_3$, ... $R_x$) may be selected from the group consisting of alkyl, heteroalkyl, alkenyl, heteroalkenyl, alkynyl, heteroalkynyl, halo, amino, nitro, cyano, hydroxyl, sulfate, sulfonate, and carbonyl, any of which is optionally substituted, and wherein at least two $R_x$ are not H (i.e., such that the selection and orientation of the R groups produce the cationic species shown in FIG. 8); and the anion selected from the group consisting of tetrafluoroborate, bis(trifluoromethylsulfonyl)imide, tetracyanoborate, and trifluoromethanesulfonate.

For example, given the combinations of cations and anions above, in a particular embodiment, the AES may be selected from the group consisting of trihexyltetradecylphosphonium bis(trifluoromethylsulfonyl)imide, 1-butyl-1-methylpiperidinium bis(trifluoromethylsulfonyl) imide, and butyltrimethylammonium bis(trifluoromethylsulfonyl)imide.

In certain embodiments, the AES is trihexyltetradecylphosphonium bis(trifluoromethylsulfonyl)imide.

In certain embodiments, the AES is 1-butyl-1-methylpiperidinium bis(trifluoromethylsulfonyl)imide.

In certain embodiments, the AES is butyltrimethylammonium bis(trifluoromethylsulfonyl)imide.

In another embodiment, the novel electrolyte entities useful for the advanced electrolyte system (AES) of the present invention include any combination of cations presented in FIG. 8, selected from the group consisting of imidazolium and pyrrolidinium, wherein the various branch groups $R_x$ (e.g., $R_1$, $R_2$, $R_3$, ... $R_x$) may be selected from the group consisting of alkyl, heteroalkyl, alkenyl, heteroalkenyl, alkynyl, heteroalkynyl, halo, amino, nitro, cyano, hydroxyl, sulfate, sulfonate, and carbonyl, any of which is optionally substituted, and wherein at least two $R_x$ are not H (i.e., such that the selection and orientation of the R groups produce the cationic species shown in FIG. 8); and the anion selected from the group consisting of tetrafluoroborate, bis(trifluoromethylsulfonyl)imide, tetracyanoborate, and trifluoromethanesulfonate. In one particular embodiment, the two $R_x$ that are not H, are alkyl. Moreover, the noted cations exhibit high thermal stability, as well as high conductivity and exhibit good electrochemical performance over a wide range of temperatures.

For example, given the combinations of cations and anions above, in a particular embodiment, the AES may be selected from the group consisting of 1-butyl-3-methylimidazolium tetrafluoroborate; 1-butyl-3-methylimidazolium bis(trifluoromethylsulfonyl)imide, 1-ethyl-3-methylimidazolium tetrafluoroborate; 1-ethyl-3-methylimidazolium tetracyanoborate; 1-hexyl-3-methylimidazolium tetracyanoborate; 1-butyl-1-methylpyrrolidinium bis(trifluoromethylsulfonyl)imide; 1-butyl 1-methylpyrrolidinium tris(pentafluoroethyl)trifluorophosphate; 1-butyl-1-methylpyrrolidinium tetracyanoborate, and 1-butyl-3-methylimidazolium trifluoromethanesulfonate.

In one embodiment, the AES is 1-butyl-3-methylimidazolium tetrafluoroborate.

In one embodiment, the AES is 1-butyl-3-methylimidazolium bis(trifluoromethylsulfonyl)imide.

In one embodiment, the AES is 1-ethyl-3-methylimidazolium tetrafluoroborate.

In one embodiment, the AES is 1-ethyl-3-methylimidazolium tetracyanoborate.

In one embodiment, the AES is 1-hexyl-3-methylimidazolium tetracyanoborate.

In one embodiment, the AES is 1-butyl-1-methylpyrrolidinium bis(trifluoromethylsulfonyl)imide.

In one embodiment, the AES is 1-butyl-1-methylpyrrolidinium tris(pentafluoroethyl)trifluorophosphate.

In one embodiment, the AES is 1-butyl-1-methylpyrrolidinium tetracyanoborate.

In one embodiment, the AES is 1-butyl-3-methylimidazolium trifluoromethanesulfonate.

In another particular embodiment, one of the two $R_x$ that are not H, is alkyl, e.g., methyl, and the other is an alkyl substituted with an alkoxy. Moreover, it has been found that cations having an N,O-acetal skeleton structure of the formula (1) in the molecule have high electrical conductivity, and that an ammonium cation included among these cations and having a pyrrolidine skeleton and an N,O-acetal group is especially high in electrical conductivity and solubility in organic solvents and supports relatively high voltage. As such, in one embodiment, the advanced electrolyte system comprises a salt of the following formula:

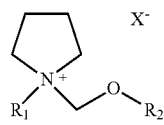

(1)

wherein R1 and R2 can be the same or different and are each alkyl, and X− is an anion. In some embodiments, $R_1$ is straight-chain or branched alkyl having 1 to 4 carbon atoms, $R_2$ is methyl or ethyl, and X⁻ is a cyanoborate-containing anion 11. In a specific embodiment, X⁻ comprises [B(CN)]$_4$ and $R_2$ is one of a methyl and an ethyl group. In another specific embodiment, $R_1$ and $R_2$ are both methyl. In addition, in one embodiment, cyanoborate anions 11, X⁻ suited for the advanced electrolyte system of the present invention include, [B(CN)4]⁻ or [BFn(CN)4-n]⁻, where n=0, 1, 2 or 3.

Examples of cations of the AES of the present invention comprising a Novel Electrolyte Entity of formula (1), and which are composed of a quaternary ammonium cation shown in formula (I) and a cyanoborate anion are selected from N-methyl-N-methoxymethylpyrrolidinium (N-methoxymethyl-N-methylpyrrolidinium), N-ethyl-N-methoxymethylpyrrolidinium, N-methoxymethyl-N-n-propylpyrrolidinium, N-methoxymethyl-N-iso-propylpyrrolidinium, N-n-butyl-N-methoxymethylpyrrolidinium, N-iso-butyl-N-methoxymethylpyrrolidinium, N-tert-butyl-N-methoxymethylpyrrolidinium, N-ethoxymethyl-N-methylpyrrolidinium, N-ethyl-N-ethoxymethylpyrrolidinium (N-ethoxymethyl-N-ethylpyrrolidinium), N-ethoxymethyl-N-n-propylpyrrolidinium, N-ethoxymethyl-N-iso-propylpyrrolidinium, N-n-butyl-N-ethoxymethylpyrrolidinium, N-iso-butyl-N-ethoxymethylpyrrolidinium and N-tert-butyl-N-ethoxymethylpyrrolidinium. Other examples include N-methyl-N-methoxymethylpyrrolidinium (N-methoxymethyl-N-methylpyrrolidinium), N-ethyl-N-methoxymethylpyrrolidinium and N-ethoxymethyl-N-methylpyrrolidinium.

Additional examples of the cation of formula (1) in combination with additional anions may be selected from N-methyl-N-methoxymethylpyrrolidinium tetracyanoborate (N-methoxymethyl-N-methylpyrrolidinium tetracyanoborate), N-ethyl-N-methoxymethylpyrrolidinium tetracyanoborate, N-ethoxymethyl-N-methylpyrrolidinium tetracyanoborate, N-methyl-N-methoxymethylpyrrolidinium bistrifluoromethanesulfonylimide, (N-methoxymethyl-N-methylpyrrolidinium bistrifluoromethanesulfonylimide), N-ethyl-N-methoxymethylpyrrolidinium bistrifluoromethanesulfonylimide, N-ethoxymethyl-N-methylpyrrolidinium bistrifluoromethanesulfonylimide, N-methyl-N-methoxymethylpyrrolidinium trifluoromethanesulfolate (N-methoxymethyl-N-methyltrifluoromethanesulfolate).

When to be used as an electrolyte, the quaternary ammonium salt may be used as admixed with a suitable organic solvent. Useful solvents include cyclic carbonic acid esters, chain carbonic acid esters, phosphoric acid esters, cyclic ethers, chain ethers, lactone compounds, chain esters, nitrile compounds, amide compounds and sulfone compounds. Examples of such compounds are given below although the solvents to be used are not limited to these compounds.

Examples of cyclic carbonic acid esters are ethylene carbonate, propylene carbonate, butylene carbonate and the like, among which propylene carbonate is preferable.

Examples of chain carbonic acid esters are dimethyl carbonate, ethylmethyl carbonate, diethyl carbonate and the like, among which dimethyl carbonate and ethylmethyl carbonate are preferred.

Examples of phosphoric acid esters are trimethyl phosphate, triethyl phosphate, ethyldimethyl phosphate, diethylmethyl phosphate and the like. Examples of cyclic ethers are tetrahydrofuran, 2-methyltetrahydrofuran and the like. Examples of chain ethers are dimethoxyethane and the like. Examples of lactone compounds are γ-butyrolactone and the like. Examples of chain esters are methyl propionate, methyl acetate, ethyl acetate, methyl formate and the like. Examples of nitrile compounds are acetonitrile and the like. Examples of amide compounds are dimethylformamide and the like. Examples of sulfone compounds are sulfolane, methyl sulfolane and the like. Cyclic carbonic acid esters, chain carbonic acid esters, nitrile compounds and sulfone compounds may be particularly desirable, in some embodiments.

These solvents may be used singly, or at least two kinds of solvents may be used in admixture. Examples of preferred organic solvent mixtures are mixtures of cyclic carbonic acid ester and chain carbonic acid ester such as those of ethylene carbonate and dimethyl carbonate, ethylene carbonate and ethylmethyl carbonate, ethylene carbonate and diethyl carbonate, propylene carbonate and dimethyl carbonate, propylene carbonate and ethylmethyl carbonate and propylene carbonate and diethyl carbonate, mixtures of chain carbonic acid esters such as dimethyl carbonate and ethylmethyl carbonate, and mixtures of sulfolane compounds such as sulfolane and methylsulfolane. More preferable are mixtures of ethylene carbonate and ethylmethyl carbonate, propylene carbonate and ethylmethyl carbonate, and dimethyl carbonate and ethylmethyl carbonate.

In some embodiments, when the quaternary ammonium salt of the invention is to be used as an electrolyte, the electrolyte concentration is at least 0.1 M, in some cases at least 0.5 M and may be at least 1 M. If the concentration is less than 0.1 M, low electrical conductivity will result, producing electrochemical devices of impaired performance. The upper limit concentration is a separation concentration when the electrolyte is a liquid salt at room temperature. When the solution does not separate, the limit concentration is 100%. When the salt is solid at room temperature, the limit concentration is the concentration at which the solution is saturated with the salt.

In certain embodiments, the advanced electrolyte system (AES) may be admixed with electrolytes other than those disclosed herein provided that such combination does not significantly affect the advantages achieved by utilization of the advanced electrolyte system, e.g., by altering the performance or durability characteristics by greater than 10%. Examples of electrolytes that may be suited to be admixed with the AES are alkali metal salts, quaternary ammonium salts, quaternary phosphonium salts, etc. These electrolytes may be used singly, or at least two kinds of them are usable in combination, as admixed with the AES disclosed herein. Useful alkali metal salts include lithium salts, sodium salts and potassium salts. Examples of such lithium salts are lithium hexafluorophosphate, lithium borofluoride, lithium perchlorate, lithium trifluoromethanesulfonate, sulfonylimide lithium, sulfonylmethide lithium and the like, which nevertheless are not limitative. Examples of useful sodium salts are sodium hexafluorophosphate, sodium borofluoride, sodium perchlorate, sodium trifluoromethanesulfonate, sulfonylimide sodium, sulfonylmethide sodium and the like. Examples of useful potassium salts are potassium hexafluorophosphate, potassium borofluoride, potassium perchlorate, potassium trifluoromethanesulfonate, sulfonylimide potassium, sulfonylmethide potassium and the like although these are not limitative.

Useful quaternary ammonium salts that may be used in the combinations described above (i.e., which do not significantly affect the advantages achieved by utilization of the advanced electrolyte system) include tetraalkylammonium salts, imidazolium salts, pyrazolium salts, pyridinium salts, triazolium salts, pyridazinium salts, etc., which are not limitative. Examples of useful tetraalkylammonium salts are tetraethylammonium tetracyanoborate, tetramethylammonium tetracyanoborate, tetrapropylammonium tetracyanoborate, tetrabutylammonium tetracyanoborate, triethylmethylammonium tetracyanoborate, trimethylethylammonium tetracyanoborate, dimethyldiethylammonium tetracyanoborate, trimethylpropylammonium tetracyanoborate, trimethylbutylammonium tetracyanoborate, dimethylethylpropylammonium tetracyanoborate, methylethylpropylbutylammonium tetracyanoborate, N,N-dimethylpyrrolidinium tetracyanoborate, N-ethyl-N-methylpyrrolidinium tetracyanoborate, N-methyl-N-propylpyrrolidinium tetracyanoborate, N-ethyl-N-propylpyrrolidinium tetracyanoborate, N,N-dimethylpiperidinium tetracyanoborate, N-methyl-N-ethylpiperidinium tetracyanoborate, N-methyl-N-propylpiperidinium tetracyanoborate, N-ethyl-N-propylpiperidinium tetracyanoborate, N,N-dimethylmorpholinium tetracyanoborate, N-methyl-N-ethylmorpholinium tetracyanoborate, N-methyl-N-propylmorpholinium tetracyanoborate, N-ethyl-N-propylmorpholinium tetracyanoborate and the like, whereas these examples are not limitative.

Examples of imidazolium salts that may be used in the combinations described above (i.e., which do not significantly affect the advantages achieved by utilization of the advanced electrolyte system) include 1,3-dimethylimidazolium tetracyanoborate, 1-ethyl-3-methylimidazolium tetracyanoborate, 1,3-diethylimidazolium tetracyanoborate, 1,2-dimethyl-3-ethylimidazolium tetracyanoborate and 1,2-dimethyl-3-propylimidazolium tetracyanoborate, but are not limited to these. Examples of pyrazolium salts are 1,2-dimethylpyrazolium tetracyanoborate, 1-methyl-2-ethylpyrazolium tetracyanoborate, 1-propyl-2-methylpyrazolium tetracyanoborate and 1-methyl-2-butylpyrazolium tetracyanoborate, but are not limited to these. Examples of pyridinium salts are N-methylpyridinium tetracyanoborate, N-ethylpyridinium tetracyanoborate, N-propylpyridinium tetracyanoborate and N-butylpyridinium tetracyanoborate, but are not limited to these. Examples of triazolium salts are 1-methyltriazolium tetracyanoborate, 1-ethyltriazolium tetracyanoborate, 1-propyltriazolium tetracyanoborate and 1-butyltriazolium tetracyanoborate, but are not limited to these. Examples of pyridazinium salts are 1-methylpyridazinium tetracyanoborate, 1-ethylpyridazinium tetracyanoborate, 1-propylpyridazinium tetracyanoborate and 1-butylpyridazinium tetracyanoborate, but are not limited to these. Examples of quaternary phosphonium salts are tetraethylphosphonium tetracyanoborate, tetramethylphosphonium tetracyanoborate, tetrapropylphosphonium tetracyanoborate, tetrabutylphosphonium tetracyanoborate, triethylmethylphosphonium tetrafluoroborate, trimethylethylphosphonium tetracyanoborate, dimethyldiethylphosphonium tetracyanoborate, trimethylpropylphosphonium tetracyanoborate, trimethylbutylphosphonium tetracyanoborate, dimethylethylpropylphosphonium tetracyanoborate, methylethylpropylbutylphosphonium tetracyanoborate, but are not limited to these.

Another exemplary ultracapacitor tested included an AES comprising 1-butyl-3-methylimidazolium bis(trifluoromethylsulfonyl)imide.

Another exemplary ultracapacitor tested included an AES comprising 1-ethyl-3-methylimidazolium tetrafluoroborate.

Another exemplary ultracapacitor tested included an AES comprising 1-ethyl-3-methylimidazolium tetracyanoborate.

Another exemplary ultracapacitor tested included an AES comprising 1-hexyl-3-methylimidazolium tetracyanoborate.

Another exemplary ultracapacitor tested included an AES comprising 1-butyl-1-methylpyrrolidinium bis(trifluoromethylsulfonyl)imide Another exemplary ultracapacitor tested included an AES comprising 1-butyl-1-methylpyrrolidinium tris(pentafluoroethyl)trifluorophosphate.

Another exemplary ultracapacitor tested included an AES comprising 1-butyl-1-methylpyrrolidinium tetracyanoborate.

Another exemplary ultracapacitor tested included an AES comprising 1-butyl-3-methylimidazolium trifluoromethanesulfonate.

Another exemplary ultracapacitor tested included an AES comprising 1-ethyl-3-methylimidazolium tetracyanoborate.

Another exemplary ultracapacitor tested included an AES comprising 1-ethyl-3-methylimidazolium and 1-butyl-1-methylpyrrolidinium and tetracyanoborate.

Another exemplary ultracapacitor tested included an AES comprising 1-butyl-1-methylpyrrolidinium and tetracyanoborate and ethyl isopropyl sulfone.

In certain embodiments, the novel electrolytes selected herein for use the advanced electrolyte systems may also be purified. Such purification may be performed using art-recognized techniques or the techniques provided herein. This purification may further improve the characteristics of the Novel Electrolyte Entities described herein.

The advanced electrolyte systems of the present comprise, in one embodiment, certain highly purified electrolytes for use in high temperature ultracapacitors. In certain embodiments. The highly purified electrolytes that comprise the AES of the present invention are those electrolytes described below as well as those novel electrolytes described above purified by the purification process described herein. The purification methods provided herein produce impurity levels that afford an advanced electrolyte system with enhanced properties for use in high temperature applications, e.g., high temperature ultracapacitors, for example in a temperature range of about minus 40 degrees Celsius to about 250 degrees Celsius, e.g., about minus 10 degrees Celsius to about 250 degrees Celsius, e.g., about minus 5 degrees Celsius to about 250 degrees Celsius e.g., about 0 degrees Celsius to about 250 degrees Celsius e.g., about minus 20 degrees Celsius to about 200 degrees Celsius e.g., about 150 degrees Celsius to about 250 degrees Celsius e.g., about 150 degrees Celsius to about 220 degrees Celsius e.g., about 150 degrees Celsius to about 200 degrees Celsius, e.g., about minus 10 degrees Celsius to about 210 degrees Celsius e.g., about minus 10 degrees Celsius to about 220 degrees Celsius e.g., about minus 10 degrees Celsius to about 230 degrees Celsius.

Obtaining improved properties of the ultracapacitor 10 results in a requirement for better electrolyte systems than presently available. For example, it has been found that increasing the operational temperature range may be achieved by the significant reduction/removal of impurities from certain forms of known electrolytes. Impurities of particular concern include water, halide ions (chloride, bromide, fluoride, iodide), free amines (ammonia), sulfate, and metal cations (Ag, Al, Ba, Ca, Cd, Co, Cr, Cu, Fe, K, Li, Mg, Mn, Mo, Na, Ni, Pb, Sr, Ti, Zn). The highly purified electrolyte product of such purification provides electrolytes that are surprisingly far superior to the unpurified electrolyte, and as such, fall with the advanced electrolyte systems of the present invention.

In a particular embodiment, the present invention provides a purified mixture of cation 9 and anion 11 and, in some instances a solvent, which may serve as the AES of the present invention which comprises less than about 5000 parts per million (ppm) of chloride ions; less than about 1000 ppm of fluoride ions; and/or less than about 1000 ppm of water (e.g. less than about 2000 ppm of chloride ions; less than about less than about 200 ppm of fluoride ions; and/or less than about 200 ppm of water, e.g. less than about 1000 ppm of chloride ions; less than about less than about 100 ppm of fluoride ions; and/or less than about 100 ppm of water, e.g. less than about 500 ppm of chloride ions; less than about less than about 50 ppm of fluoride ions; and/or less than about 50 ppm of water, e.g. less than about 780 parts per million of chloride ions; less than about 11 parts per million of fluoride ions; and less than about 20 parts per million of water.)

Generally, impurities in the purified electrolyte are removed using the methods of purification described herein. For example, in some embodiments, a total concentration of halide ions (chloride, bromide, fluoride, iodide), may be reduced to below about 1,000 ppm. A total concentration of metallic species (e.g., Cd, Co, Cr, Cu, Fe, K, Li, Mo, Na, Ni, Pb, Zn, including an at least one of an alloy and an oxide thereof), may be reduced to below about 1,000 ppm. Further, impurities from solvents and precursors used in the synthesis process may be reduced to below about 1,000 ppm and can include, for example, bromoethane, chloroethane, 1-bromobutane, 1-chlorobutane, 1-methylimidazole, ethyl acetate, methylene chloride and so forth.

In some embodiments, the impurity content of the ultracapacitor 10 has been measured using ion selective electrodes and the Karl Fischer titration procedure, which has been applied to electrolyte 6 of the ultracapacitor 10. In certain embodiments, it has been found that the total halide content in the ultracapacitor 10 according to the teachings herein has been found to be less than about 200 ppm of halides ($Cl^-$ and $F^-$) and water content is less than about 100 ppm.

Impurities can be measured using a variety of techniques, such as, for example, Atomic Absorption Spectrometry (AAS), Inductively Coupled Plasma-Mass Spectrometry (ICPMS), or simplified solubilizing and electrochemical sensing of trace heavy metal oxide particulates. AAS is a spectro-analytical procedure for the qualitative and quantitative determination of chemical elements employing the absorption of optical radiation (light) by free atoms in the gaseous state. The technique is used for determining the concentration of a particular element (the analyte) in a sample to be analyzed. AAS can be used to determine over seventy different elements in solution or directly in solid samples. ICPMS is a type of mass spectrometry that is highly sensitive and capable of the determination of a range of metals and several non-metals at concentrations below one part in $10^{12}$ (part per trillion). This technique is based on coupling together an inductively coupled plasma as a method of producing ions (ionization) with a mass spectrometer as a method of separating and detecting the ions. ICPMS is also capable of monitoring isotopic speciation for the ions of choice.

Additional techniques may be used for analysis of impurities. Some of these techniques are particularly advantageous for analyzing impurities in solid samples. Ion Chromatography (IC) may be used for determination of trace levels of halide impurities in the electrolyte 6 (e.g., an ionic liquid). One advantage of Ion Chromatography is that relevant halide species can be measured in a single chromatographic analysis. A Dionex AS9-HC column using an eluent consisting 20 mM NaOH and 10% (v/v) acetonitrile is one example of an apparatus that may be used for the quantification of halides from the ionic liquids. A further technique is that of X-ray fluorescence.

X-ray fluorescence (XRF) instruments may be used to measure halogen content in solid samples. In this technique, the sample to be analyzed is placed in a sample cup and the sample cup is then placed in the analyzer where it is irradiated with X-rays of a specific wavelength. Any halogen atoms in the sample absorb a portion of the X-rays and then reflect radiation at a wavelength that is characteristic for a given halogen. A detector in the instrument then quantifies the amount of radiation coming back from the halogen atoms and measures the intensity of radiation. By knowing the surface area that is exposed, concentration of halogens in the sample can be determined. A further technique for assessing impurities in a solid sample is that of pyrolysis.

Adsorption of impurities may be effectively measured through use of pyrolysis and microcoulometers. Microcoulometers are capable of testing almost any type of material for total chlorine content. As an example, a small amount of sample (less than 10 milligrams) is either injected or placed into a quartz combustion tube where the temperature ranges from about 600 degrees Celsius to about 1,000 degrees Celsius. Pure oxygen is passed through the quartz tube and any chlorine containing components are combusted completely. The resulting combustion products are swept into a titration cell where the chloride ions are trapped in an electrolyte solution. The electrolyte solution contains silver ions that immediately combine with any chloride ions and drop out of solution as insoluble silver chloride. A silver electrode in the titration cell electrically replaces the used up silver ions until the concentration of silver ions is back to where it was before the titration began. By keeping track of the amount of current needed to generate the required amount of silver, the instrument is capable of determining how much chlorine was present in the original sample. Dividing the total amount of chlorine present by the weight of the sample gives the concentration of chlorine that is actually in the sample. Other techniques for assessing impurities may be used.

Surface characterization and water content in the electrode 3 may be examined, for example, by infrared spectroscopy techniques. The four major absorption bands at around 1130, 1560, 3250 and 2300 cm$^{-1}$, correspond to $vC=O$ in, $vC=C$ in aryl, $vO-H$ and $vC-N$, respectively. By measuring the intensity and peak position, it is possible to quantitatively identify the surface impurities within the electrode 3.

Another technique for identifying impurities in the electrolyte 6 and the ultracapacitor 10 is Raman spectroscopy. This spectroscopic technique relies on inelastic scattering, or Raman scattering, of monochromatic light, usually from a laser in the visible, near infrared, or near ultraviolet range. The laser light interacts with molecular vibrations, phonons or other excitations in the system, resulting in the energy of the laser photons being shifted up or down. Thus, this technique may be used to characterize atoms and molecules within the ultracapacitor 10. A number of variations of Raman spectroscopy are used, and may prove useful in characterizing contents the ultracapacitor 10.

The advanced electrolyte systems of the present comprise, in one embodiment, include certain enhanced electrolyte combinations suitable for use in a temperature range of about minus 40 degrees Celsius to about 250 degrees Celsius, e.g., about minus 10 degrees Celsius to about 250 degrees Celsius, e.g., about minus 5 degrees Celsius to about 250 degrees Celsius e.g., about 0 degrees Celsius to about 250 degrees Celsius e.g., about minus 20 degrees Celsius to about 200 degrees Celsius e.g., about 150 degrees Celsius to about 250 degrees Celsius e.g., about 150 degrees Celsius to about 220 degrees Celsius e.g., about 150 degrees Celsius to about 200 degrees Celsius, e.g., about minus 10 degrees Celsius to about 210 degrees Celsius e.g., about minus 10 degrees Celsius to about 220 degrees Celsius e.g., about minus 10 degrees Celsius to about 230 degrees Celsius.

Generally, a higher degree of durability at a given temperature may be coincident with a higher degree of voltage stability at a lower temperature. Accordingly, the development of a high temperature durability AES, with enhanced electrolyte combinations, generally leads to simultaneous development of high voltage, but lower temperature AES, such that these enhanced electrolyte combinations described herein may also be useful at higher voltages, and thus higher energy densities, but at lower temperatures.

In one embodiment, the present invention provides an enhanced electrolyte combination suitable for use in an energy storage cell, e.g., an ultracapacitor, comprising a novel mixture of electrolytes selected from the group consisting of an ionic liquid mixed with a second ionic liquid, an ionic liquid mixed with an organic solvent, and an ionic liquid mixed with a second ionic liquid and an organic solvent: wherein each ionic liquid is selected from the salt of any combination of the following cations and anions, wherein the cations are selected from the group consisting of 1-butyl-3-methylimidazolium, 1-ethyl-3-methylimidazolium, 1-hexyl-3-methylimidazolium, 1-butyl-1-methylpiperidinium, butyltrimethylammonium, 1-butyl-1-methylpyrrolidinium, trihexyltetradecylphosphonium, and 1-butyl-3-methylimidaxolium; and the anions are selected from the group consisting of tetrafluoroborate, bis(trifluoromethylsulfonyl)imide, tetracyanoborate, and trifluoromethanesulfonate; and wherein the organic solvent is selected from the group consisting of linear sulfones (e.g., ethyl isopropyl sulfone, ethyl isobutyl sulfone, ethyl methyl sulfone, methyl isopropyl sulfone, isopropyl isobutyl sulfone, isopropyl s-butyl sulfone, butyl isobutyl sulfone, and dimethyl sulfone), linear carbonates (e.g., ethylene carbonate, propylene carbonate, and dimethyl carbonate), and acetonitrile.

For example, given the combinations of cations and anions above, each ionic liquid may be selected from the group consisting of 1-butyl-3-methylimidazolium tetrafluoroborate; 1-butyl-3-methylimidazolium bis(trifluoromethylsulfonyl)imide; 1-ethyl-3-methylimidazolium tetrafluoroborate; 1-ethyl-3-methylimidazolium tetracyanoborate; 1-hexyl-3-methylimidazolium tetracyanoborate; 1-butyl-1-methylpyrrolidinium bis(trifluoromethylsulfonyl)imide; 1-butyl-1-methylpyrrolidinium tris(pentafluoroethyl)trifluorophosphate; 1-butyl-1-methylpyrrolidinium tetracyanoborate; trihexyltetradecylphosphonium bis(trifluoromethylsulfonyl)imide, 1-butyl-1-methylpiperidinium bis(trifluoromethylsulfonyl)imide, butyltrimethylammonium bis(trifluoromethylsulfonyl)imide, and 1-butyl-3-methylimidazolium trifluoromethanesulfonate.

In certain embodiments, the ionic liquid is 1-butyl-3-methylimidazolium tetrafluoroborate.

In certain embodiments, the ionic liquid is 1-butyl-3-methylimidazolium bis(trifluoromethylsulfonyl)imide.

In certain embodiments, the ionic liquid is 1-ethyl-3-methylimidazolium tetrafluoroborate.

In certain embodiments, the ionic liquid is 1-ethyl-3-methylimidazolium tetracyanoborate.

In certain embodiments, the ionic liquid is 1-hexyl-3-methylimidazolium tetracyanoborate.

In certain embodiments, the ionic liquid is 1-butyl-1-methylpyrrolidinium bis(trifluoromethylsulfonyl)imide.

In one embodiment, the ionic liquid is 1-butyl-1-methylpyrrolidinium tris(pentafluoroethyl)trifluorophosphate.

In certain embodiments, the ionic liquid is 1-butyl-1-methylpyrrolidinium tetracyanoborate.

In certain embodiments, the ionic liquid is trihexyltetradecylphosphonium bis(trifluoromethylsulfonyl)imide.

In certain embodiments, the ionic liquid is 1-butyl-1-methylpiperidinium bis(trifluoromethylsulfonyl)imide.

In certain embodiments, the ionic liquid is butyltrimethylammonium bis(trifluoromethylsulfonyl)imide In certain embodiments, the ionic liquid is 1-butyl-3-methylimidazolium trifluoromethanesulfonate.

In certain embodiments, the organic solvent is selected from ethyl isopropyl sulfone, ethyl isobutyl sulfone, ethyl methyl sulfone, methyl isopropyl sulfone, isopropyl isobutyl sulfone, isopropyl s-butyl sulfone, butyl isobutyl sulfone, or bimethyl sulfone, linear sulfones.

In certain embodiments, the organic solvent is selected from polypropylene carbonate, propylene carbonate, dimethyl carbonate, ethylene carbonate.

In certain embodiments, the organic solvent is acetonitrile.

In certain embodiments, the enhanced electrolyte composition is an ionic liquid with an organic solvent, wherein the organic solvent is 55%-90%, e.g., 37.5%, by volume of the composition.

In certain embodiments, the enhanced electrolyte composition is an ionic liquid with a second ionic liquid, wherein one ionic liquid is 5%-90%, e.g., 60%, by volume of the composition.

The enhanced electrolyte combinations of the present invention provide a wider temperature range performance for an individual capacitor (e.g. without a significant drop in capacitance and/or increase in ESR when transitioning between two temperatures, e.g. without more than a 90% decrease in capacitance and/or a 1000% increase in ESR when transitioning from about +30° C. to about −40° C.), and increased temperature durability for an individual capacitor (e.g., less than a 50% decrease in capacitance at a given temperature after a given time and/or less than a 100% increase in ESR at a given temperature after a given time, and/or less than 10 A/L of leakage current at a given temperature after a given time, e.g., less than a 40% decrease in capacitance and/or a 75% increase in ESR, and/or less than 5 A/L of leakage current, e.g., less than a 30% decrease in capacitance and/or a 50% increase in ESR, and/or less than 1 A/L of leakage current). Without wishing to be bound by theory, the combinations described above provide enhanced eutectic properties that affect the freezing point of the advanced electrolyte system to afford ultracapacitors that operate within performance and durability standards at temperatures of down to −40 degrees Celsius.

As described above for the novel electrolytes of the present invention, in certain embodiments, the advanced electrolyte system (AES) may be admixed with electrolytes provided that such combination does not significantly affect the advantages achieved by utilization of the advanced electrolyte system.

In certain embodiments, the enhanced electrolyte combinations are selected herein for use the advanced electrolyte systems may also be purified. Such purification may be performed using art-recognized techniques or techniques provided herein.

Figure 5:
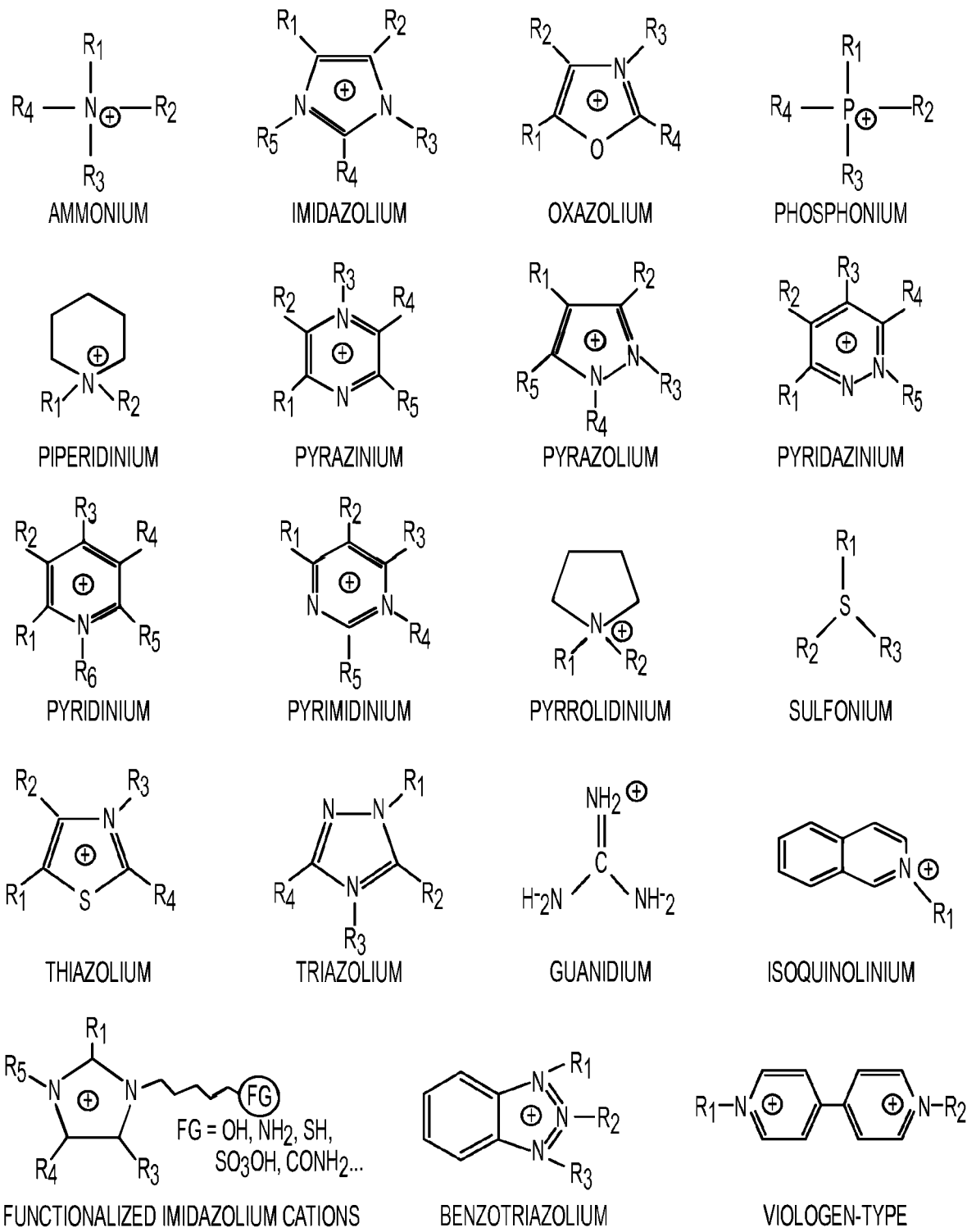
FIG. 5 illustrates cations suitable for use in electrolytes for ultracapacitors as described herein.

Referring now to FIG. 5, there are shown various additional embodiments of cations 9 suited for use in an ionic liquid to provide the electrolyte 6. These cations 9 may be used alone or in combination with each other, in combination with at least some of the foregoing embodiments of cations 9, and may also be used in combination with other cations 9 that are deemed compatible and appropriate by a user, designer, manufacturer or other similarly interested party. The cations 9 depicted in FIG. 5 include, without limitation, ammonium, imidazolium, oxazolium, phosphonium, piperidinium, pyrazinium, pyrazinium, pyridazinium, pyridinium, pyrimidinium, pyrrolidinium, sulfonium, thiazolium, triazolium, guanidium, isoquinolinium, benzotriazolium, viologen-types, and functionalized imidazolium cations.

With regard to the cations 9 shown in FIG. 5, various branch groups ($R_1$, $R_2$, $R_3$, . . . $R_x$) are included. In the case of the cations 9, each branch groups ($R_x$) may be one of alkyl, heteroalkyl, alkenyl, heteroalkenyl, alkynyl, heteroalkynyl, halo, amino, nitro, cyano, hydroxyl, sulfate, sulfonate, or a carbonyl group any of which is optionally substituted.

The term "alkyl" is recognized in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 20 or fewer carbon atoms in its backbone (e.g., $C_1$-$C_{20}$ for straight chain, $C_1$-$C_{20}$ for branched chain). Likewise, cycloalkyls have from about 3 to about 10 carbon atoms in their ring structure, and alternatively about 5, 6 or 7 carbons in the ring structure. Examples of alkyl groups include, but are not limited to, methyl, ethyl, propyl, butyl, pentyl, hexyl, ethyl hexyl, cyclopropyl, cyclobutyl, cyclopentyl, cyclohexyl and the like.

The term "heteroalkyl" is recognized in the art and refers to alkyl groups as described herein in which one or more atoms is a heteroatom (e.g., oxygen, nitrogen, sulfur, and the like). For example, alkoxy group (e.g., —OR) is a heteroalkyl group.

The terms "alkenyl" and "alkynyl" are recognized in the art and refer to unsaturated aliphatic groups analogous in length and possible substitution to the alkyls described above, but that contain at least one double or triple bond respectively.

The "heteroalkenyl" and "heteroalkynyl" are recognized in the art and refer to alkenyl and alkynyl alkyl groups as described herein in which one or more atoms is a heteroatom (e.g., oxygen, nitrogen, sulfur, and the like).

Generally, any ion with a negative charge maybe used as the anion 11. The anion 11 selected is generally paired with a large organic cation 9 to form a low temperature melting ionic salt. Room temperature (and lower) melting salts come from mainly large anions 9 with a charge of −1. Salts that melt at even lower temperatures generally are realized with anions 11 with easily delocalized electrons. Anything that will decrease the affinity between ions (distance, delocalization of charge) will subsequently decrease the melting point. Although possible anion formations are virtually infinite, only a subset of these will work in low temperature ionic liquid application. This is a non-limiting overview of possible anion formations for ionic liquids.

Common substitute groups (a) suited for use of the anions 11 provided in Table 3 include: —F$^-$, —Cl$^-$, —Br$^-$, —I$^-$, —OCH$_3^-$, —CN$^-$, —SCN$^-$, —C$_2$H$_3$O$_2^-$, —ClO$^-$, —ClO$_2^-$, —ClO$_3^-$, —ClO$_4^-$, —NCO$^-$, —NCS$^-$, —NCSe$^-$, —NCN$^-$, —OCH(CH$_3$)$_2^-$, —CH$_2$OCH$_3^-$, —COOH$^-$, —OH$^-$, —SOCH$_3^-$, —SO$_2$CH$_3^-$, —SOCH$_3^-$, —SO$_2$CF$_3^-$, —SO$_3$H$^-$, —SO$_3$CF$_3^-$, —O(CF$_3$)$_2$C$_2$(CF$_3$)$_2$O$^-$, —CF$_3^-$, —CHF$_2^-$, —CH$_2$F$^-$, —CH$_3^-$, —NO$_3^-$, —NO$_2^-$, —SO$_3^-$, —SO$_4^{2-}$, —SF$_5^-$, —CB$_{11}$H$_{12}^-$, —CB$_{11}$H$_6$Cl$_6^-$, —CH$_3$CB$_{11}$H$_{11}^-$, —C$_2$H$_5$CB$_{11}$H$_{11}^-$, -A-PO$_4^-$, -A-SO$_2^-$, A-SO$_3^-$, -A-SO$_3$H$^-$, -A-COO$^-$, -A-CO$^-$ {where A is a phenyl (the phenyl group or phenyl ring is a cyclic group of atoms with the formula C$_6$H$_5$) or substituted phenyl, alkyl, (a radical that has the general formula $CnH_{2n+1}$, formed by removing a hydrogen atom from an alkane) or substituted alkyl group, negatively charged radical alkanes, (alkane are chemical compounds that consist only of hydrogen and carbon atoms and are bonded exclusively by single bonds) halogenated alkanes and ethers (which are a class of organic compounds that contain an oxygen atom connected to two alkyl or aryl groups).

With regard to anions 11 suited for use in an ionic liquid that provides the electrolyte 6, various organic anions 11 may be used. Exemplary anions 11 and structures thereof are provided in Table 3. In a first embodiment, (No. 1), exemplary anions 11 are formulated from the list of substitute groups (α) provided above, or their equivalent. In additional embodiments, (Nos. 2-5), exemplary anions 11 are formulated from a respective base structure $(Y_2, Y_3, Y_4, \ldots Y_n)$ and a respective number of anion substitute groups $(\alpha_1, \alpha_2, \alpha_3, \ldots \alpha_n)$, where the respective number of anion substitute groups $(\alpha)$ may be selected from the list of substitute $(\alpha)$ groups provided above, or their equivalent. Note that in some embodiments, a plurality of anion substitute groups $(\alpha)$ (i.e., at least one differing anion substitute group $(\alpha)$) may be used in any one embodiment of the anion 11. Also, note that in some embodiments, the base structure (Y) is a single atom or a designated molecule (as described in Table 3), or may be an equivalent.

More specifically, and by way of example, with regard to the exemplary anions provided in Table 3, certain combinations may be realized. As one example, in the case of No. 2, the base structure $(Y_2)$ includes a single structure (e.g., an atom, or a molecule) that is bonded to two anion substitute groups $(\alpha_2)$. While shown as having two identical anion substitute groups $(\alpha_2)$, this need not be the case. That is, the base structure $(Y_2)$ may be bonded to varying anion substitute groups $(\alpha_2)$, such as any of the anion substitute groups $(\alpha)$ listed above. Similarly, the base structure $(Y_3)$ includes a single structure (e.g., an atom) that is bonded to three anion substitute groups $(\alpha_3)$, as shown in case No. 3. Again, each of the anion substitute groups $(\alpha)$ included in the anion may be varied or diverse, and need not repeat (be repetitive or be symmetric) as shown in Table 3. In general, with regard to the notation in Table 3, a subscript on one of the base structures denotes a number of bonds that the respective base structure may have with anion substitute groups $(\alpha)$. That is, the subscript on the respective base structure $(Y_n)$ denotes a number of accompanying anion substitute groups $(\alpha_n)$ in the respective anion.

TABLE 3

Exemplary Organic Anions for an Ionic Liquid

| No.: | Ion | Guidelines for Anion Structure and Exemplary Ionic Liquids |
|---|---|---|
| 1 | $-\alpha_1$ | Some of the above α may mix with organic cations to form an ionic liquid.<br>An exemplary anion: Cl⁻ Exemplary ionic liquid: [BMI*][Cl]<br>*BMI—butyl methyl immadizolium<br>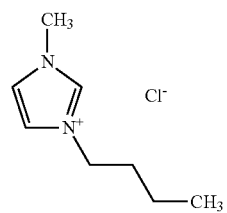 |
| 2 | $-Y_2\alpha_2$ | $Y_2$ may be any of the following: N, O, C=O, S=O.<br>Exemplary anions include: B $(CF_3CO_2)_4^-$ $N(SO_2CF_3)_2^-$<br>Exemplary ionic liquid: [EMI*][NTF$_2$]<br>*EMI—ethyl methyl immadizolium<br>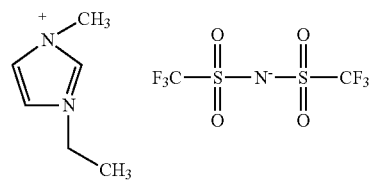 |

TABLE 3-continued

Exemplary Organic Anions for an Ionic Liquid

| No.: | Ion | Guidelines for Anion Structure and Exemplary Ionic Liquids |
|---|---|---|
| 3 | $-Y_3\alpha_3$ | $Y_3$ may be any of the following: Be, C, N, O, Mg, Ca, Ba, Ra, Au.<br>Exemplary anions include: $-C(SO_2CF_3)_3^-$<br>Exemplary ionic liquid: [BMI] $C(SO_2CF_3)_3^-$ |
| 4 | $-Y_4\alpha_4$ | $Y_4$ may be any of the following: B, Al, Ga, Th, In, P.<br>Exemplary anions include: $-BF_4^-$, $-AlCl_4^-$<br>Exemplary ionic liquid: [BMI][BF$_4$] |
| 5 | $-Y_6\alpha_6$ | $Y_6$ can be any of the following: P, S, Sb, As, N, Bi, Nb, Sb.<br>Exemplary anions include: $-P(CF_3)_4F_2^-$, $-AsF_6^-$<br>Exemplary ionic liquid: [BMI][PF$_6$] |

The term "cyano" is given its ordinary meaning in the art and refers to the group, CN. The term "sulfate" is given its ordinary meaning in the art and refers to the group, $SO_2$. The term "sulfonate" is given its ordinary meaning in the art and refers to the group, $SO_3X$, where X may be an electron pair, hydrogen, alkyl or cycloalkyl. The term "carbonyl" is recognized in the art and refers to the group, C=O.

An important aspect for consideration in construction of the ultracapacitor 10 is maintaining good chemical hygiene. In order to assure purity of the components, in various embodiments, the activated carbon, carbon fibers, rayon, carbon cloth, and/or nanotubes making up the energy storage media 1 for the two electrodes 3, are dried at elevated temperature in a vacuum environment. The separator 5 is also dried at elevated temperature in a vacuum environment. Once the electrodes 3 and the separator 5 are dried under vacuum, they are packaged in the housing 7 without a final seal or cap in an atmosphere with less than 50 parts per million (ppm) of water. The uncapped ultracapacitor 10 may be dried, for example, under vacuum over a temperature range of about 100 degrees Celsius to about 250 degrees Celsius. Once this final drying is complete, the electrolyte 6 may be added and the housing 7 is sealed in a relatively dry atmosphere (such as an atmosphere with less than about 50 ppm of moisture). Of course, other methods of assembly may be used, and the foregoing provides merely a few exemplary aspects of assembly of the ultracapacitor 10.

Generally, impurities in the electrolyte 6 are kept to a minimum. For example, in some embodiments, a total concentration of halide ions (chloride, bromide, fluoride, iodide), is kept to below about 1,000 ppm. A total concentration of metallic species (e.g., Br, Cd, Co, Cr, Cu, Fe, K, Li, Mo, Na, Ni, Pb, Zn, including an at least one of an alloy and an oxide thereof), is kept to below about 1,000 ppm. Further, impurities from solvents and precursors used in the synthesis process are kept below about 1,000 ppm and can include, for example, bromoethane, chloroethane, 1-bromobutane, 1-chlorobutane, 1-methylimidazole, ethyl acetate, methylene chloride and so forth.

In some embodiments, the impurity content of the ultracapacitor 10 has been measured using ion selective electrodes and the Karl Fischer titration procedure, which has been applied to electrolyte 6 of the ultracapacitor 10. It has been found that the total halide content in the ultracapacitor 10 according to the teachings herein has been found to be less than about 200 ppm of halides ($Cl^-$ and $F^-$) and water content is less than about 100 ppm.

One example of a technique for purifying electrolyte is provided in a reference entitled "The oxidation of alcohols in substituted imidazolium ionic liquids using ruthenium catalysts," Farmer and Welton, The Royal Society of Chemistry, 2002, 4, 97-102. An exemplary process is also provided herein.

Impurities can be measured using a variety of techniques, such as, for example, Atomic Absorption Spectrometry (AAS), Inductively Coupled Plasma-Mass Spectrometry (ICPMS), or simplified solubilizing and electrochemical sensing of trace heavy metal oxide particulates. AAS is a spectro-analytical procedure for the qualitative and quantitative determination of chemical elements employing the absorption of optical radiation (light) by free atoms in the gaseous state. The technique is used for determining the concentration of a particular element (the analyte) in a sample to be analyzed. AAS can be used to determine over seventy different elements in solution or directly in solid samples. ICPMS is a type of mass spectrometry that is highly sensitive and capable of the determination of a range of metals and several non-metals at concentrations below one part in $10^{12}$ (part per trillion). This technique is based on coupling together an inductively coupled plasma as a method of producing ions (ionization) with a mass spectrometer as a method of separating and detecting the ions. ICPMS is also capable of monitoring isotopic speciation for the ions of choice.

Additional techniques may be used for analysis of impurities. Some of these techniques are particularly advantageous for analyzing impurities in solid samples. Ion Chromatography (IC) may be used for determination of trace levels of halide impurities in the electrolyte 6 (e.g., an ionic liquid). One advantage of Ion Chromatography is that relevant halide species can be measured in a single chromatographic analysis. A Dionex AS9-HC column using an eluent consisting 20 mM NaOH and 10% (v/v) acetonitrile is one example of an apparatus that may be used for the quantification of halides from the ionic liquids. A further technique is that of X-ray fluorescence.

X-ray fluorescence (XRF) instruments may be used to measure halogen content in solid samples. In this technique, the sample to be analyzed is placed in a sample cup and the sample cup is then placed in the analyzer where it is irradiated with X-rays of a specific wavelength. Any halogen atoms in the sample absorb a portion of the X-rays and then reflect radiation at a wavelength that is characteristic for a given halogen. A detector in the instrument then quantifies the amount of radiation coming back from the halogen atoms and measures the intensity of radiation. By knowing the surface area that is exposed, concentration of halogens in the sample can be determined. A further technique for assessing impurities in a solid sample is that of pyrolysis.

Adsorption of impurities may be effectively measured through use of pyrolysis and microcoulometers. Microcoulometers are capable of testing almost any type of material for total chlorine content. As an example, a small amount of sample (less than 10 milligrams) is either injected or placed into a quartz combustion tube where the temperature ranges from about 600 degrees Celsius to about 1,000 degrees Celsius. Pure oxygen is passed through the quartz tube and any chlorine containing components are combusted completely. The resulting combustion products are swept into a titration cell where the chloride ions are trapped in an electrolyte solution. The electrolyte solution contains silver ions that immediately combine with any chloride ions and drop out of solution as insoluble silver chloride. A silver electrode in the titration cell electrically replaces the used up silver ions until the concentration of silver ions is back to where it was before the titration began. By keeping track of the amount of current needed to generate the required amount of silver, the instrument is capable of determining how much chlorine was present in the original sample. Dividing the total amount of chlorine present by the weight of the sample gives the concentration of chlorine that is actually in the sample. Other techniques for assessing impurities may be used.

Surface characterization and water content in the electrode 3 may be examined, for example, by infrared spectroscopy techniques. The four major absorption bands at around 1130, 1560, 3250 and 2300 $cm^{-1}$, correspond to $vC=O$ in, $vC=C$ in aryl, $vO-H$ and $vC-N$, respectively. By measuring the intensity and peak position, it is possible to quantitatively identify the surface impurities within the electrode 3.

Another technique for identifying impurities in the electrolyte 6 and the ultracapacitor 10 is Raman spectroscopy. This spectroscopic technique relies on inelastic scattering, or Raman scattering, of monochromatic light, usually from a laser in the visible, near infrared, or near ultraviolet range. The laser light interacts with molecular vibrations, phonons or other excitations in the system, resulting in the energy of the laser photons being shifted up or down. Thus, this technique may be used to characterize atoms and molecules within the ultracapacitor 10. A number of variations of Raman spectroscopy are used, and may prove useful in characterizing contents the ultracapacitor 10.

Once the ultracapacitor 10 is fabricated, it may be used in high temperature applications with little or no leakage current and little increase in resistance. The ultracapacitor 10 described herein can operate efficiently at temperatures from about minus 40 degrees Celsius to about 250 degrees Celsius with leakage currents normalized over the volume of the device less than 1 amp per liter (A/L) of volume of the device within the entire operating voltage and temperature range.

By reducing the moisture content in the ultracapacitor 10 (e.g., to less than 500 part per million (ppm) over the weight and volume of the electrolyte and the impurities to less than 1,000 ppm), the ultracapacitor 10 can efficiently operate over the temperature range, with a leakage current (I/L) that is less than 1,000 mAmp per Liter within that temperature range and voltage range.

In one embodiment, leakage current (I/L) at a specific temperature is measured by holding the voltage of the ultracapacitor 10 constant at the rated voltage (i.e., the maximum rated operating voltage) for seventy two (72) hours. During this period, the temperature remains relatively constant at the specified temperature. At the end of the measurement interval, the leakage current of the ultracapacitor 10 is measured.

In some embodiments, a maximum voltage rating of the ultracapacitor 10 is about 4 V at room temperature. An approach to ensure performance of the ultracapacitor 10 at elevated temperatures (for example, over 250 degrees Celsius), is to derate (i.e., to reduce) the voltage rating of the ultracapacitor 10. For example, the voltage rating may be adjusted down to about 0.5 V, such that extended durations of operation at higher temperature are achievable.

Another embodiment for ensuring a high degree of purity includes an exemplary process for purifying the electrolyte 6. It should be noted that although the process is presented in terms of specific parameters (such as quantities, formulations, times and the like), that the presentation is merely exemplary and illustrative of the process for purifying electrolyte and is not limiting thereof.

In a first step of the process for purifying electrolyte, the electrolyte 6 (in some embodiments, the ionic liquid) is mixed with deionized water, and then raised to a moderate temperature for some period of time. In a proof of concept, fifty (50) milliliters (ml) of ionic liquid was mixed with eight hundred and fifty (850) milliliters (ml) of the deionized water. The mixture was raised to a constant temperature of sixty (60) degrees Celsius for about twelve (12) hours and subjected to constant stirring (of about one hundred and twenty (120) revolutions per minute (rpm)).

In a second step, the mixture of ionic liquid and deionized water is permitted to partition. In this example, the mixture was transferred via a funnel, and allowed to sit for about four (4) hours.

In a third step, the ionic liquid is collected. In this example, a water phase of the mixture resided on the bottom, with an ionic liquid phase on the top. The ionic liquid phase was transferred into another beaker.

In a fourth step, a solvent was mixed with the ionic liquid. In this example, a volume of about twenty five (25) milliliters (ml) of ethyl acetate was mixed with the ionic liquid. This mixture was again raised to a moderate temperature and stirred for some time.

Although ethyl acetate was used as the solvent, the solvent can be at least one of diethylether, pentone, cyclopentone, hexane, cyclohexane, benzene, toluene, 1-4 dioxane, chloroform or any combination thereof as well as other material(s) that exhibit appropriate performance characteristics. Some of the desired performance characteristics include those of a non-polar solvent as well as a high degree of volatility.

In a fifth step, carbon powder is added to the mixture of the ionic liquid and solvent. In this example, about twenty (20) weight percent (wt %) of carbon (of about a 0.45 micrometer diameter) was added to the mixture.

In a sixth step, the ionic liquid is again mixed. In this example, the mixture with the carbon powder was then subjected to constant stirring (120 rpm) overnight at about seventy (70) degrees Celsius.

In a seventh step, the carbon and the ethyl acetate are separated from the ionic liquid. In this example, the carbon was separated using Buchner filtration with a glass microfiber filter. Multiple filtrations (three) were performed. The ionic liquid collected was then passed through a 0.2 micrometer syringe filter in order to remove substantially all of the carbon particles. In this example, the solvent was then subsequently separated from the ionic liquid by employing rotary evaporation. Specifically, the sample of ionic liquid was stirred while increasing temperature from seventy (70) degrees Celsius to eighty (80) degrees Celsius, and finished at one hundred (100) degrees Celsius. Evaporation was performed for about fifteen (15) minutes at each of the respective temperatures.

The process for purifying electrolyte has proven to be very effective. For the sample ionic liquid, water content was measured by titration, with a titration instrument provided by Mettler-Toledo Inc., of Columbus, Ohio (model No: AQC22). Halide content was measured with an ISE instrument provided by Hanna Instruments of Woonsocket, R.I. (model no. AQC22). The standards solution for the ISE instrument was obtained from Hanna, and included HI 4007-03 (1,000 ppm chloride standard), HI 4010-03 (1,000 ppm fluoride standard) HI 4000-00 (ISA for halide electrodes), and HI 4010-00 (TISAB solution for fluoride electrode only). Prior to performing measurements, the ISE instrument was calibrated with the standards solutions using 0.1, 10, 100 and 1,000 parts per million (ppm) of the standards, mixed in with deionized water. ISA buffer was added to the standard in a 1:50 ratio for measurement of $Cl^-$ ions. Results are shown in Table 4.

TABLE 4

Purification Data for Electrolyte

| Impurity | Before (ppm) | After (ppm) |
|---|---|---|
| $Cl^-$ | 5,300.90 | 769 |
| F- | 75.61 | 10.61 |
| $H_2O$ | 1080 | 20 |

A four step process was used to measure the halide ions. First, $Cl^-$ and $F^-$ ions were measured in the deionized water. Next, a 0.01 M solution of ionic liquid was prepared with deionized water. Subsequently, $Cl^-$ and $F^-$ ions were measured in the solution. Estimation of the halide content was then determined by subtracting the quantity of ions in the water from the quantity of ions in the solution.

As an overview, a method of assembly of a cylindrically shaped ultracapacitor 10 is provided. Beginning with the electrodes 3, each electrode 3 is fabricated once the energy storage media 1 has been associated with the current collector 2. A plurality of leads are then coupled to each electrode 3 at appropriate locations. A plurality of electrodes 3 are then oriented and assembled with an appropriate number of separators 5 therebetween to form the storage cell 12. The storage cell 12 may then be rolled into a cylinder, and may be secured with a wrapper. Generally, respective ones of the leads are then bundled to form each of the terminals 8.

Prior to incorporation of the electrolyte 6 into the ultracapacitor 10 (such as prior to assembly of the storage cell 12, or thereafter) each component of the ultracapacitor 10 may be dried to remove moisture. This may be performed with unassembled components (i.e., an empty housing 7, as well as each of the electrodes 3 and each of the separators 5), and subsequently with assembled components (such as the storage cell 12).

Drying may be performed, for example, at an elevated temperature in a vacuum environment. Once drying has been performed, the storage cell 12 may then be packaged in the housing 7 without a final seal or cap. In some embodiments, the packaging is performed in an atmosphere with less than 50 parts per million (ppm) of water. The uncapped ultracapacitor 10 may then be dried again. For example, the ultracapacitor 10 may be dried under vacuum over a temperature range of about 100 degrees Celsius to about 250 degrees Celsius. Once this final drying is complete, the housing 7 may then be sealed in, for example, an atmosphere with less than 50 ppm of moisture.

In some embodiments, once the drying process (which may also be referred to a "baking" process) has been completed, the environment surrounding the components may be filled with an inert gas. Exemplary gasses include argon, nitrogen, helium, and other gasses exhibiting similar properties (as well as combinations thereof).

Generally, a fill port (a perforation in a surface of the housing 7) is included in the housing 7, or may be later added. Once the ultracapacitor 10 has been filled with electrolyte 6, the fill port may then be closed. Closing the fill port may be completed, for example, by welding material (e.g., a metal that is compatible with the housing 7) into or over the fill port. In some embodiments, the fill port may be temporarily closed prior to filling, such that the ultracapacitor 10 may be moved to another environment, for subsequent re-opening, filling and closure. However, as discussed herein, it is considered that the ultracapacitor 10 is dried and filled in the same environment.

A number of methods may be used to fill the housing 7 with a desired quantity of electrolyte 6. Generally, controlling the fill process may provide for, among other things, increases in capacitance, reductions in equivalent-series-resistance (ESR), and limiting waste of electrolyte 6. A vacuum filling method is provided as a non-limiting example of a technique for filling the housing 7 and wetting the storage cell 12 with the electrolyte 6.

First, however, note that measures may be taken to ensure that any material that has a potential to contaminate components of the ultracapacitor 10 is clean, compatible and dry. As a matter of convention, it may be considered that "good hygiene" is practiced to ensure assembly processes and components do not introduce contaminants into the ultracapacitor 10. Also, as a matter of convention, it may be considered that a "contaminant" may be defined as any unwanted material that will negatively affect performance of the ultracapacitor 10 if introduced. Also note that, generally herein, contaminants may be assessed as a concentration, such as in parts-per-million (ppm). The concentration may be taken as by weight, volume, sample weight, or in any other manner as determined appropriate.

In the "vacuum method" a container is placed onto the housing 7 around the fill port. A quantity of electrolyte 6 is then placed into the container in an environment that is substantially free of oxygen and water (i.e., moisture). A vacuum is then drawn in the environment, thus pulling any air out of the housing and thus simultaneously drawing the electrolyte 6 into the housing 7. The surrounding environment may then be refilled with inert gas (such as argon, nitrogen, or the like, or some combination of inert gases), if desired. The ultracapacitor 10 may be checked to see if the desired amount of electrolyte 6 has been drawn in. The process may be repeated as necessary until the desired amount of electrolyte 6 is in the ultracapacitor 10.

After filling with electrolyte 6, in some embodiments, material may be fit into the fill port to seal the ultracapacitor 10. The material may be, for example, a metal that is compatible with the housing 7 and the electrolyte 6. In one example, material is force fit into the fill port, essentially performing a "cold weld" of a plug in the fill port. Of course, the force fit may be complimented with other welding techniques as discussed further herein.

In order to show how the fill process effects the ultracapacitor 10, two similar embodiments of the ultracapacitor 10 were built. One was filled without a vacuum, the other was filled under vacuum. Electrical performance of the two embodiments is provided in Table 5. By repeated performance of such measurements, it has been noted that increased performance is realized with by filling the ultracapacitor 10 through applying a vacuum. It has been determined that, in general, is desired that pressure within the housing 7 is reduced to below about 150 mTorr, and more particularly to below about 40 mTorr.

TABLE 5

Comparative Performance for Fill Methods

| Parameter (at 0.1 V) | Without vacuum | With vacuum | Deviation |
|---|---|---|---|
| ESR @ 45° Φ | 3.569 Ohms | 2.568 Ohms | (−28%) |
| Capacitance @ 12 mHz | 155.87 mF | 182.3 mF | (+14.49%) |
| Phase @ 12 mHz | 79.19 degrees | 83 degrees | (+4.59%) |

In order to evaluate efficacy of vacuum filling techniques, two different pouch cells were tested. The pouch cells included two electrodes 3, each electrode 3 being based on carbonaceous material. Each of the electrodes 3 were placed opposite and facing each other. The separator 5 was disposed between them to prevent short circuit and everything was soaked in electrolyte 6. Two external tabs were used to provide for four measurement points. The separator 5 used was a polyethylene separator 5, and the cell had a total volume of about 0.468 ml. As trade-offs may be made among various demands of the ultracapacitor (for example, voltage and temperature) performance ratings for the ultracapacitor may be managed (for example, a rate of increase for ESR, capacitance) may be adjusted to accommodate a particular need. Note that in reference to the foregoing, "performance ratings" is given a generally conventional definition, which is with regard to values for parameters describing conditions of operation.

Note that measures of capacitance as well as ESR, as presented herein, followed generally known methods. Consider first, techniques for measuring capacitance.

Capacitance may be measured in a number of ways. One method involves monitoring the voltage presented at the capacitor terminals while a known current is drawn from (during a "discharge") or supplied to (during a "charge") of the ultracapacitor. More specifically, we may use the fact that an ideal capacitor is governed by the equation:

$$I = C * dV/dt,$$

where I represents charging current, C represents capacitance and dV/dt represents the time-derivative of the ideal capacitor voltage, V. An ideal capacitor is one whose internal resistance is zero and whose capacitance is voltage-independent, among other things. When the charging current, I, is constant, the voltage V is linear with time, so dV/dt may be computed as the slope of that line, or as DeltaV/DeltaT. However, this method is generally an approximation and the voltage difference provided by the effective series resistance (the ESR drop) of the capacitor should be considered in the computation or measurement of a capacitance. The effective series resistance (ESR) may generally be a lumped element approximation of dissipative or other effects within a capacitor. Capacitor behavior is often derived from a circuit model comprising an ideal capacitor in series with a resistor having a resistance value equal to the ESR. Generally, this yields good approximations to actual capacitor behavior.

In one method of measuring capacitance, one may largely neglect the effect of the ESR drop in the case that the internal resistance is substantially voltage-independent, and the charging or discharging current is substantially fixed. In that case, the ESR drop may be approximated as a constant and is naturally subtracted out of the computation of the change in voltage during said constant-current charge or discharge. Then, the change in voltage is substantially a reflection of the change in stored charge on the capacitor. Thus, that change in voltage may be taken as an indicator, through computation, of the capacitance.

For example, during a constant-current discharge, the constant current, I, is known. Measuring the voltage change during the discharge, DeltaV, during a measured time interval DeltaT, and dividing the current value I by the ratio DeltaV/DeltaT, yields an approximation of the capacitance. When I is measured in amperes, DeltaV in volts, and DeltaT in seconds, the capacitance result will be in units of Farads.

Turning to estimation of ESR, the effective series resistance (ESR) of the ultracapacitor may also be measured in a number of ways. One method involves monitoring the voltage presented at the capacitor terminals while a known current is drawn from (during a "discharge") or supplied to (during a "charge") the ultracapacitor. More specifically, one may use the fact that ESR is governed by the equation:

$$V=I*R,$$

where I represents the current effectively passing through the ESR, R represents the resistance value of the ESR, and V represents the voltage difference provided by the ESR (the ESR drop). ESR may generally be a lumped element approximation of dissipative or other effects within the ulracapacitor. Behavior of the ultracapacitor is often derived from a circuit model comprising an ideal capacitor in series with a resistor having a resistance value equal to the ESR. Generally, this yields good approximations of actual capacitor behavior.

In one method of measuring ESR, one may begin drawing a discharge current from a capacitor that had been at rest (one that had not been charging or discharging with a substantial current). During a time interval in which the change in voltage presented by the capacitor due to the change in stored charge on the capacitor is small compared to the measured change in voltage, that measured change in voltage is substantially a reflection of the ESR of the capacitor. Under these conditions, the immediate voltage change presented by the capacitor may be taken as an indicator, through computation, of the ESR.

For example, upon initiating a discharge current draw from a capacitor, one may be presented with an immediate voltage change DeltaV over a measurement interval DeltaT. So long as the capacitance of the capacitor, C, discharged by the known current, I, during the measurement interval, DeltaT, would yield a voltage change that is small compared to the measured voltage change, DeltaV, one may divide DeltaV during the time interval DeltaT by the discharge current, I, to yield an approximation to the ESR. When I is measured in amperes and DeltaV in volts, the ESR result will have units of Ohms.

Both ESR and capacitance may depend on ambient temperature. Therefore, a relevant measurement may require the user to subject the ultracapacitor 10 to a specific ambient temperature of interest during the measurement.

Performance requirements for leakage current are generally defined by the environmental conditions prevalent in a particular application. For example, with regard to a capacitor having a volume of 20 mL, a practical limit on leakage current may fall below 100 mA. As referred to herein, a "volumetric leakage current" of the ultracapacitor 10 generally refers to leakage current divided by a volume of the ultracapacitor 10, and may be expressed, for example in units of mA/cc. Similarly, a "volumetric capacitance" of the ultracapacitor 10 generally refers to capacitance of the ultracapacitor 10 divided by the volume of the ultracapacitor 10, and may be expressed, for example in units of F/cc. Additionally, "volumetric ESR" of the ultracapacitor 10 generally refers to ESR of the ultracapacitor 10 multiplied by the volume of the ultracapacitor 10, and may be expressed, for example in units of Ohms·cc.

Note that one approach to reduce the volumetric leakage current at a specific temperature is to reduce the operating voltage at that temperature. Another approach to reduce the volumetric leakage current at a specific temperature is to increase the void volume of the ultracapacitor. Yet another approach to reduce the leakage current is to reduce loading of the energy storage media 1 on the electrode 3.

A variety of environments may exist where the ultracapacitor 10 is of particular usefulness. For example, in automotive applications, ambient temperatures of 105 degrees Celsius may be realized (where a practical lifetime of the capacitor will range from about 1 year to 20 years). In some downhole applications, such as for geothermal well drilling, ambient temperatures of 250 degrees Celsius or more may be reached (where a practical lifetime of the capacitor will range from about 100 hours to 10,000 hours).

A "lifetime" for an ultracapacitor is also generally defined by a particular application and is typically indicated by a certain percentage increase in leakage current or degradation of another parameter (as appropriate or determinative for the given application). For instance, in one embodiment, the lifetime of an ultracapacitor in an automotive application may be defined as the time at which the leakage current increases to 200% of its initial (beginning of life or "BOL") value. In another embodiment, the lifetime for an ultracapacitor in a downhole application may be defined based on the increase of its ESR from its initial BOL value, e.g., the lifetime may be defined as the time at which the ESR increases to 50%, 75%, 100%, 150%, or 200% of its BOL value.

Electrolyte 6 may be selected for exhibiting desirable properties, such as high thermal stability, a low glass transition temperature (Tg), a viscosity, a particular rhoepectic or thixotropic property (e.g., one that is dependent upon temperature), as well as high conductivity and exhibited good electric performance over a wide range of temperatures. As examples, the electrolyte 6 may have a high degree of fluidicity, or, in contrast, be substantially solid, such that separation of electrodes 3 is assured. Accordingly, other embodiments of electrolyte 6 that exhibit the desired properties may be used as well or in conjunction with any of the foregoing.

"Peak power density" is one fourth times the square of peak device voltage divided by the effective series resistance of the device. "Energy density" is one half times the square of the peak device voltage times the device capacitance.

In various embodiments, an ultracapacitor 10 may have a volume in the range from about, e.g., 0.05 cc to about 7.5 liters.

Nominal values of normalized parameters may be obtained by multiplying or dividing the normalized parameters (e.g. volumetric leakage current) by a normalizing characteristic (e.g. volume). For instance, the nominal leakage current of an ultracapacitor having a volumetric leakage current of 10 mA/cc and a volume of 50 cc is the product of the volumetric leakage current and the volume, 500 mA. Meanwhile the nominal ESR of an ultracapacitor having a volumetric ESR of 20 mOhm·cc and a volume of 50 cc is the quotient of the volumetric ESR and the volume, 0.4 mOhm.

A volume of a particular ultracapacitor 10 may be extended by combining several storage cells (e.g., welding together several jelly rolls) within one housing 7 such that they are electrically in parallel or in series.

Embodiments of the ultracapacitor 10 that exhibit a relatively small volume may be fabricated in a prismatic form factor such that the electrodes 3 of the ultracapacitor 10 oppose one another, at least one electrode 3 having an internal contact to a glass to metal seal, the other having an internal contact to a housing or to a glass to metal seal.

Stacked Electrode Form Factor for Low ESR

Figure 4A:
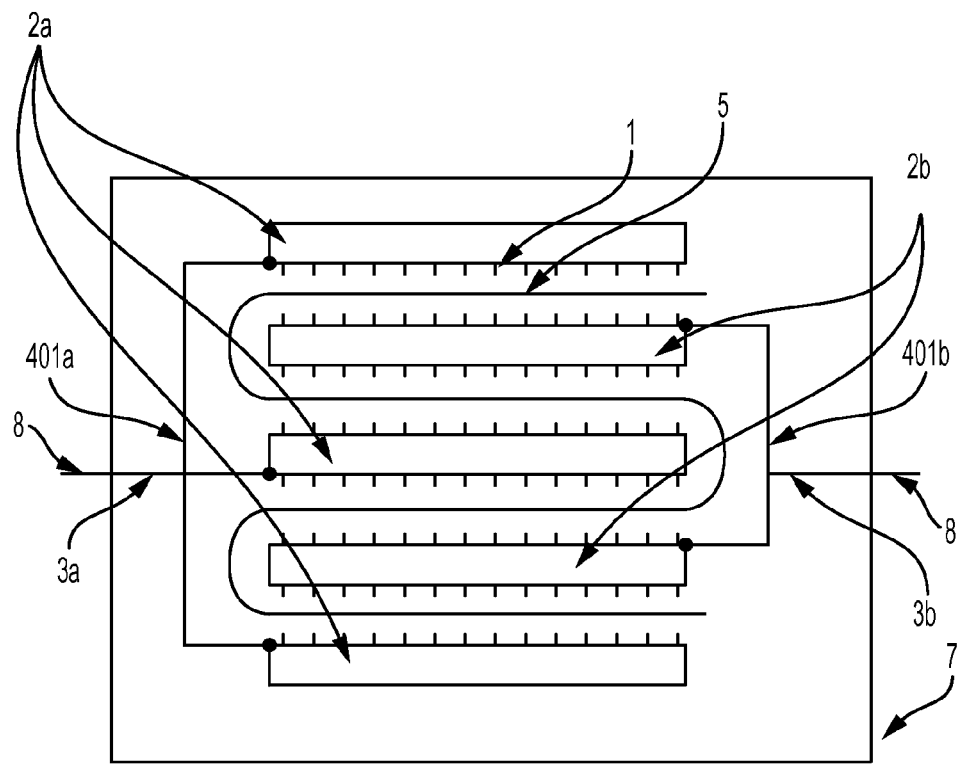
FIG. 4A is a side cross sectional view of an ultracapacitor.
Figure 4B:
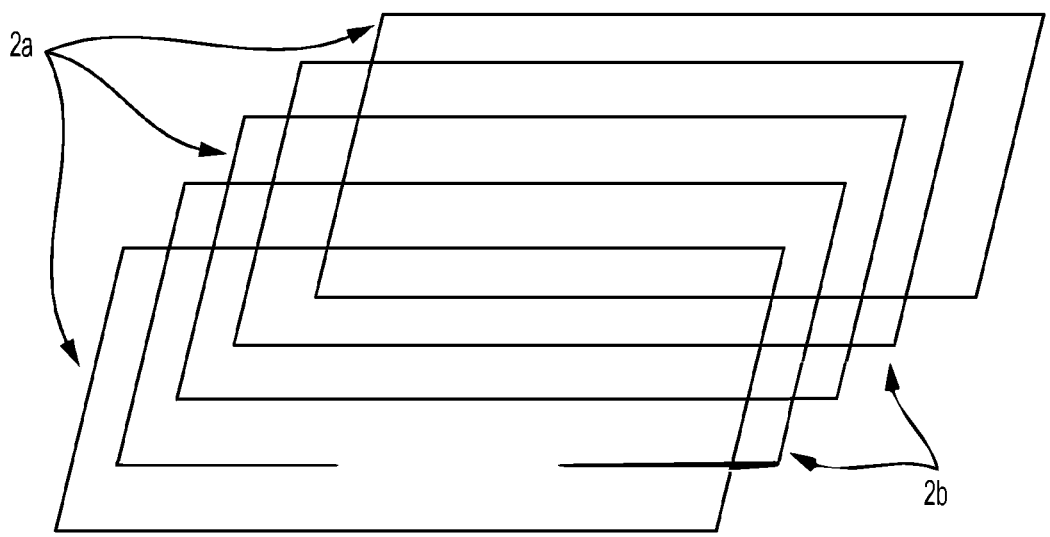
FIG. 4B is a perspective view of the ultracapacitor of FIG. 4A, with all components except the current collector plates removed for clarity.
Figure 4C:
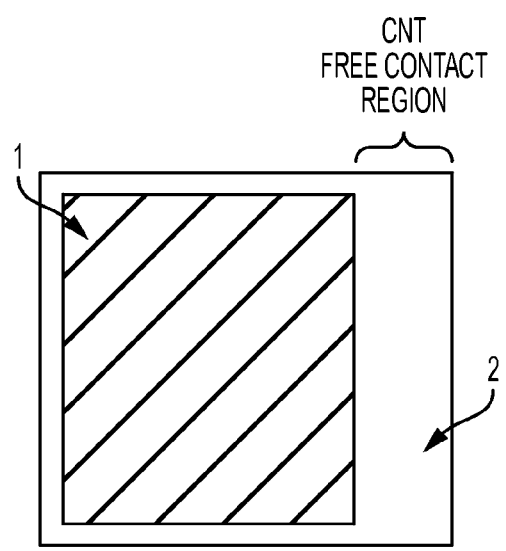
FIG. 4C is a top down view of a current collector plate of the ultracapacitor of FIG. 4A.

FIGS. 4A to 4C illustrate a stacked electrode form factor suitable for an EDLC with low ESR, e.g., for high frequency applications. The first electrode 3a includes a first plurality of stacked metallic current collector plates 2a (as shown three plates are used), each connected to a first common conductive lead 401a. The second electrode 3b comprises a second plurality of stacked metallic current collector plates 2b (as shown, two plates are used) each connected to a second common conductive lead 401b.

The first and second plurality of stacked metallic current collector plates 2a/2b are interdigitated, so that each plate 2a from the first electrode 3a has at least one surface facing an opposing surface of a plate 2b from the second electrode 3b. The opposing surfaces of the plates have CNTs 1 formed substantially directly on the plates, e.g., as described above. For plates having multiple surfaces (e.g., opposing sides) facing other plates, each of the multiple surfaces may have CNTs formed substantially directly thereupon.

An electrolyte 6 may be provided, e.g., as described above, to fill the void spaces between the electrodes 3a and 3b.

In some embodiments a separator 5 is provided between the electrodes, 3a and 3b, e.g., in a serpentine pattern as shown.

In some embodiments, one or more of the leads 401a and 401b extends through a housing 7 (e.g., using a seal such as a glass to metal seal as described herein) to a terminal 8. In some embodiments, one of the leads may be in electrical contact with a conductive housing 8. In some embodiments, both of the leads 401a and 401b extends through a housing 7 to a terminal 8, and each of the leads are electrically insulated from the housing 7 (e.g., to prevent electrochemical processes that may degrade the housing when the housing is kept at voltage). In some embodiments, the housing 7 is hermetically sealed, e.g., as described above. In some embodiments the housing 7 has a prismatic shape.

Each of the leads 401 may be made of highly electrically conductive material, e.g., a metal such as silver, gold, copper, or aluminum. The leads 401 may be connected to the current collector plates 2 using any suitable electrical connection, e.g., by ultrasonic welding. In some embodiments, in order to improve the electrical connection, one or more of the plates 2 includes a contact region that is free from CNTs and makes electrical contact with the respective conductive electrode lead. For example, as shown in FIG. 4C, in some embodiments, the contact region includes an elongated strip along a periphery of the plate. In some embodiments the contact region may be formed by masking a portion of the current collector plate 2 during formation of the CNTs on the plate.

In some embodiments, the conductive electrode lead 401 makes contact with multiple locations along the contact region, e.g., with a weld at multiple spots or even a long continuous weld running along the length of the strip.

Although a stacked configuration with interdigitated stacks of three and two plates, respectively, are shown, it is to be understood that in various embodiments, any other suitable number of stacked interdigitated plates may be used.

High Frequency Performance

In various embodiments, EDLCs of the type described herein may be configured to exhibit advantageous performance at high frequency. For example, in some embodiments, the EDLC is configured to have a capacitive frequency window comprising about 1 Hz to about 50 Hz, about 1 Hz to about 60 Hz, about 1 Hz to about 75 Hz, about 1 Hz to about 100 Hz, about 1 Hz to about 120 Hz, about 1 Hz to about 150 Hz, about 1 Hz to about 180 Hz, about 1 Hz to about 200 Hz, about 1 Hz to about 250 Hz, about 1 Hz to about 300 Hz, about 1 Hz to about 400 Hz, about 1 Hz to about 500 Hz, about 1 Hz to about 750 Hz, about 1 Hz to about 1000 Hz, or even wider ranges.

For example, in some embodiments, the EDLC is configured to have a cutoff frequency $f_{dB}$ or $f_{70}$ of at least 50 Hz, 60 Hz, 75 Hz, 100 Hz, 120 Hz, 150 Hz, 200 Hz, 300 Hz, 360 Hz, 400 Hz, 500 Hz, 600 Hz, 700 Hz, 750 Hz, 1000 Hz or more, e.g., in the range of 50 Hz to 1 kHz, or any sub-range thereof.

In some embodiments, the EDLC is configured to have an operating voltage of at least about 0.5 V, 1.0 V, 2.0 V, 3.0 V, 5.0 V, or more. In various embodiments, a plurality of EDLC may be connected, e.g., in series, to provide even higher operational voltages, e.g., of 5 V, 10 V, 12 V, 24 V, 36 V, 48 V, or more, e.g., in the range of 1 V to 1,000 V or any sub-range thereof. In some embodiments, circuitry, e.g., charge balancing circuitry may be including in the combined EDLC device. Exemplary charge balancing and ultracapacitor control circuitry is described in, PCT Application No. PCT/US14/29992 published Sep. 18, 2014, the entire contents of which is incorporated herein by reference.

In some embodiments, the EDLC is configured to have a volumetric energy density of at least 0.5 Wh/L, 1 Wh/L, 1.5 Wh/L, 2.0 Wh/L, 2.5 Wh/L, or more, e.g., in the range of 0.5 Wh/L to 100 Wh/L or any sub-range thereof. In some embodiments this energy density is provided even while providing the high frequency performance set forth above.

In some embodiments, the EDLC is configured to have a volumetric power density of at least 100 kW/L, 200 kW/L, 300 kW/L, 400 kW/L, 500 kW/L, 600 kW/L, 700 kW/L, 800 kW/L, 900 kW/L, 1,000 kW/L, 2,000 kW/L or more, e.g., in the range of 1 kW/L to 2000 kW/L, or any sub-range thereof. In some embodiments this power density is provided even while providing the high frequency performance set forth above.

In some embodiments, the EDLC is configured to have a have a leakage current during operation of less than about 0.2 mA, 0.15 mA, 0.10 mA, 0.075 mA, 0.05 mA, or less, e.g., over a volume of about 30 cm$^3$.

In some embodiments, the EDLC is configured to have a volumetric capacitance of at least about 50 mF/L, 100 mF/L, 150 mF/L, 200 mF/L, 250 mF/L, or more, e.g., in the range of 1 mF/L to 1,000 mF/L or any sub-range thereof.

In some embodiments, the EDLC is configured to have a volumetric ESR of less than about 200 mΩ/L, 175 mΩ/L, 150 mΩ/L, 100 mΩ/L, 50 mΩ/L, or less, e.g., in the range of 1 mΩ/L to 1,000 mΩ/L, or any sub-range thereof.

Applications for High Frequency Ultracapacitors

In various embodiments, high frequency ultracapacitors of the type described herein may be used in a wide variety of applications. In general, high frequency ultracapacitors of the type described herein may replace conventional electrolytic capacitors, e.g., in applications where one or more of higher capacitance, smaller form factor, higher power density, or other similar performance factors would be advantageous.

In some embodiments, high frequency ultracapacitors of the type described herein may be used as energy storage elements in active or passive power factor correction devices.

In a purely resistive AC circuit, voltage and current waveforms are in step (or in phase), changing polarity at the same instant in each cycle. All the power entering the load is consumed (or dissipated). Where reactive loads are present, such as with capacitors or inductors, energy storage in the loads results in a time difference between the current and voltage waveforms. During each cycle of the AC voltage, extra energy, in addition to any energy consumed in the load, is temporarily stored in the load in electric or magnetic fields, and then returned to the AC power source a fraction of a second later in the cycle. The "ebb and flow" of this nonproductive power increases the current in the line. Thus, a circuit with a low power factor will use higher currents to transfer a given quantity of real power than a circuit with a high power factor. A linear load does not change the shape of the waveform of the current, but may change the relative timing (phase) between voltage and current. A non-linear load may change the shape of the waveform of the current along with the relative timing (phase) between voltage and current.

Circuits containing purely resistive heating elements (filament lamps, cooking stoves, etc.) have a power factor of 1.0. Circuits containing inductive or capacitive elements (electric motors, solenoid valves, lamp ballasts, and others) often have a power factor below 1.0.

A high power factor is generally desirable in a transmission system to reduce transmission losses and improve voltage regulation at the load. It is often desirable to adjust the power factor of a system to near 1.0. When reactive elements supply or absorb reactive power near the load, the apparent power is reduced. Power factor correction (PFC) may be applied to improve the stability and efficiency of the transmission network.

PFC brings the power factor of an AC power circuit closer to 1 by supplying reactive power of opposite sign, e.g., by adding capacitors or inductors that act to cancel the inductive or capacitive effects of the load, respectively. For example, the inductive effect of motor loads may be offset by locally connected capacitors.

In some embodiments, ultracapacitors of the type described herein may be used in devices for providing PFC. For example, in some embodiments, the ultracapacitors may be used in an automatic power factor correction unit that includes of a number of capacitors that are switched into or out of a power transmission circuit, e.g., by means of contactors. These contactors are controlled by a regulator that measures power factor in an electrical network. Depending on the load and power factor of the network, the power factor controller will switch the necessary blocks of capacitors in steps to make sure the power factor stays above a selected value. One example of such a circuit is a valley-fill circuit, as is known in the art.

In some embodiments, ultracapacitors of the type described herein may be used in active PFC devices, e.g., configured to provide PFC for non-linear loads, such as switched-mode power supplies. The PFC device may be of any suitable type including buck, boost, buck-boost, or synchronous condenser PFC devices.

Figure 6:
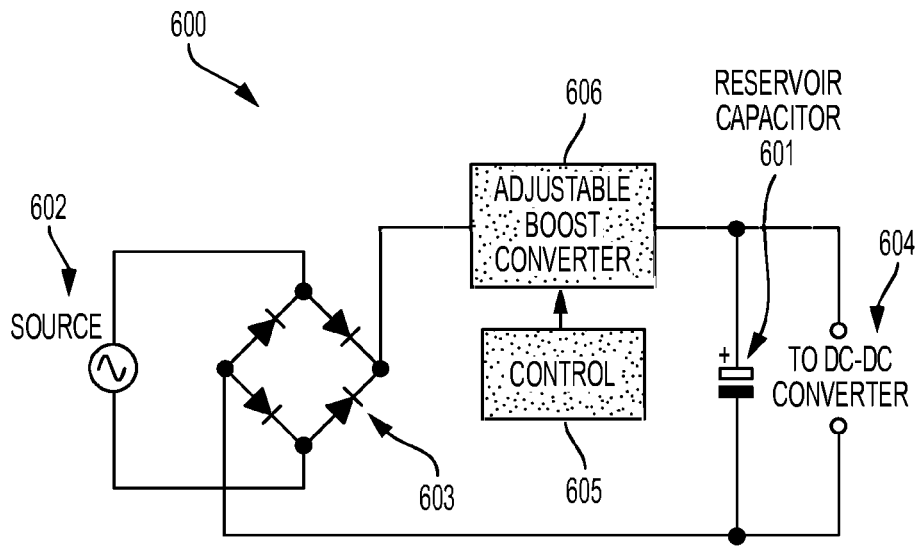
FIG. 6 is a schematic diagram of a power factor correction circuit including an ultracapacitor of the type described herein.

For example, FIG. 6 shows an active PFC circuit 600 featuring a high frequency ultracapacitor 601 of the type described herein. An AC power source 602 is rectified by a full wave rectifier 603. The output of the rectifier is sent through a boost converter 606 and output to a load 604 (as shown, a DC-DC converter, such as a switched-mode power converter) in parallel with the energy reservoir capacitor 601. Control circuitry 605 of the boost converter 606 is able to detect the circuit conditions and then control the voltage and hence the timing of the current waveform to the reservoir capacitor 601.

Figure 7:
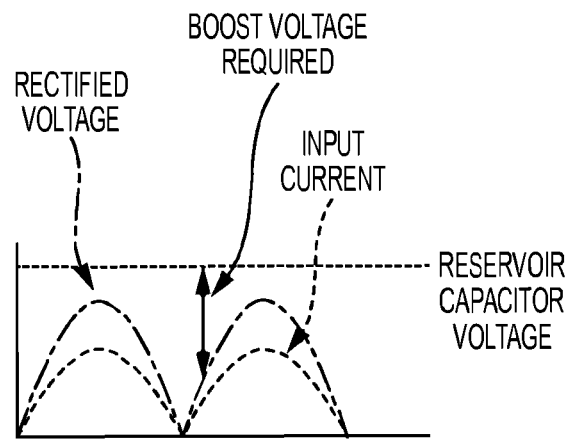
FIG. 7 is a plot illustrating the operation of the circuit of FIG. 6.

As shown in FIG. 7, the boost converter 606 is controlled by the control circuitry 605 to attempt to maintain a constant DC output voltage on the reservoir capacitor 601 while drawing a current that is always in phase with and at the same frequency as the line input voltage. For proper operation, the capacitor 601 must have a cutoff frequency that is above the frequency of the AC source 602, e.g., 2 or more times the source frequency. For example, in some embodiments if the AC source 602 operates at 50 Hz, the capacitor 601 may be selected to have a cutoff frequency (e.g., $f_{3\ dB}$ and/or $f_{70}$) above 50 Hz, 100 Hz, 150 Hz, or more.

Although one example, of a PFC circuit featuring an ultracapacitor is shown, it is to be understood that in various embodiments, ultracapacitors of the type described herein may be used in a variety of other PFC circuits known in the art.

In general, various embodiments include a power factor correction device including at least one energy storage element configured to increase the power factor of power delivered to a load from an alternating current power source, wherein the energy storage element comprises at least one high frequency EDLC of the type described herein.

In some embodiments, the energy storage element includes a plurality of EDLCs, e.g., connected in series. In some embodiments, the alternating current source operates at a source frequency, and the one or more EDLCs each have a capacitive frequency window encompassing the source frequency. In some embodiments, the alternating current source operates at a source frequency, and the EDLCs each have a capacitive frequency window encompassing at least twice the source frequency, three times the source frequency, four times the source frequency, or more.

In some embodiments, the power factor correction device has a maximum output voltage of at least 5 V, 12 V, 24 V, 48V, or more, e.g., in the range of 0.5 to 100 V or any sub-range thereof.

In various embodiments, high frequency ultracapacitors of the type described herein may be used for other applications including, e.g., filters (e.g., low pass, high pass, and/or band pass filters), phase shifters, inverters for DC power sources (e.g., inverters for photovoltaic cells featuring, e.g., maximum power point tracking or the like), and many other applications as will be apparent to one skilled in the art.

EXAMPLES

Figure 8A:
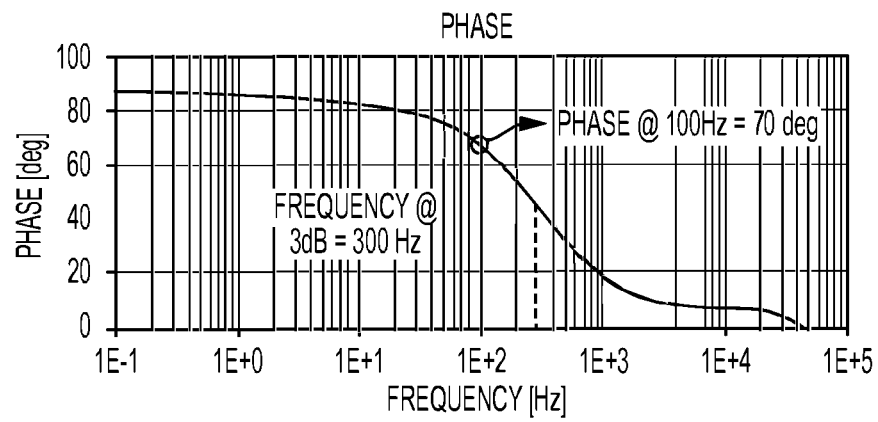
FIG. 8A shows a phase shift versus frequency plot for an ultracapacitor cell of the type described herein.
Figure 8B:
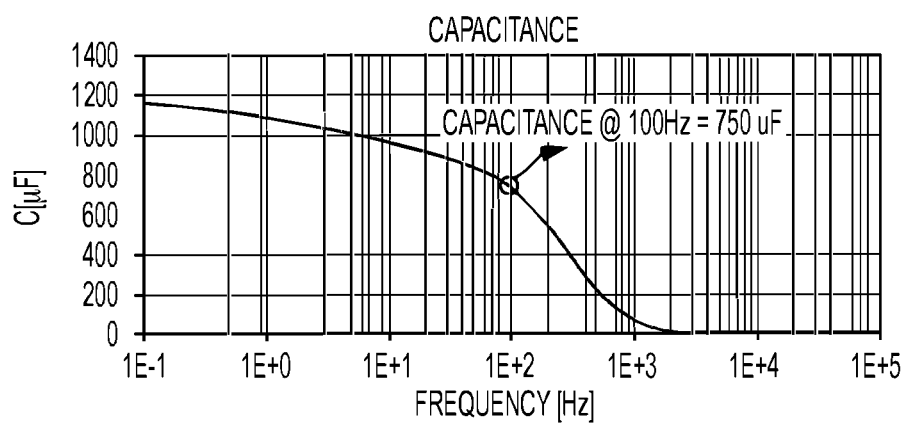
FIG. 8B shows a capacitance versus frequency plot for an ultracapacitor cell of the type described herein.
Figure 8C:
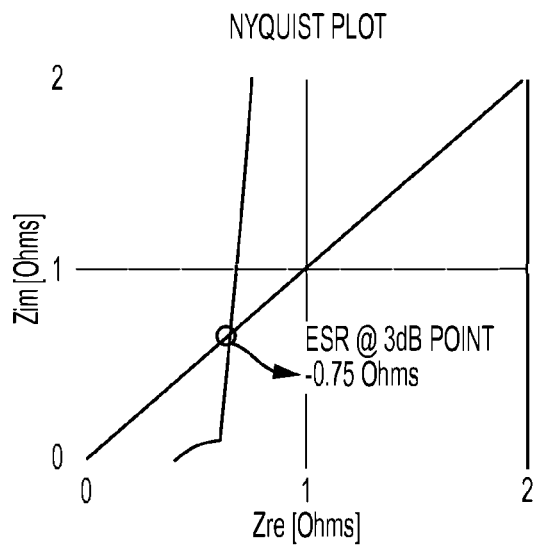
FIG. 8C shows a Nyquist plot for an ultracapacitor cell of the type described herein.

FIG. 8A shows a phase shift versus frequency plot for an ultracapacitor cell of the type described herein featuring MWCNT energy storage media formed directly onto a current collector. FIG. 8B shows a capacitance versus frequency plot for an ultracapacitor cell of the type described herein featuring MWCNT energy storage media formed directly onto a current collector. FIG. 8C shows a Nyquist plot for an ultracapacitor cell of the type described herein featuring MWCNT energy storage media formed directly onto a current collector. The cell had an electrode area of 0.25 cm$^2$ with a maximum operating voltage of 3V. The phase shift for the cell at 100 Hz was 70 degrees, and the capacitance at 100 Hz was 0.75 mF (compared to a DC capacitance of about 1.2 mF. The cell had a 3 dB cutoff frequency of 300 Hz, with an ESR of 0.75Ω at the cutoff frequency.

Figure 9A:
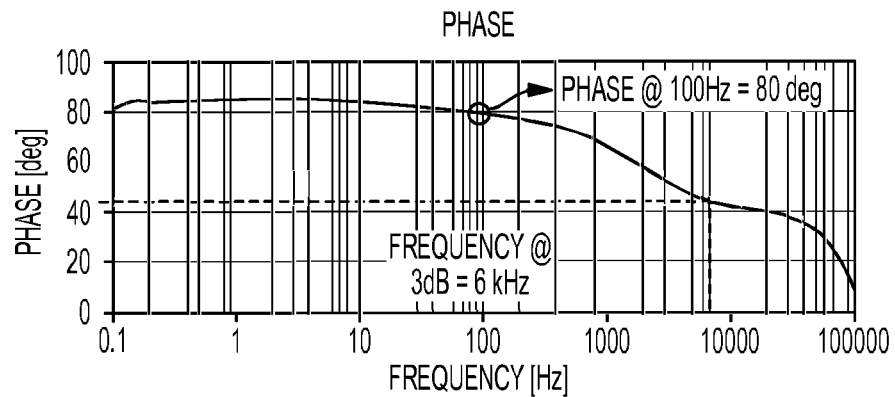
FIG. 9A shows a phase shift versus frequency plot for an ultracapacitor cell of the type described herein.
Figure 9B:
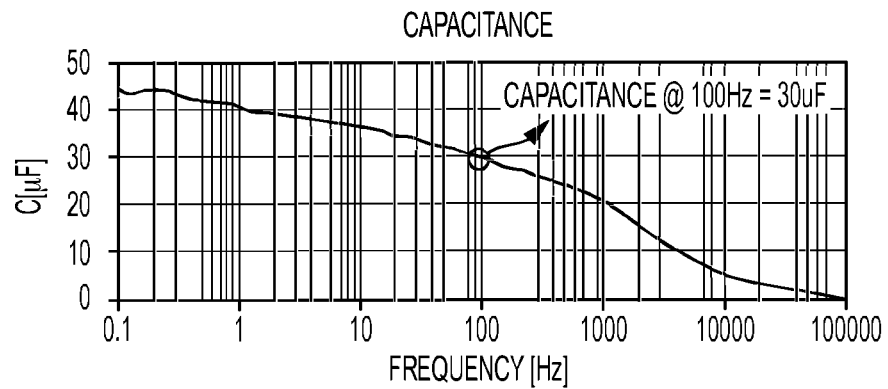
FIG. 9B shows a capacitance versus frequency plot for an ultracapacitor cell of the type described herein.
Figure 9C:
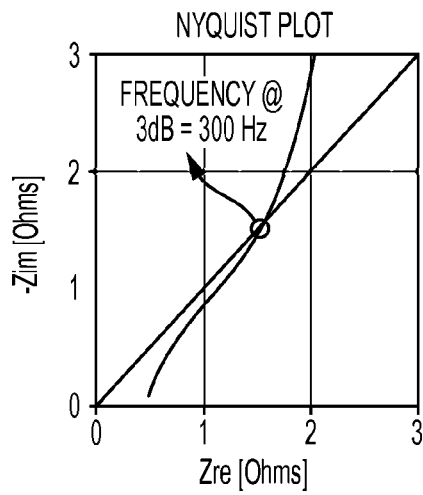
FIG. 9C shows a Nyquist plot for an ultracapacitor cell of the type described herein.

FIG. 9A shows a phase shift versus frequency plot for an ultracapacitor cell of the type described herein featuring MWCNT energy storage media formed directly onto a current collector. FIG. 9B shows a capacitance versus frequency plot for an ultracapacitor cell of the type described herein featuring MWCNT energy storage media formed directly onto a current collector. FIG. 9C shows a Nyquist plot for an ultracapacitor cell of the type described herein featuring MWCNT energy storage media formed directly onto a current collector. The cell had an electrode area of 0.25 cm$^2$ with a CNT layer thickness of less than 10 µm. The cell had a maximum operating voltage of 3V. The phase shift for the cell at 100 Hz was 80 degrees, and the capacitance at 100 Hz was 0.30 mF (compared to a DC capacitance of about 0.45 mF. The cell had a 3 dB cutoff frequency of 6,000 Hz, with an ESR of 1.5Ω at the cutoff frequency.

FIG. 10 shows performance characteristics for two ultracapacitor devices of the type described herein featuring MWCNT energy storage media formed directly onto a current collector compared to the performance characteristics of a commercially available electrolytic capacitor device. The devices are configured to operate at 48 V and 200 W, at a line frequency of 100 Hz. The ultracapacitor devices provide significantly improved capacitance and power loss, and take up a significantly smaller volume than the comparable electrolytic capacitor device. Devices of this type would be suitable for use as a bulk line frequency capacitor, e.g., in a PFC AC/DC converter.

FIG. 11 shows performance characteristics for two ultracapacitor devices of the type described herein featuring MWCNT energy storage media formed directly onto a current collector compared to the performance characteristics of a commercially available electrolytic capacitor device. The devices are configured to operate at 24 V and 100 W, at a line frequency of 100 Hz. The ultracapacitor devices provide significantly improved capacitance and power loss, and take up a significantly smaller volume than the comparable electrolytic capacitor device. Devices of this type would be suitable for use as a bulk line frequency capacitor, e.g, in a PFC AC/DC converter.

Figure 12B:
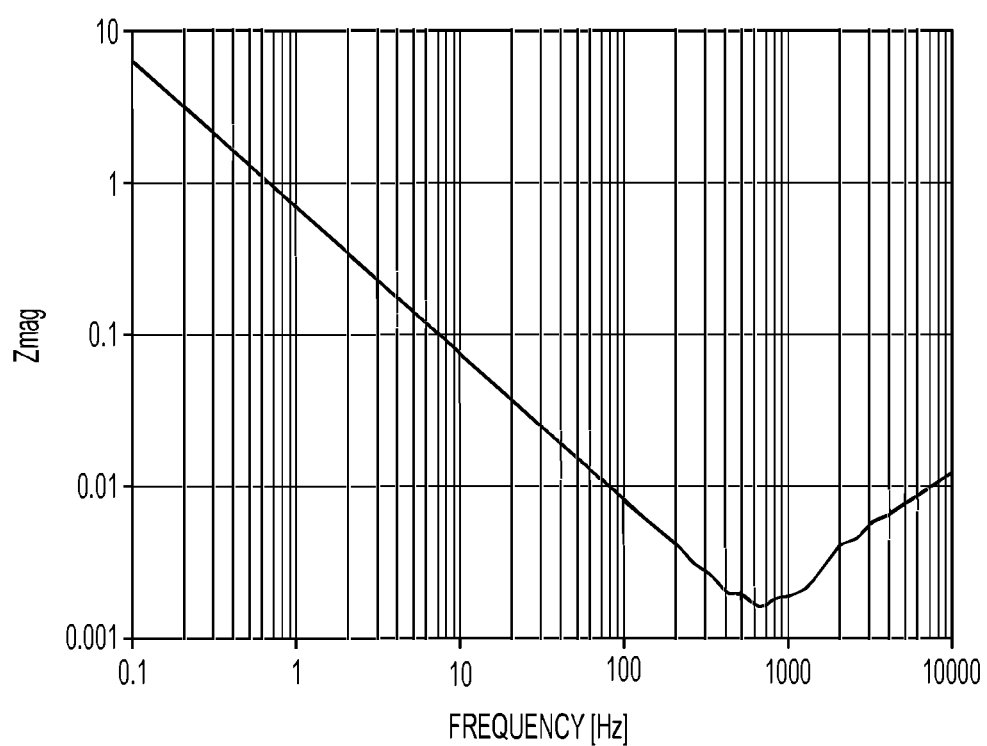
FIG. 12B shows a plot of imaginary impedance versus frequency for the cell of FIG. 12A.
Figure 12C:
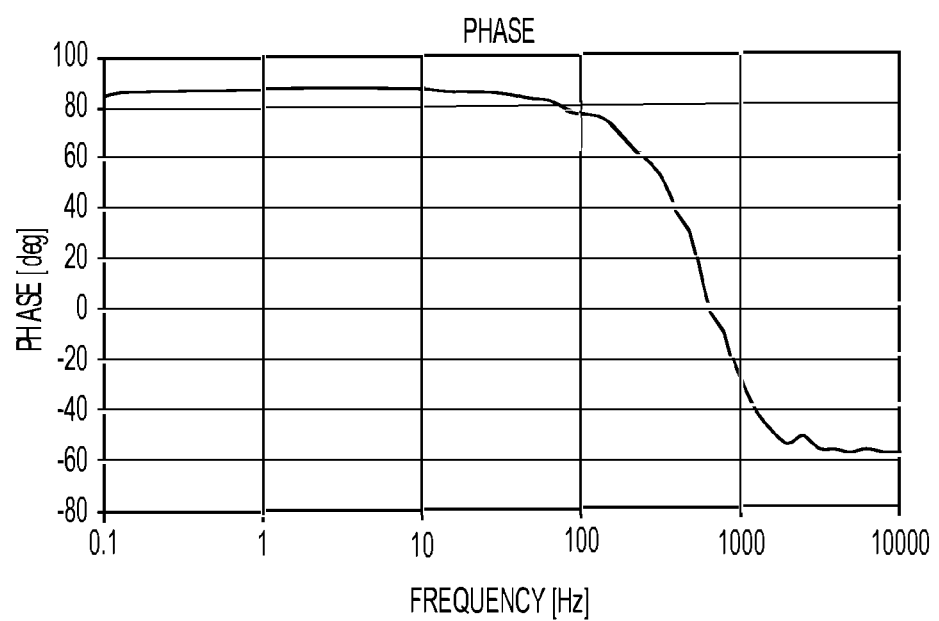
FIG. 12C shows a plot of phase shift versus frequency for the cell of FIG. 12A.
Figure 12D:
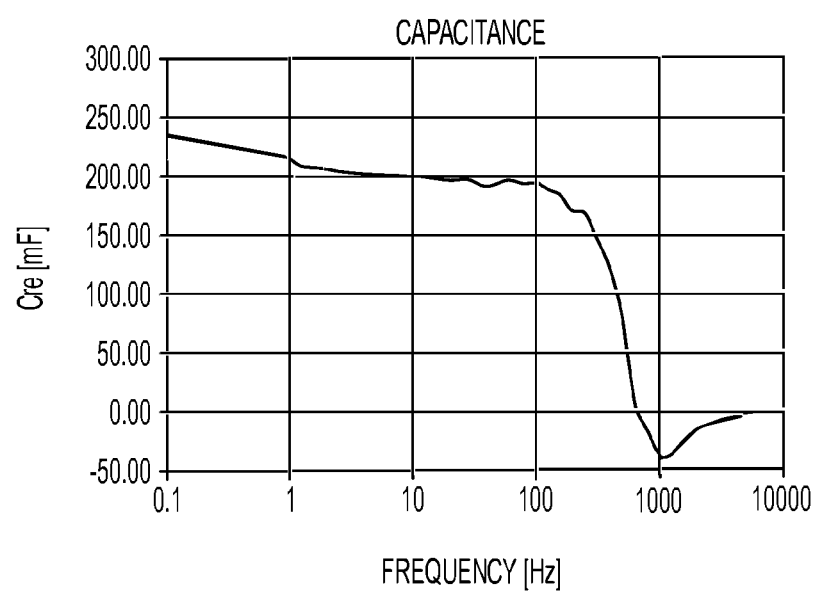
FIG. 12D shows a plot of capacitance versus frequency for the cell of FIG. 12A.

FIG. 12A shows performance characteristics for an ultracapacitor cell of the type described herein featuring MWCNT energy storage media formed directly onto a current collector. FIG. 12B shows an plot of imaginary impedance versus frequency for the same cell. FIG. 12C shows a plot of phase shift versus frequency for the same cell. FIG. 12D shows a plot of capacitance versus frequency for the same cell. The cell exhibits good performance at high frequency (e.g., at 100 Hz), while providing significant volumetric energy density in a compact form factor. As shown, the high frequency ultracapacitor has a wide capacitive frequency window, ranging from near DC to well over 100 Hz.

Figure 13B:
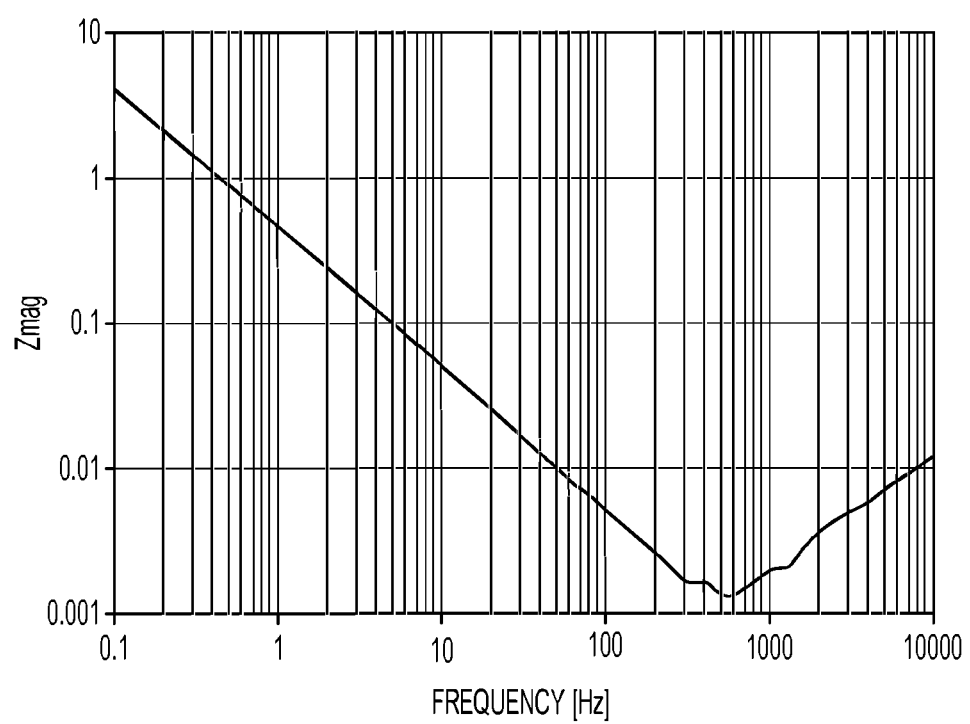
FIG. 13B shows a plot of imaginary impedance versus frequency for the cell of FIG. 13A.
Figure 13C:
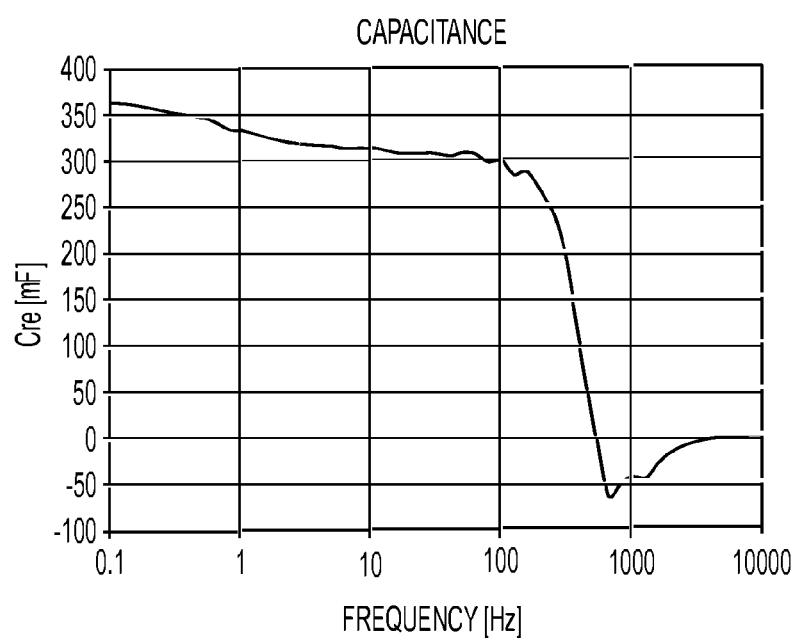
FIG. 13C shows an plot of capacitance versus frequency for the cell of FIG. 13A.

FIG. 13A shows performance characteristics for an ultracapacitor cell of the type described herein featuring MWCNT energy storage media formed directly onto a current collector. FIG. 13B shows an plot of imaginary impedance versus frequency for the same cell. FIG. 13C shows an plot of capacitance versus frequency for the same cell. The cell exhibits good performance at high frequency (e.g., at 100 Hz), while providing significant volumetric energy density in a compact form factor. As shown, the high frequency ultracapacitor has a wide capacitive frequency window, ranging from near DC to over 100 Hz.

FIG. 14 shows performance characteristics for five different ultracapacitor cells of the type described herein featuring MWCNT energy storage media formed directly onto a current collector. Each of the cells exhibits good performance at high frequency (e.g., at 100 Hz), while providing significant volumetric energy density in a compact form factor.

Figure 15A:
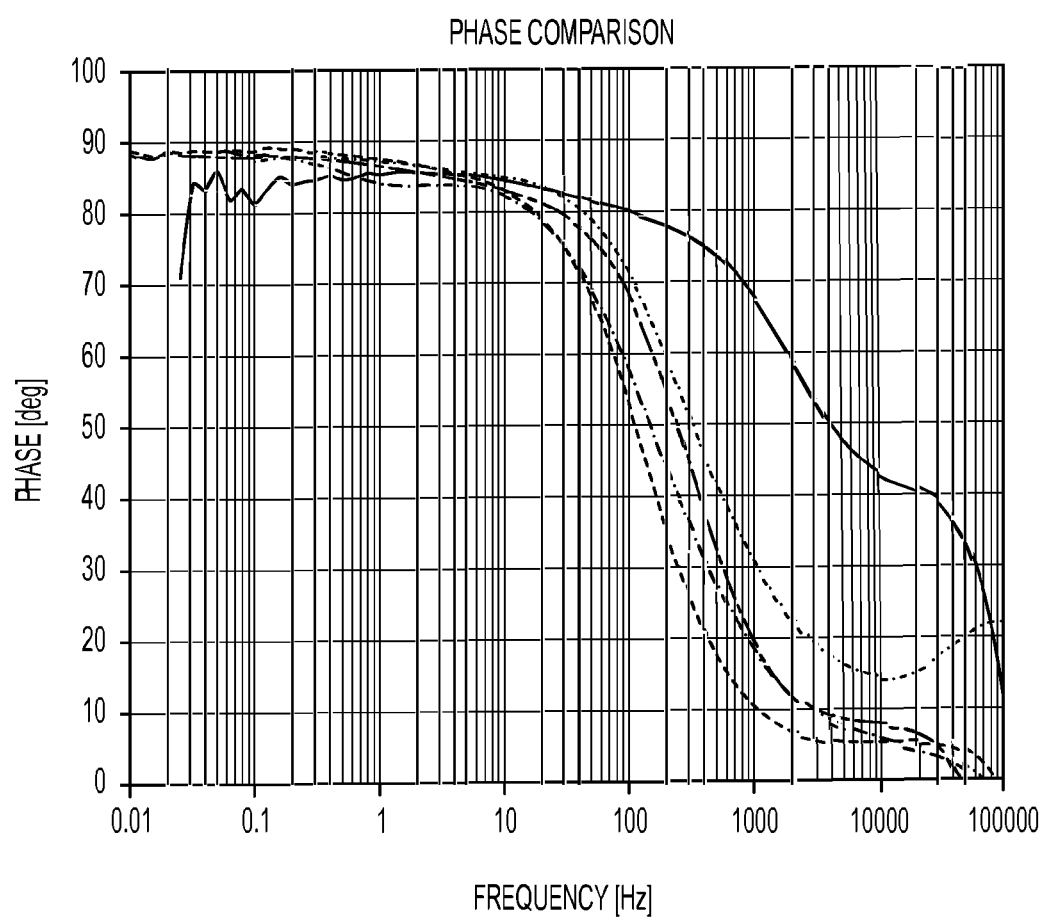
FIG. 15A shows phase versus frequency plots for various ultracapacitors of the type described herein.
Figure 15B:
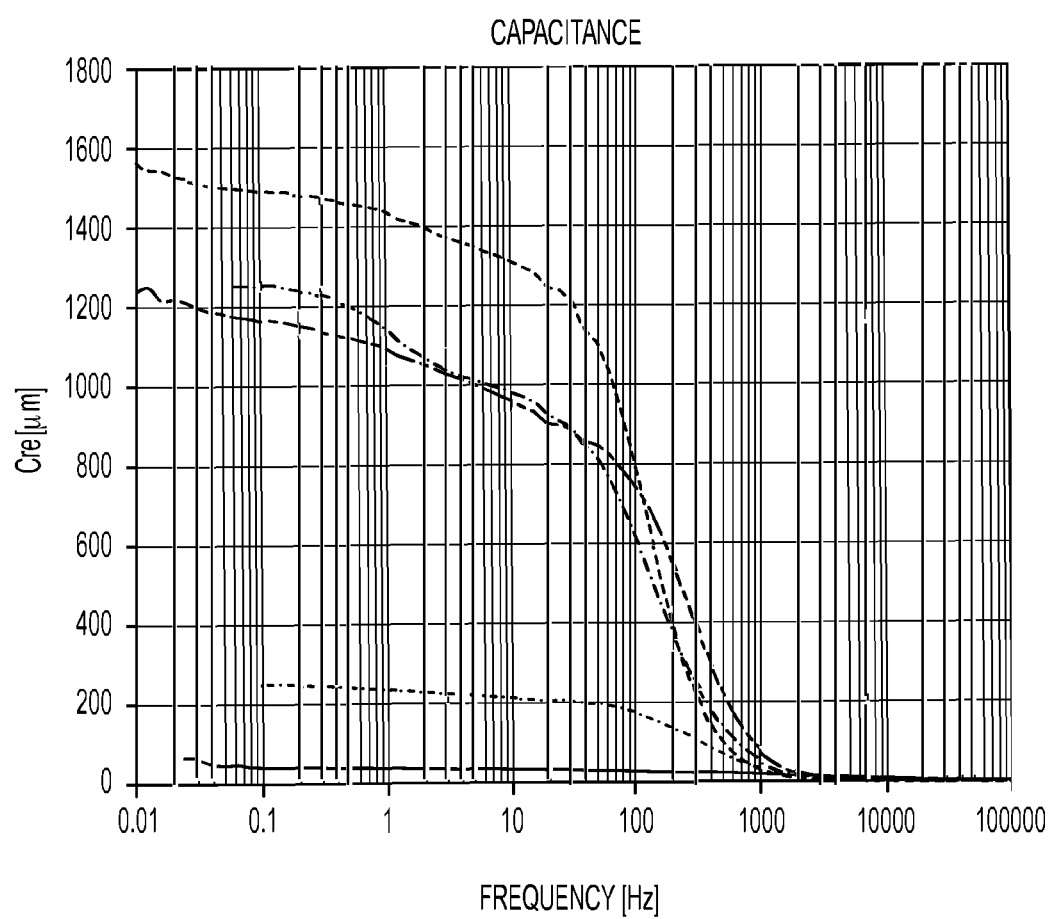
FIG. 15B shows capacitance versus frequency plots for the capacitors of FIG. 15A.

FIG. 15A shows phase versus frequency plots for various ultracapacitors of the type described herein featuring MWCNT energy storage media formed directly onto a current collector. FIG. 15B shows capacitance versus frequency plots for the same capacitors. As shown, the high frequency ultracapacitor has a wide capacitive frequency window, ranging from near DC to over 100 Hz.

Figure 16:
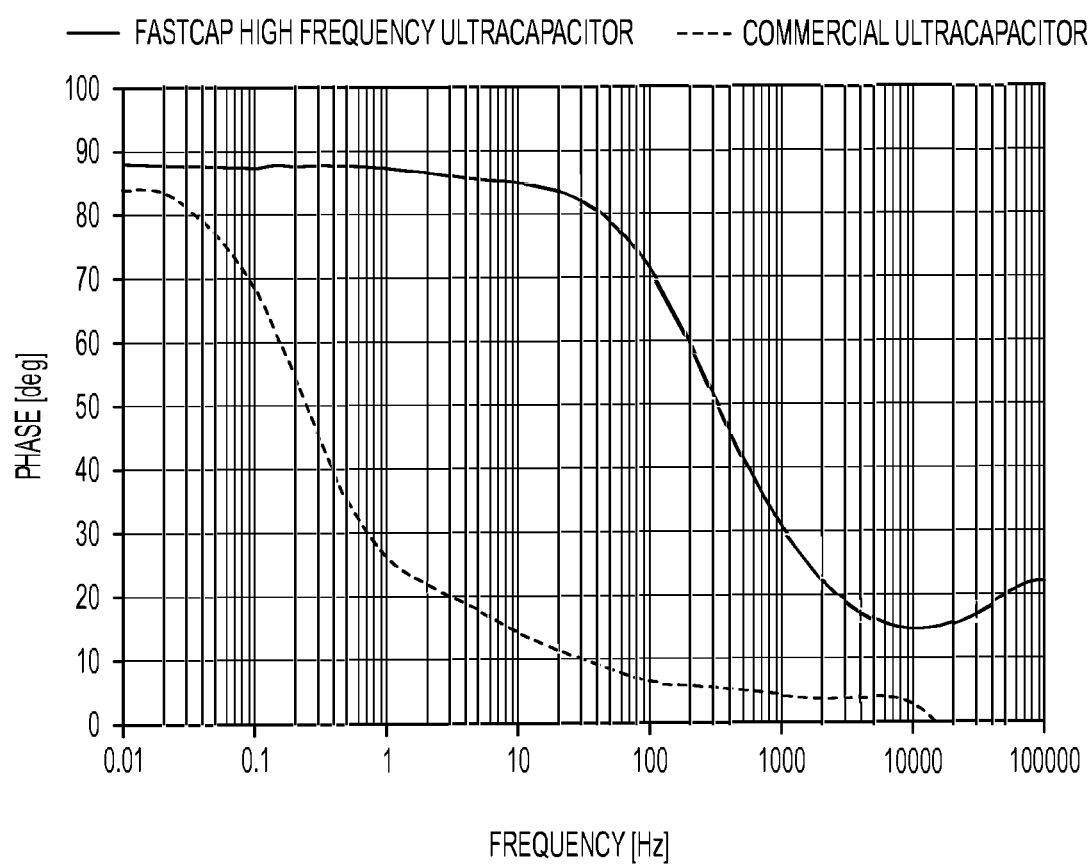
FIG. 16 shows phase versus frequency plots for a high frequency ultracapacitor of the type described herein and a commercially available ultracapacitor using activated carbon energy storage media.

FIG. 16 shows phase versus frequency plots for a high frequency ultracapacitor of the type described herein featuring MWCNT energy storage media formed directly onto a current collector, and a commercially available ultracapacitor using activated carbon energy storage media. As shown, the high frequency ultracapacitor has a much wider capacitive frequency window (ranging from near DC to over 100 Hz) than the commercially available ultracapacitor which experiences a significant drop in phase shift even for very low frequencies (e.g., less than 1 Hz).

EQUIVALENTS

It should be recognized that the teachings herein are merely illustrative and are not limiting of the invention. Further, one skilled in the art will recognize that additional components, configurations, arrangements and the like may be realized while remaining within the scope of this invention. For example, configurations of layers, electrodes, leads, terminals, contacts, feed-throughs, caps and the like may be varied from embodiments disclosed herein. Generally, design and/or application of components of the ultracapacitor and ultracapacitors making use of the electrodes are limited only by the needs of a system designer, manufacturer, operator and/or user and demands presented in any particular situation.

Further, various other components may be included and called upon for providing for aspects of the teachings herein. For example, additional materials, combinations of materials and/or omission of materials may be used to provide for added embodiments that are within the scope of the teachings herein. As discussed herein, terms such as "adapting," "configuring," "constructing" and the like may be considered to involve application of any of the techniques disclosed herein, as well as other analogous techniques (as may be presently known or later devised) to provide an intended result.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including," "has" and "having" are intended to be inclusive such that there may be additional elements other than the listed elements.

In the present application a variety of variables are described, including but not limited to components (e.g. electrode materials, electrolytes, etc.), conditions (e.g., temperature, freedom from various impurities at various levels), and performance characteristics (e.g., post-cycling capacity as compared with initial capacity, low leakage current, etc.). It is to be understood that any combination of any of these variables can define an embodiment of the invention. For example, a combination of a particular electrode material, with a particular electrolyte, under a particular temperature range and with impurity less than a particular amount, operating with post-cycling capacity and leakage current of particular values, where those variables are included as possibilities but the specific combination might not be expressly stated, is an embodiment of the invention. Other combinations of articles, components, conditions, and/or methods can also be specifically selected from among variables listed herein to define other embodiments, as would be apparent to those of ordinary skill in the art.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention but to be construed by the claims appended herein.

What is claimed is:

1. An electric double layer capacitor (EDLC) comprising:
a first electrode comprising a first current collector and a first plurality of vertically aligned carbon nanotubes (CNTs) on the first current collector;
a second electrode comprising a second current collector and a second plurality of carbon nanotubes (CNTs) on the second current collector; wherein at least one of the first current collector and the second current collector comprises a layer of aluminum carbide whiskers on an aluminum base layer, and where the vertically aligned carbon nanotubes contact the aluminum carbide whiskers; where the whiskers protrude into the vertically aligned carbon nanotubes; and
an electrolyte contacting the first and second electrodes; wherein the electrolyte comprises a salt of the following formula:

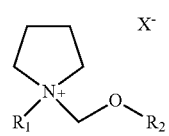

(1)

wherein $R_1$ and $R_2$ can be the same or different and are each a straight-chain or branched alkyl having 1 to 4 carbon atoms, and X– is an anion that comprises $[B(CN)4]^-$ or $[BF_n(CN)4-n]^-$, where n=0, 1, 2 or 3; wherein the EDLC has a capacitive frequency window comprising a frequency range of about 1 Hz to an upper boundary of at least 150 Hz, wherein the upper boundary is a cutoff frequency, f 3 db, that is defined by a 3 db reduction in capacitance.

2. The electric double layer capacitor (EDLC) of claim 1, wherein: the upper boundary is at least 200 Hz.

3. The electric double layer capacitor (EDLC) of claim 1, wherein: the upper boundary is between 150 Hz and 1000 Hz.

4. The electric double layer capacitor (EDLC) of claim 1, wherein:
at least one of the first current collector and the second current collector consists essentially of aluminum.

5. The electric double layer capacitor (EDLC) of claim 1, wherein:
the first current collector and the second current collector comprises a layer of aluminum carbide whiskers disposed on an aluminum base layer.

6. The electric double layer capacitor (EDLC) of claim 1, wherein:
at least one plurality of carbon nanotubes (CNTs) is disposed on a respective current collector without a binder material.

7. The electric double layer capacitor (EDLC) of claim 1, wherein:
a layer of catalyst material is disposed between a respective current collector and plurality of carbon nanotubes (CNTs).

8. The electric double layer capacitor (EDLC) of claim 7, wherein:
the catalyst material comprises at least one of iron and an alloy that is at least one of corrosion resistant and oxidation resistant.

9. The electric double layer capacitor (EDLC) of claim 7, wherein:
the catalyst material comprises at least one of austenite and an austenic alloy.

10. The electric double layer capacitor (EDLC) of claim 1, wherein:
at least one of the plurality of carbon nanotubes (CNTs) comprises an average height of less than 50 µm.

11. The electric double layer capacitor (EDLC) of claim 1, wherein:
lateral spacing between CNTs within at least one of the plurality of carbon nanotubes (CNTs) comprises void spaces having a size that is several times a size of at least one of an anion and a cation in the electrolyte.

12. The electric double layer capacitor (EDLC) of claim 1, wherein:
lateral spacing between CNTs within at least one of the plurality of carbon nanotubes (CNTs) is between 2 and 100 times a size of at least one of an anion and a cation in the electrolyte.

13. An electric double layer capacitor (EDLC) comprising:
a first electrode comprising a first current collector and a first plurality of vertically aligned carbon nanotubes (CNTs) on the first current collector, wherein the first current collector comprises at least one of roughened aluminum and anodized aluminum;
a second electrode comprising a second current collector and a second plurality of carbon nanotubes (CNTs) on the second current collector, wherein the second current collector comprises at least one of roughened aluminum and anodized aluminum; wherein at least one of the first current collector and the second current collector comprises a layer of aluminum carbide whiskers; and where the vertically aligned carbon nanotubes contact the aluminum carbide whiskers; where the whiskers protrude into the vertically aligned carbon nanotubes; and an electrolyte contacting the first and second electrodes; wherein the electrolyte comprises a salt of the following formula:

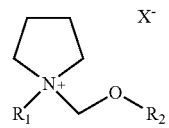

(1)

wherein $R_1$ and $R_2$ can be the same or different and are each a straight-chain or branched alkyl having 1 to 4 carbon atoms, and X– is an anion that comprises $[B(CN)_4]^-$ or $[BF_n(CN)_{4-n}]^-$, where n=0, 1, 2 or 3;
wherein the EDLC has a capacitive frequency window comprising a frequency range of about 1 Hz to an upper boundary of at least 150 Hz, wherein the upper boundary is a cutoff frequency, f 3 db, that is defined by a 3 db reduction in capacitance.

14. An electric double layer capacitor (EDLC) comprising:
a first electrode comprising a first current collector and a first plurality of vertically aligned carbon nanotubes (CNTs) formed on the first current collector;
a second electrode comprising a second current collector and a second plurality of carbon nanotubes (CNTs) formed on the second current collector; wherein the second current collector comprises at least one of roughened aluminum and anodized aluminum; wherein at least one of the first current collector and the second current collector comprises a layer of aluminum carbide whiskers; and where the vertically aligned carbon nanotubes contact the aluminum carbide whiskers; where the whiskers protrude into the vertically aligned carbon nanotubes; and an electrolyte contacting the first and second electrodes; wherein the electrolyte comprises a salt of the following formula:

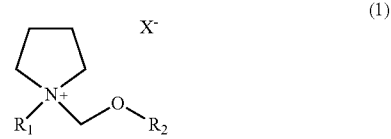

(1)

wherein $R_1$ and $R_2$ can be the same or different and are each a straight-chain or branched alkyl having 1 to 4 carbon atoms, and X– is an anion that comprises $[B(CN)_4]^-$ or $[BF_n(CN)_{4-n}]^-$, where n=0, 1, 2 or 3; wherein the EDLC is configured to have a capacitive frequency window comprising a frequency range of about 1 Hz to an upper boundary of 150 Hz, wherein the upper boundary is a phase shift frequency, f 70, where a magnitude of the phase of the capacitor drops below seventy (70) degrees.

15. The electric double layer capacitor (EDLC) of claim 14, wherein:
at least one plurality of carbon nanotubes (CNTs) is disposed on a respective current collector without a binder material.

16. The electric double layer capacitor (EDLC) of claim 14, wherein:
at least one of the plurality of carbon nanotubes (CNTs) comprises an average height of less than 50 µm.

17. The electric double layer capacitor (EDLC) of claim 14, wherein:
lateral spacing between CNTs within at least one of the plurality of carbon nanotubes (CNTs) comprises void spaces having a size that is several times a size of at least one of an anion and a cation in the electrolyte.

18. The electric double layer capacitor (EDLC) of claim 14, wherein:
lateral spacing between CNTs within at least one of the plurality of carbon nanotubes (CNTs) is between 2 and 100 times a size of at least one of an anion and a cation in the electrolyte.

* * * * *